US012774890B1

(12) United States Patent
Zhang et al.

(10) Patent No.: US 12,774,890 B1
(45) Date of Patent: Oct. 27, 2026

(54) SYSTEM AND METHOD FOR CLASSIFYING A LOCATION PROFILE USING A ROUTE MAP OF CIPHERED LOCATION DATA

(71) Applicant: Government Employees Insurance Company (GEICO), Bethesda, VA (US)

(72) Inventors: Ying Zhang, Palo Alto, CA (US); Manoj Varma Namburi, Anna, TX (US); Michael J. Chan, San Jose, CA (US)

(73) Assignee: Government Employees Insurance Company (GEICO), Bethesda, MD (US)

( * ) Notice: Subject to any disclaimer, the term of this patent is extended or adjusted under 35 U.S.C. 154(b) by 0 days.

(21) Appl. No.: 19/637,415

(22) Filed: Apr. 2, 2026

(51) Int. Cl.
*G01C 21/34* (2006.01)
*G01C 21/00* (2006.01)
*G01C 21/14* (2006.01)
*H04L 9/06* (2006.01)

(52) U.S. Cl.
CPC ......... *G01C 21/14* (2013.01); *G01C 21/3807* (2020.08); *H04L 9/0643* (2013.01)

(58) Field of Classification Search
CPC ........ G01C 21/00; G01C 21/34; G01C 21/36; H04L 9/0643; G06F 16/29; G06F 16/9537; G06T 5/70
See application file for complete search history.

(56) References Cited

U.S. PATENT DOCUMENTS 8,559,926 B1 10/2013 Dawson et al.
9,344,990 B1 5/2016 Bali et al.
9,794,373 B1 10/2017 Steinmetz
(Continued)

FOREIGN PATENT DOCUMENTS

CN 112861176 A 5/2021

OTHER PUBLICATIONS

Kiukkonen et al., "Towards Rich Mobile Phone Datasets: Lausanne Data Collection Campaign", 7th ACM International Conference on Pervasive Services (ICPS 2010), Jul. 13-16, 2010. (7 pages).
(Continued)

*Primary Examiner* — Tan Q Nguyen
(74) *Attorney, Agent, or Firm* — Buchanan Ingersoll & Rooney, PC

(57) ABSTRACT

Disclosed are system and methods for classifying a location profile including a location characteristic database, memory, and a processor. The processor is configured with program code to capture a time series of live coarse location data from a mobile computing platform traveling along a route; generate virtualized coordinates for a virtual path; determine a distance value and a direction value between each virtualized coordinate for the virtual path; remap the distance values and the direction values for the virtualized coordinates to generate a remapped virtual path; generate an output classification for the mobile computing platform using a trained classification model based on inputting a remapped virtual path; store the output classification and the remapped virtual path associated in the location characteristic database; associate the remapped virtual path and the output classification with an account identifier; and update a data field associated with an account identifier in the location characteristic database.

20 Claims, 25 Drawing Sheets

(56) References Cited

U.S. PATENT DOCUMENTS

| | | | |
|---|---|---|---|
| 10,281,285 B2 | 5/2019 | Chen et al. | |
| 10,885,204 B2 | 1/2021 | Adir et al. | |
| 11,138,615 B1 | 10/2021 | Das et al. | |
| 11,206,543 B2 | 12/2021 | Do et al. | |
| 11,706,628 B2 | 7/2023 | Kudtarkar et al. | |
| 11,829,447 B2 | 11/2023 | Lu et al. | |
| 11,928,567 B2 | 3/2024 | Elisha et al. | |
| 12,175,344 B2 | 12/2024 | Wick et al. | |
| 12,443,750 B2 | 10/2025 | Burns | |
| 2020/0158516 A1* | 5/2020 | Gale | G01C 21/32 |
| 2020/0288306 A1* | 9/2020 | Do | H04W 12/37 |
| 2021/0041249 A1* | 2/2021 | Roca Rosero | G01C 21/30 |
| 2021/0400438 A1 | 12/2021 | Tran et al. | |
| 2023/0129682 A1 | 4/2023 | Hsu et al. | |
| 2023/0419412 A1 | 12/2023 | Jordan et al. | |
| 2024/0020414 A1 | 1/2024 | Burns | |
| 2024/0255294 A1 | 8/2024 | Hsu | |

OTHER PUBLICATIONS

Nguyen et al., "PnLUM: System for Prediction of Next Location for Users with Mobility", Mobile Data Challenge 2012 (by Nokia) Workshop, Jun. 18-19, 2012. (5 pages).

Notice of Allowability issued on Apr. 3, 2026, by the U.S. Patent and Trademark Office in co-pending U.S. Appl. No. 19/330,373. (10 pages).

Office Action issued on Apr. 3, 2026, by the U.S. Patent and Trademark Office in corresponding U.S. Appl. No. 19/330,373. (16 pages).

* cited by examiner

700A

700B

| Mobile Computing Platform_ID | Date | Time | Latitude | Longitude | Hour | Day_Type |
|---|---|---|---|---|---|---|
| 1 | 2/14/2024 | 12:00:00 AM | 42.4626 | -83.0157 | 0 | Weekday |
| 1 | 2/14/2024 | 12:10:00 AM | 42.4632 | -83.0219 | 0 | Weekday |
| 1 | 2/14/2024 | ... | ... | ... | ... | ... |
| 1 | 2/14/2024 | 9:00:00 AM | 42.4770 | -83.0272 | 9 | Weekday |
| 1 | 2/14/2024 | 9:10:00 AM | 42.4781 | -83.0273 | 9 | Weekday |
| 1 | 2/14/2024 | ... | ... | ... | ... | ... |
| 1 | 2/14/2024 | 16:00:00 PM | 42.3241 | -83.4339 | 16 | Weekday |
| 1 | 2/14/2024 | 16:10:00 PM | 42.3221 | -83.4338 | 16 | Weekday |
| 1 | 2/14/2024 | ... | ... | ... | ... | ... |
| 1 | 2/14/2024 | 23:30:00 PM | 42.4634 | -83.0157 | 23 | Weekday |

FIG. 7B

| Mobile Computing Platform_ID | Date | Time | Latitude | Longitude | Hour | Day_Type | Location_cluster |
|---|---|---|---|---|---|---|---|
| 1 | 2/14/2024 | 12:00:00 AM | 42.4626 | -83.0157 | 0 | Weekday | 0 |
| 1 | 2/14/2024 | 12:10:00 AM | 42.4632 | -83.0219 | 0 | Weekday | 0 |
| 1 | 2/14/2024 | 12:20:00 AM | 42.4632 | -83.0252 | 0 | Weekday | 1 |
| 1 | 2/14/2024 | 12:30:00 AM | 42.4632 | -83.0267 | 0 | Weekday | 1 |
| 1 | 2/14/2024 | 12:40:00 AM | 42.4651 | -83.0268 | 0 | Weekday | 1 |
| 1 | 2/14/2024 | ... | ... | ... | ... | ... | ... |
| 1 | 2/14/2024 | 9:00:00 AM | 42.4770 | -83.0272 | 9 | Weekday | 5 |
| 1 | 2/14/2024 | 9:10:00 AM | 42.4781 | -83.0273 | 9 | Weekday | 6 |
| 1 | 2/14/2024 | 9:20:00 AM | 42.4921 | -83.0300 | 9 | Weekday | 7 |
| 1 | 2/14/2024 | ... | ... | ... | ... | ... | ... |
| 1 | 2/14/2024 | 16:00:00 PM | 42.3241 | -83.4339 | 16 | Weekday | 10 |
| 1 | 2/14/2024 | 16:10:00 PM | 42.3221 | -83.4338 | 16 | Weekday | 11 |
| 1 | 2/14/2024 | 16:20:00 PM | 42.3333 | -83.4352 | 16 | Weekday | 12 |
| 1 | 2/14/2024 | 16:30:00 PM | 42.3409 | -83.4419 | 16 | Weekday | 13 |
| 1 | 2/14/2024 | ... | ... | ... | ... | ... | ... |
| 1 | 2/14/2024 | 23:30:00 PM | 42.4634 | -83.0157 | 23 | Weekday | 8 |
| 1 | 2/14/2024 | 23:40:00 PM | 42.4633 | -83.0186 | 23 | Weekday | 9 |
| 1 | 2/14/2024 | 23:50:00 PM | 42.4632 | -83.0241 | 23 | Weekday | 10 |
| 1 | 2/15/2024 | 12:00:00 AM | 42.3231 | -83.4339 | 0 | Weekday | 2 |
| 1 | ... | ... | ... | ... | ... | ... | ... |
| 1 | 3/14/2024 | 23:50:00 PM | 42.4632 | -83.0267 | 23 | Weekday | 12 |

FIG. 8B

900B

| Mobile Computing Platform_ID | Day_Type | Hour | location_entropy |
|---|---|---|---|
| 1 | weekday | 0 | 0 |
| 1 | weekday | 1 | 1.025586524 |
| 1 | weekday | 2 | 2.921928095 |
| 1 | weekday | 3 | 2.235926351 |
| 1 | ... | ... | ... |
| 1 | weekday | 19 | 0 |
| 1 | weekday | 20 | 0 |
| 1 | weekday | 21 | 2.646782222 |
| 1 | weekday | 22 | 4.129959427 |
| 1 | weekday | 23 | 1.584962501 |
| 1 | weekend | 0 | 1.255863359 |
| 1 | weekend | 1 | 0 |
| 1 | weekend | 2 | 0 |
| 1 | weekend | 3 | 2.807354922 |
| 1 | ... | ... | ... |
| 1 | weekend | 19 | 2.321928095 |
| 1 | weekend | 20 | 2.321928095 |
| 1 | weekend | 21 | 2.584962501 |
| 1 | weekend | 22 | 1 |
| 1 | weekend | 23 | 1.584962501 |

FIG. 9B

SYSTEM AND METHOD FOR CLASSIFYING A LOCATION PROFILE USING A ROUTE MAP OF CIPHERED LOCATION DATA

CROSS-REFERENCE

This U.S. Patent Application is related to U.S. patent application Ser. No. 19/330,373 entitled "SYSTEM AND METHOD FOR CLASSIFYING A LOCATION PROFILE USING LOCATION DATA", and is related to U.S. patent application entitled "SYSTEM AND METHOD FOR CLASSIFYING A LOCATION PROFILE USING A ROUTE MAP OF CIPHERED LOCATION DATA" filed under Ser. No. 19/637,478, the entire contents of which are incorporated herein by reference.

FIELD

The subject matter disclosed relates generally to computer implementations for training classification models and generating outputs with classification models to classify and/or characterize a location profile, and, in some embodiments, to methods, systems, and non-transitory computer readable media encoded with program code for classifying a location profile based on location entropy values and/or virtual routes derived from location data.

Disclosed herein are techniques for training machine learning algorithms using location entropy values and/or virtual routes derived from location data. Data collected by systems and/or methods disclosed herein and/or any data used to train machine learning algorithms and/or models disclosed herein may include data that has been lawfully collected. Some data may be governed by a general legal right, others by consent, for example. This may apply to data collection and/or use by governmental and/or regulatory bodies and by users of such disclosed systems and methods and the data collected by systems and/or methods disclosed herein and/or any data used to train machine learning algorithms and/or models disclosed herein. Data that is or has been deemed inappropriate for collection or use might not be collected or used for disclosed systems and/or methods.

BACKGROUND INFORMATION

U.S. patent Ser. No. 11/206,543 to Do et al. (incorporated by reference in its entirety) discloses a method that monitors data security events and geographic locations of mobile devices, uses classifiers trained on demographic information to predict security risks, and activates appropriate security measures based on these predictions, ensuring adaptive security protocols are enabled or disabled accordingly.

U.S. patent Ser. No. 11/138,615 to Das et al. (incorporated by reference in its entirety) discloses a method and system that utilize location history data from multiple users to identify attributes of a business location by training a classifier with pre-assigned attribute labels and machine learning, determining likelihood values, and updating business listing records with identified attributes based on user visiting patterns and categories.

U.S. patent Ser. No. 11/706,628 to Kudtarkar (incorporated by reference in its entirety) discloses network security platform that configures a security policy with security rules for devices, installs a security application on routers and devices, and monitors internet access to block malicious content and enforce parental controls, ensuring consistent security across both home and public networks.

U.S. patent Ser. No. 11/829,447 to Lu (incorporated by reference in its entirety) discloses a data-driven resident area prediction method using an area relationship model that incorporates resident area data, visiting POI data, and basic attribute information, leveraging deep learning and multi-task learning to determine time-sequence relationships and predict user resident areas accurately.

U.S. patent Ser. No. 11/928,567 to Elisha et al. (incorporated by reference in its entirety) discloses a method and system to improve machine learning model-based classification of data items by identifying and removing inaccurate training data and training classification models on accurate revised training data sets.

U.S. patent Ser. No. 12/175,344 to Wick et al. (incorporated by reference in its entirety) discloses systems and methods for generating a trained classifier model with enforced fairness using data sets for training with known characteristics including a known amount of label bias, a known discrepancy between rarity of features and a known amount of selection bias. Wick also discloses general techniques for training machine learning classifiers.

The disclosed remapping methods and entropy calculation methods are not taught in the prior art. For example, IBM (US20200012797A1) discusses FPE for location data but does not teach entropy-preserving remapping of vectors. TWILIO (US20240020414A1) discusses general entropy-based de-identification but does not teach remapping vectors while preserving location entropy values and location-specific, cluster-based, time-window-based entropy calculation. The prior art does not teach the specific combination of remapping distance/direction vectors while preserving location entropy values for classification, nor does the prior art teach using entropy values calculated from location data clusters for location profile classification.

Governments, communities, and organizations continue to develop law and policies surrounding the use of artificial intelligence, especially in areas wherein the artificial intelligence is making decisions or substantially assisting human decision making such as screening resumes, editing documents, adjusting accounts, etc. Consultation with appropriate legal counsel may be advisable when integrating artificial intelligence into relevant systems and methods.

SUMMARY

A system is disclosed for classifying a location profile. The system can include a location characteristic database, memory, and a processor coupled to the memory. The processor can be configured with program code stored in the memory that when executed can cause the processor to capture a time series of live coarse location data from a mobile computing platform traveling along a route. The program code can cause the processor to generate virtualized coordinates for a virtual path corresponding to the live coarse location data along the route. The program code can cause the processor to determine a distance value and a direction value between each virtualized coordinate for the virtual path. The program code can cause the processor to remap the distance values and the direction values for the virtualized coordinates with a remapping function to generate remapped distance values and remapped direction values for a remapped virtual path. The program code can cause the processor to generate an output classification for the mobile computing platform using a trained classification model based on inputting a remapped virtual path to the trained classification model. The program code can cause the processor to store the output classification and the remapped virtual path associated in the location characteristic database. The program code can cause the processor to associate the remapped virtual path and the output classification with an account identifier for the mobile computing platform in the location characteristic database. The program code can cause the processor to update a data field associated with an account identifier in the location characteristic database to take action on an account corresponding to the account identifier.

A system is disclosed for training a model to classify a route based on location data. The system can include memory, a location characteristic database, and a processor coupled to the memory. The processor can be configured with program code stored in the memory that when executed can cause the processor to store location data for a route of a mobile computing platform in the location characteristic database. The program code can cause the processor to generate remapped location data based on the location data for the route using a remapping function. The program code can cause the processor to train a machine learning algorithm based on the remapped location data and a ground truth label for a location profile to generate a trained classification model.

A system is disclosed for classifying a location profile. The system can include a location characteristic database, memory, and a processor coupled to the memory. The processor can be configured with program code stored in the memory that when executed can cause the processor to capture live coarse location data from a mobile computing platform traveling along a route. The program code can cause the processor to generate virtualized coordinates for a virtual path corresponding to the live coarse location data along a route including a distance value and a direction value between each virtualized coordinate for the virtual path. The program code can cause the processor to remap the distance values and the direction values for the virtualized coordinates with a remapping function to generate remapped distance values and remapped direction values for a remapped virtual path. The program code can cause the processor to generate a live location profile including an output classification for the mobile computing platform using a trained classification model based on inputting a remapped virtual path to the trained classification model. The program code can cause the processor to generate ideal location profiles for classification. Each ideal location profile can be associated with a ground truth label. The program code can cause the processor to compute a Kullback-Leibler (KL) divergence model for at least two ideal location profiles. The KL divergence model can span values from 0 and 1. A KL divergence metric for a location profile closer to 0 can indicate that characteristics of a location profile are classified into a first category of classification associated with a first ground truth label. A KL divergence metric for a location profile closer to 1 can indicate that the characteristics of a location profile are classified into a second category of classification associated with a second ground truth label. The program code can cause the processor to determine a KL divergence metric for the live location profile and compare the KL divergence metric to the first ideal location profile and the second ideal location profile. The program code can cause the processor to calculate a Jensen-Shannon (JS) divergence for the live location profile to classify the live location profile as more closely matching the first ideal location profile or the second ideal location profile. The program code can cause the processor to store the live location profile, the JS divergence, and the remapped virtual path associated in the location characteristic database. The program code can cause the processor to associate the location profile with an account identifier for the mobile computing platform in the location characteristic database. The program code can cause the processor to update a data field associated with an account identifier in the location characteristic database to take action on an account corresponding to the account identifier.

A system is disclosed for preserving privacy of a location profile. The system can include a location characteristic database configured to store previously collected coarse location data corresponding to routes of a mobile computing platform and live coarse location data of a mobile computing platform, memory, and a processor coupled to the memory. The processor can be configured with program code stored in the memory that when executed can cause the processor to generate virtualized coordinates for virtual paths corresponding to coarse location data collected along routes for mobile computing platforms. The program code can cause the processor to determine distance values and direction values between each virtualized coordinate for the virtual paths. The program code can cause the processor to remap the distance values and the direction values for the virtualized coordinates with a hash-based remapping function to generate remapped virtualized coordinates for remapped virtual paths. The program code can cause the processor to store the remapped virtualized coordinates in the location characteristic database to preserve privacy of coarse location data. The program code can cause the processor to train a machine learning algorithm with the remapped virtualized coordinates to generate a classification model configured to classify the virtual paths and preserve privacy of routes of a mobile computing platform.

A system is disclosed for preserving privacy of a location profile. The system can include a location characteristic database configured to store previously collected coarse location data corresponding to routes of a mobile computing platform and live coarse location data of a mobile computing platform, memory, and a processor coupled to the memory. The processor can be configured with program code stored in the memory that when executed can cause the processor to generate virtualized coordinates for virtual paths corresponding to coarse location data collected along routes for mobile computing platforms. The program code can cause the processor to determine distance values and direction values between each virtualized coordinate for the virtual paths. The program code can cause the processor to encrypt the distance values and the direction values for the virtualized coordinates with a key and a format preserving encryption (FPE) function to generate encrypted virtualized coordinates. The program code can cause the processor to store the encrypted virtualized coordinates and the key in the location characteristic database to preserve privacy of coarse location data. The program code can cause the processor to train a machine learning algorithm with the encrypted virtualized coordinates to generate a classification model configured to classify the virtual paths and preserve privacy of routes of a mobile computing platform.

A method is disclosed for classifying a location profile. The method can include capturing a time series of live coarse location data from a mobile computing platform traveling along a route. The method can include generating virtualized coordinates for a virtual path corresponding to the live coarse location data along the route. The method can include determining a distance value and a direction value between each virtualized coordinate for the virtual path. The method can include remapping the distance values and the direction values for the virtualized coordinates with a remapping function to generate remapped distance values and remapped direction values for a remapped virtual path. The method can include generating an output classification for the mobile computing platform using a trained classification model based on inputting a remapped virtual path to the trained classification model. The method can include associating the remapped virtual path and the output classification with an account identifier for the mobile computing platform in the location characteristic database. The method can include updating a data field associated with an account identifier in the location characteristic database to take action on an account corresponding to the account identifier.

A method is disclosed for preserving privacy of a location profile. The method can include receiving coarse location data for a mobile computing platform traveling along a route. The method can include generating virtualized coordinates for a virtual path corresponding to the coarse location data. The method can include determining distance values and direction values between each virtualized coordinate for the virtual path. The method can include remapping the distance values and the direction values for the virtualized coordinates with a remapping function to generate remapped virtualized coordinates. The method can include training a machine learning algorithm with the remapped virtualized coordinates to generate a classification model configured to classify a remapped virtual path and preserve privacy of the route of the mobile computing platform.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which:

FIGS. 7A and 7B are diagrams of exemplary location data as disclosed herein.

FIGS. 8A and 8B are diagrams of exemplary location datasets including location data clusters as disclosed herein.

FIGS. 9A and 9B are diagrams of exemplary location data arrays including location entropy values as disclosed herein.

DETAILED DESCRIPTION

Figure 1A:
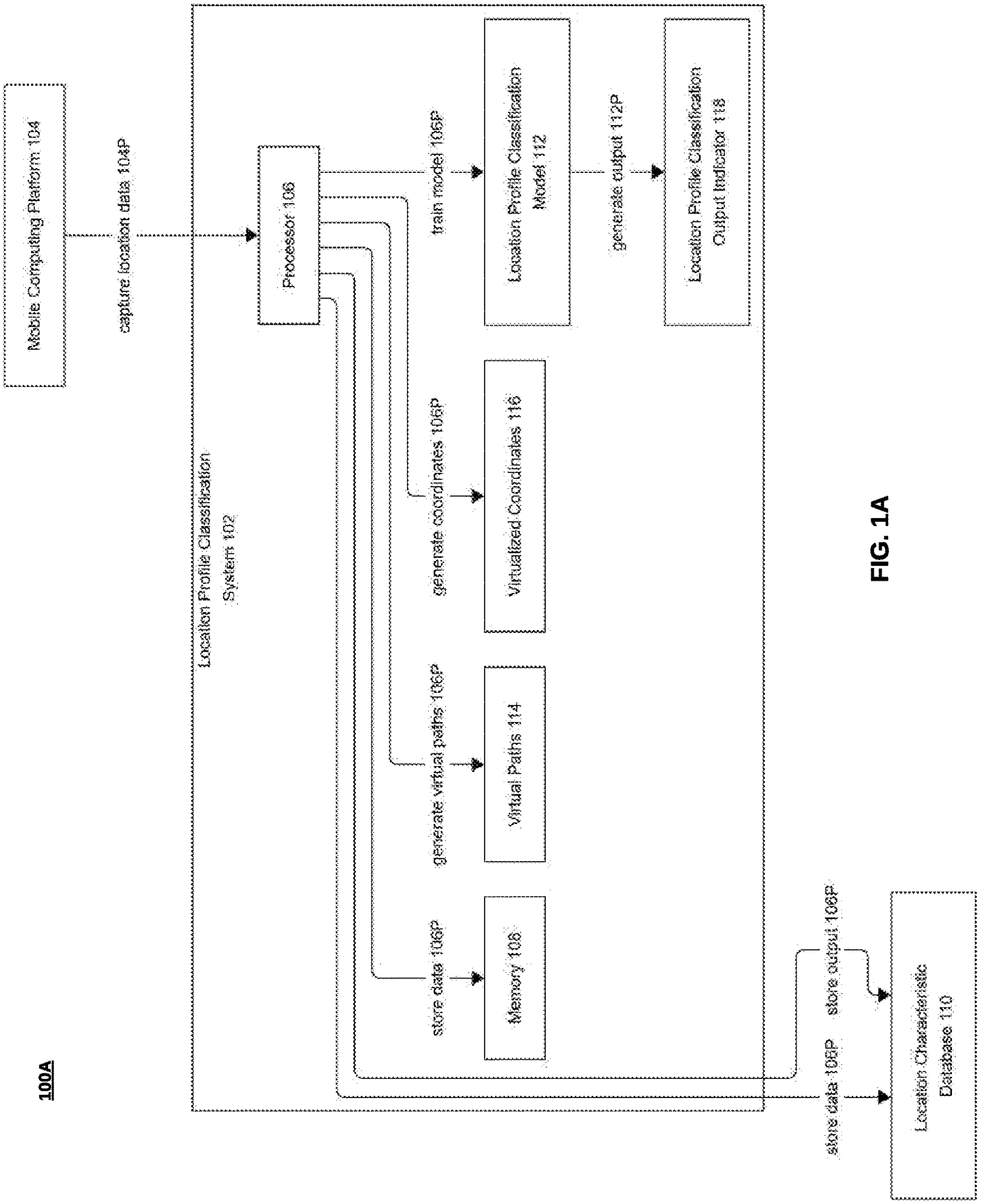
FIG. 1A is a diagram of an exemplary system configuration and component functions for classifying a location profile based on remapped virtual paths as disclosed herein.

Conventional location-based classification systems face a fundamental conflict between privacy and functionality. To classify location profiles accurately, conventional systems require absolute location coordinates (e.g., GPS coordinates, latitude/longitude pairs) that reveal actual geographic locations. This requirement compromises user privacy, as absolute coordinates can be used to identify specific locations, routes, and even users. However, without absolute coordinates, conventional classification systems cannot function because they rely on distance metrics (e.g., Euclidean distance, Mahalanobis distance) that require absolute coordinate values.

The disclosed systems solve this technical problem at least by: (1) converting absolute coordinates to virtualized coordinates with a (0,0) origin, removing absolute location information while preserving relative spatial relationships; (2) representing paths as distance/direction vectors, enabling efficient processing while preserving path shape; (3) remapping vectors while preserving location entropy values, adding privacy protection while maintaining classification capability; and (4) using KL/JS divergence with location entropy values for classification, enabling classification without absolute coordinates.

This solution provided by disclosed embodiments enables privacy-preserving location profile classification that cannot be performed using systems requiring absolute location coordinates, solving a technical problem that existing systems cannot solve.

The systems and methods disclosed herein can determine an accurate classification of a type and/or characteristics of a location profile using virtual paths corresponding to a route of travel of a mobile computing platform and/or location entropy values calculated from location data. That is, in some configurations, the system utilizes remapped virtual routes and/or calculated entropy (randomness) data of locations of a mobile computing platform associated with a user to generate these inferences (classifications) rather than relying on absolute positions (GPS coordinates) of the mobile computing platform associated with the user. A virtual path can include location data that is virtualized (e.g., coordinates that maintain a relative location relationship between coordinates, but do not possess an absolute location and/or position) and includes coordinates for location data points plotted and/or defined in a normalized coordinate system. A remapped virtual path can include the virtualized coordinates remapped to a different coordinate and/or encryption space (e.g., encryption, hash-based, etc.). The remapped virtual paths can enhance privacy of location data while preserving location entropy such that systems can still use calculated location entropy for classification even where remapped virtual paths are generated. Moreover, since the absolute position of the mobile computing platform associated with the user doesn't need to be captured, users of the system may be afforded a higher degree of privacy than systems relying on absolute positions. Based on the remapped virtual paths and/or entropy data, the system can determine one or more characteristics of the mobile computing platform associated with the user and perhaps take an account action on an account associated with the mobile computing platform and/or the user. In other applications, the system can be used to detect customer fraud, factual misrepresentations, or determine demand for a new product or service. As discussed herein, remapped virtual paths, entropy data, and/or entropy values are interchangeable terms.

Location data that the system can capture may include location data from a mobile computing platform (e.g., a mobile device within a vehicle) that may have reduced accuracy when compared to absolute location data (GPS coordinates). While location data may not include information and location accuracy (e.g., to maintain privacy of a user of a mobile computing platform and/or a mobile computing platform within a vehicle), such location data can be manipulated and used to generate virtualized coordinates for virtual paths (e.g., relative location data without an absolute location), determine location entropy values (e.g., a measure of randomness of the location data) and/or for feature engineering to generate features and inputs that can serve as training data for training a machine learning model (e.g., a classifier model). The systems and methods can engineer features using the location data, virtualized coordinates (or remapped virtualized coordinates), and/or the location entropy values from a mobile computing platform in order to produce a large amount of training data. The systems and methods can use the training data to examine time-based events and to generate location profiles (e.g., "signatures") corresponding to locations of a mobile computing platform over time including virtual paths, remapped virtual paths, and/or location entropy values. Systems and methods can use the location profiles, virtual paths, and features to train a machine learning model (e.g., a classifier) to accurately determine a classification of a type and/or characteristics of a location profile by examining time-based location entropy values and/or relative locations (including shapes of virtual paths) of a mobile computing platform. The disclosed systems and methods can use the virtual paths and/or location entropy values (e.g., generated from the location data) in the location profiles to generate an accurate classification of a location profile. The systems and methods can also use virtual paths and/or location entropy values to reduce the need for collection and/or use of any private location data relating to an exact location of a mobile computing platform (e.g., associated with a user). Training a machine learning algorithm using location profiles including virtual paths and/or location entropy values eliminates the need for training machine learning algorithms directly on exact/absolute location data of a mobile computing platform (e.g., associated with a user). Thus, privacy of location data of a mobile computing platform can be preserved. In addition, the collection of location data described herein rather than exact/absolute location data, such as Global Positioning System (GPS) coordinates, can help protect the privacy of users of mobile computing platforms.

Systems and methods provide improvement in a computer and in machine learning classification technology by using features of location profiles, including virtual paths and path shapes, having location entropy values generated from location data. The disclosed systems and methods can use the features to reduce the amount of data (e.g., location data) that needs to be collected from mobile computing platforms, while simultaneously generating new and meaningful features (e.g., time-based features) using virtual paths and/or location entropy values that can enhance training of a machine learning algorithm for classification. Disclosed systems and methods can also use the features to increase efficiency of training a machine learning algorithm while reducing resources required to train the algorithm. Using the virtual paths and/or location entropy values and time-based features, systems and methods can generate an accurate classification model for classifying a type and/or characteristics of a location profile for a mobile computing platform.

Systems and methods disclosed herein employ novel data features and techniques by generating remapped virtual paths, location entropy values, and/or using time-based location entropy values for training a machine learning algorithm. Systems and methods that use remapped virtual paths and/or time-based location entropy values and location profiles as described herein are not well-known, routine, or conventional techniques in machine learning and/or classification of location profiles. Systems and methods disclosed can generate and use such features, virtual paths, and/or location entropy values to reduce the need to collect and/or store private location data while simultaneously training accurate classification models for improved prediction of a type and/or characteristic of a mobile computing platform based on virtual paths and/or location entropy values derived from location data.

The system and method may be programmed to perform an account action in various ways. For example, the system and method may perform an account action directly, by suggestion, by identification, or by messaging an operator. This account action may be the result of the system and method determining a likelihood or decision that a specific user has a specific characteristic based on the virtual paths and/or entropy data of an associated mobile device or vehicle. In each of the four scenarios (direct, suggestion, identification, or message), the amount of autonomous control (e.g. A.I. powered decision making and implementation without human consideration or control) is different. As proposed, the amount of autonomous control of the system and method is highest with direct actions, second highest by suggestions, third highest with identification, and lowest by messaging. Here are some examples for context:

Directly execute an account action: such as updating one or more data fields of an account, changing a price on an insurance policy (e.g., insurance policy data within an account associated with a policy identifier), or changing an account type. In this instance, location profile classification system 102 can access the one or more data fields of the account by accessing location characteristic database 110 (e.g., storing the account) and updating the one or more data fields of the account on the backend of the system, where location profile classification system 102 (or processor 106 thereof) is authorized to access the accounts stored in location characteristic database 110;

Suggesting an account action: such as displaying a recommended update to an operator, where an operator can provide an input to accept a recommended update for an account, or highlighting a price change to allow an operator to commit to an insurance policy, prompting the operator to switch an account type through a software interface;

Identifying an account action: such as displaying a possible account update for an account associated with a user to an operator with a computer-generated reasoning, indicating to the operator to change a pricing field in the account associated with the user with some recommendations as to new pricing, flagging a user's account to be considered for a change;

Messaging an account action: such as sending a message (could be on a different platform such as direct messaging or group messaging service (Facebook or Slack, etc.), or a messaging service within the same platform) to an operator to make an account update for a specific user; sending a text message to an operator to review a proposed change to a user's pricing, or providing a visual indication in a software interface to consider updating a user's account for a proposed reason.

In all cases, the system and method may be able to provide the operator with a report, list of recommendations, and/or a rationale for making the recommendations. Additionally, configurations of the system and methods may contain human-overrides or reminder notifications requesting an operator to review and/or approve an account action before the account action is executed for safety purposes. In this application, unless otherwise explicitly stated, the system and method can potentially use at least any of these four variations for a specific account action. So, for example, if the system and method were configured to "update a data field associated with an account identifier in the location characteristic database to take action on an account corresponding to the account identifier," the term "update a data field" may include at least (i) directly updating the data field, (ii) suggesting an update to a data field to the operator, (iii) identifying a data field to the operator to update, and (iv) messaging the operator to make an update to a data field.

In another configuration, a method may include: "generating a new account having a new account type associated with the location profile in the location characteristic database." So, "generating a new account" may include at least: (i) directly generating an account, (ii) suggesting the operator generate a new account using the system, (iii) identifying a new account for the operator to generate, (iv) messaging an operator to generate a new account.

As explained previously, organizations should consult with appropriate A.I. and privacy counsel as to specific laws and policies that may govern best practices for implementing any of the embodiments and/or configurations of the present invention as generally described herein.

Systems and methods described herein can use various other techniques and/or data to improve privacy of mobile computing platform 104 and/or users of mobile computing platform 104. For example, systems and methods can generate a route privacy remapping (e.g., a remapped virtual path) to chart a route trace of a mobile computing platform. Such privacy route mapping can be referred to herein as route mapping, virtual paths, remapped virtual paths, route trace, and/or the like. Systems and methods can use route mapping to secure location data collected from mobile computing platforms for route privacy where a route map can hide an original route (e.g., made up of location data points) of a mobile computing platform while also preserving equivalent location entropy values that could be determined from the original route. Processor 106 can use route mapping to re-map routes and/or location data points to another space, and a pattern of spread for a location profile and associated location entropy values can be preserved. For example, location data for a route trace can be stored in location characteristic database 110 as coordinates where the coordinates are generated and/or plotted on a relative coordinate system for the route trace such that the coordinates are de-identified from actual locations. The relative coordinate system may include an arbitrary origin point such that the shape of the route trace can be captured, but the coordinates of the route trace are not connected to any actual locations (e.g., addresses, latitude/longitude points, and so forth). Systems can rebuild (or reconstruct) a remapped virtual path (e.g., an image and/or shape of a virtual path) from the stored coordinates of the relative coordinate system to retrieve and/or verify the route trace.

Systems and methods can generate a route privacy mapping (e.g., a remapped virtual path) by ciphering and/or remapping location data with Format Preserving Encryption (FPE) to keep location data private in a generated route map corresponding to the location data. For example, systems and methods can generate a non-keyed version of a route map based on location data that references start and end positions with a route shape connecting the start and end positions. The route shape shows the travel of a mobile computing platform, but the route shape is not connected or referenced with any actual known (e.g., absolute) locations. For example, a route map can include a start and end location with a route shape connecting the locations (e.g., as virtualized coordinates). In this way, a route map can include another representation of a location profile. The route map provides information of the shape of the path that a mobile computing device takes but does not associate the route with actual location data. Thus, systems and methods can use route mapping to preserve the shape of a path taken by a mobile computing platform and thus preserve location entropy values without requiring referenced location data (e.g., coordinates) to keep the location data private. In this way, a route map acts as a virtual path that does not reference actual/absolute locations. However, the route map can still preserve location entropy values and can be used by systems and methods to determine a classification of a location profile.

For generating privacy route mappings, systems and methods can collect location data from a mobile computing platform as the mobile computing platform moves about. The location data can be stored in a location characteristic database. Systems and methods can use FPE to create a deterministic hashed-based mapping of the location data to generate a route map. Systems and methods (e.g., a location characteristic database) can maintain original location data collected from the mobile computing device in order to decrypt and/or verify correspondence between a route map and original location data. Systems and methods can use privacy route mapping and route maps to preserve privacy of the collected location data (e.g., the original location data) such that the route maps can be shared and reused without the need to share or reuse the original location data. Only a system storing the original location data can know and/or have access to the original location data and thus have access to actual locations and/or real movements of the mobile computing platform. Systems and methods can use the original location data (e.g., stored in a location characteristic database) as a key to decrypt the route maps to obtain original location data. Thus, systems and methods can create route maps as publicly safe data that preserves location entropy values without revealing private location data of a mobile computing platform and/or a user of the mobile computing platform. Systems and methods can correlate the route maps back to the original location data when required (e.g., when authorized, for example, by a user). Thus, systems using a FPE function to remap routes (e.g., virtualized coordinates and/or virtual paths) can use remapped virtual paths as direct inputs to train machine learning algorithms such that patterns of remapped virtual paths can be recognized and learned to generate trained classifier models. An FPE function allows for virtualized coordinates to be remapped to protect privacy while also maintaining a relative location for the path such that the virtual path and/or location data can be properly learned and analyzed by a machine learning algorithm such that location profiles can be classified using a trained classifier model.

In some instances, a location profile classification system and a location characteristic database can store the original location data collected from a mobile computing platform. A location profile classification system may be the only system authorized to access the original location data stored in a location characteristic database and therefore the only system authorized to make direct changes and/or updates to accounts (e.g., one or more data fields of accounts) stored in the location characteristic database. In some instances, a location profile classification system (and a processor thereof) can directly access the location characteristic database to update a data field of an account by accessing the account on the backend system through direct access to the location characteristic database.

The system and methods may be configured to effect certain updates/effect an account action, etc. The system and method may also be configured to recommend a certain update or certain account action to be approved by a person, such as an operator. The recommendation may be implemented as a flag on an associated account, the system or method may send a message for a human to approve the update or account action, implement the account action and request a human to approve the action, etc.

As used herein, the term "resource" can refer to an individual (e.g., a person) that owns, uses, carries, operates, and/or otherwise possesses the mobile computing platform (e.g., mobile computing platform 104) when location data is collected from the mobile computing platform such that the location data collected from the mobile computing platform is associated with and/or related to a location of the resource. A resource can be a person carrying a mobile computing platform, driving a vehicle including an integrated mobile computing platform, or wearing a device (e.g., a smartwatch) including an integrated mobile computing platform. A resource can also include an operator of the mobile computing platform, such as a computer and/or software program that operates a vehicle and/or operates the mobile computing platform integrated in another device, such as a vehicle, a smartwatch, a mobile phone, and/or the like.

As used herein, the term "operator" can refer to an individual (e.g., a person) that, owns, uses, manages, administrates, and/or otherwise provides a service for an account that can be effected by an account action provided by location profile classification system 102. For example, an operator can include a third party as compared to a resource and/or a user and a mobile computing platform. An operator can interact with management and/or administrative functions for an account associated with a resource and/or a user, such that the operator can approve and/or deny account actions provided by location profile classification system 102. In some instances, an operator can also include an individual that owns, uses, manages, administrates, and/or otherwise provides location profile classification system 102, such that an operator can configure and/or control location profile classification system 102.

The systems and methods may also be used to detect customer fraud. For example, the systems and methods may be used to verify whether a customer (e.g. a resource of the mobile device) has supplied information about his or her use of a vehicle and/or a mobile computing platform which is inconsistent with the actual use of his or her vehicle and/or mobile computing platform. In such an example, the system and method may determine a characteristic about a location profile associated with a resource (or customer) and compare whether the determined characteristic matches a disclosure about that characteristic supplied by the resource and/or user in account data. If the determined characteristic does not match the disclosed characteristic within a threshold similarity or level, the system and methods may be configured to take an account action or recommend an account action to be taken. For example, configurations of the present invention may be used to determine where a customer parks his car overnight or whether he commutes to work every day.

The systems and methods may be used to determine demand and/or number of potential customers interested in purchasing an insurance product. The systems and methods may calculate how many individuals might qualify for a specific insurance product. For example, an insurance company might want to offer an insurance product for customers that primarily drive at night, have two primary work locations, deliver packages, etc. Such an insurance product might be cheaper or more expensive to provide depending on potentially how many of its customers might qualify for this insurance product. Implementations of the systems and methods can be used to determine how many location profiles likely have a specific characteristic such as whether the resources associated with mobile computing devices drive primarily at night. The systems and methods could generate a recommendation to offer a specific insurance product based on the specific characteristic.

Systems and methods disclosed herein can use the classification output from a classifier model to take actions on existing data, such as updating one or more data fields stored in a database associated with an account. Systems and methods may update or recommend an update to data fields of an account to reduce the need for excessive processing and data storage for account data (e.g., user accounts). For example, a location profile classification can be used to update or recommend an update to a data field in a database storing data corresponding to a user account to lock or unlock the account from performing certain actions within a network. Additionally, systems and methods may update or recommend an update to data fields of an account such that the updated data field can effect an update or recommend an update to a user interface on a mobile computing platform. In one example, systems and methods may update or recommend an update to a data field in a database storing user account data for accounts related to insurance for vehicles. The systems and methods may use the updated data field to approve or deny (or recommend approval or denial of) an insurance claim based on claim data stored in the database via the classification output from the trained classification model (e.g., where a location profile of a mobile computing platform is classified as gig worker, ride share, etc.). In some embodiments, a location profile classification can be directly used to calculate and/or update an insurance premium data field in a user account, (e.g., the classifier model generates an output identifying a location profile as a mobile computing platform associated with a user who works from home, thereby indicating the user of the mobile computing platform does not commute for work).

In accordance with exemplary embodiments, computing systems having specially configured processors and memory storing program code for performing functions described herein can be used for classifying a location profile based on virtual paths and/or location entropy values derived from location data. According to some embodiments, computing systems with a specially configured processor and memory storing program code for classifying a location profile based on virtual paths and/or location entropy values derived from location data can enhance location profile classification through use of specially trained machine learning models using virtual paths and/or location entropy values and a processor configured to extract meaningful features from the virtual paths and/or location entropy values for training the machine learning models. According to some embodiments, computing systems with a specially configured processor and memory storing program code for classifying a location profile based on virtual paths and/or location entropy values derived from location data can reduce the need for collecting sensitive data from mobile computing platforms and/or users of mobile computing platforms by relying on collection of location data for generating time-based, de-identified features and/or de-identified route paths having virtualized coordinates for training machine learning algorithms.

Embodiments disclosed herein can improve upon existing computing systems and classifier models that may require large amounts of sensitive location data for training, while also generating accurate classification results. Embodiments can maintain privacy of location data by virtualizing and/or remapping location coordinates before the location coordinates are used to train machine learning algorithms. Thus, machine learning algorithms can learn shapes and/or patterns of travel of a mobile computing platform without knowing actual/absolute locations of the mobile computing platforms. Additionally, remapped virtual paths (e.g., virtualized coordinates) can be securely stored in databases without concern for revealing absolute locations of mobile computing devices. The remapped virtual paths (e.g., as virtualized coordinates) can be accessed in the database by authorized systems to rebuild and/or reconstruct the remapped virtual path (e.g., as an image) to preserve the shape and/or pattern of the remapped virtual path. Absolute location data may only be obtained by, for example, reversing the FPE function (e.g., using a key) or obtained only by a system that collected and/or maintains the originally collected location data.

As used herein, "preserve privacy" or "preserving privacy" refers to preventing disclosure of absolute location coordinates (e.g., GPS coordinates, latitude/longitude pairs) that would reveal the actual geographic locations of a mobile computing platform or routes taken by a mobile computing platform. Privacy is preserved through techniques including: (1) de-identifying absolute location coordinates by converting them to relative coordinate systems with arbitrary origin points; (2) remapping virtualized coordinates using remapping functions (e.g., FPE, hash-based functions) that transform coordinates while preserving location entropy values; or (3) storing and processing only virtualized or remapped coordinates without requiring or storing absolute location coordinates. A system "preserves privacy" when it enables classification of location profiles based on path shape patterns and entropy characteristics derived from virtualized or remapped coordinates without requiring access to absolute location coordinates.

As used herein, "absolute location coordinates" refers to coordinate values that represent actual geographic positions on Earth's surface, such as GPS coordinates (latitude and longitude pairs), street addresses, or other coordinate systems that directly identify real-world geographic locations. Absolute location coordinates reveal the actual geographic positions of a mobile computing platform or routes taken by a mobile computing platform, and can be used to determine the physical location of a device or user. Examples of absolute location coordinates can include: (1) GPS coordinates (e.g., latitude 38.9072° N, longitude 77.0369° W); (2) latitude/longitude pairs in any coordinate system (e.g., WGS84, NAD83); (3) street addresses and/or postal codes that identify specific geographic locations; or (4) any coordinate values that can be directly mapped to real-world geographic positions. Absolute location coordinates differ from relative coordinates (e.g., virtualized coordinates) or remapped coordinates, which use arbitrary origin points and do not reveal actual geographic locations. Systems that require absolute location coordinates are systems that need actual geographic position data (e.g., GPS coordinates, latitude/longitude pairs) to perform location-based classification or analysis, and cannot operate using only relative or remapped coordinate data.

Figure 1B:
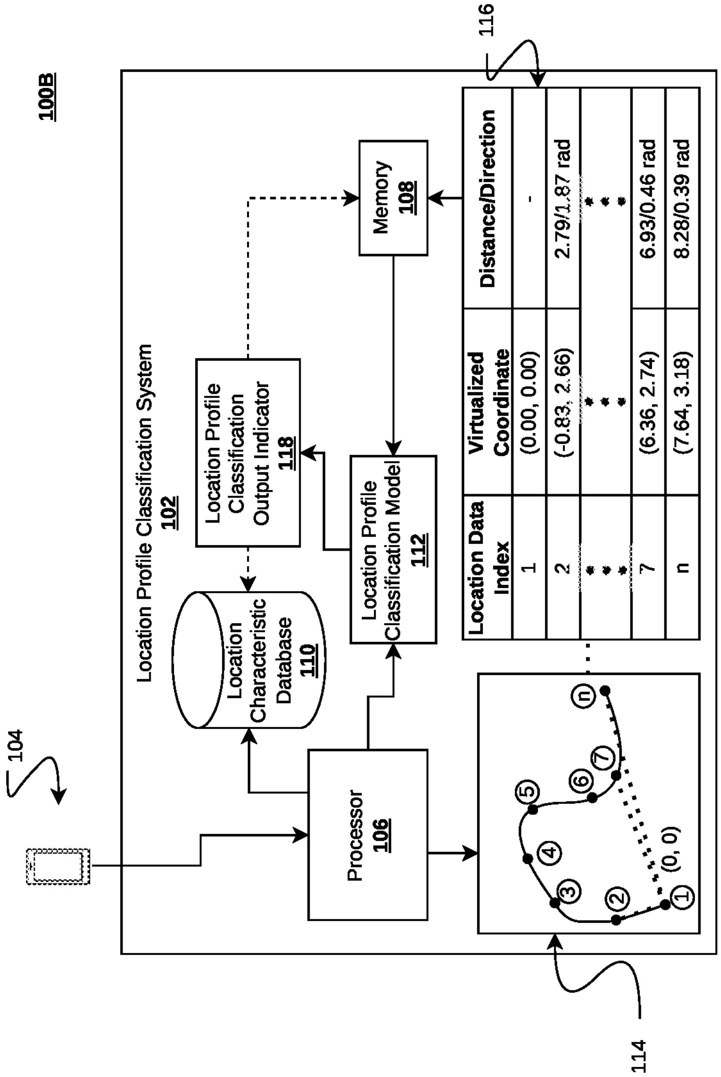
FIG. 1B is a diagram of an exemplary system configuration for classifying a location profile based on remapped virtual paths as disclosed herein.

FIGS. 1A and 1B show diagrams of an exemplary system configurations for classifying a location profile based on remapped virtual paths as disclosed herein. The various components of FIGS. 1A and 1B can be implemented with and/or integrated in a specially configured processor (e.g., a CPU) and/or on any number of specially configured distributed processors (e.g., a distributed and/or decentralized computing system) coupled with memory and connected via a communications network. Each of the components shown in FIGS. 1A and 1B are described in the context of an exemplary embodiment.

As shown in FIGS. 1A and 1, embodiments relate to a system 100A and/or system 100B configured for classifying a location profile based on remapped virtual paths and/or location entropy values derived from location data. System 100 can include location profile classification system 102, mobile computing platform 104, processor 106, memory 108, location characteristic database 110, location profile classification model 112, virtual paths 114, virtualized coordinates 116, and location profile classification output indicator 118. In some embodiments, location profile classification system 102 can include processor 106, memory 108 storing program code for execution by processor 106 and storing virtual paths 114 and virtualized coordinates 116, location profile classification model 112, and location profile classification output indicator 118 generated by location profile classification model 112.

Unlike conventional location-based classification systems that require absolute location coordinates (e.g., GPS coordinates, latitude/longitude pairs), the disclosed systems can classify location profiles using only relative coordinates and remapped virtual paths. This enables classification while maintaining privacy, which cannot be achieved using conventional systems. An example of a virtual path with virtualized coordinates is shown in FIG. 1B as virtual paths 114 and virtualized coordinates 116.

The disclosed remapping function preserves location entropy values while de-identifying absolute coordinates. The preservation of entropy is unexpected because conventional encryption/remapping methods typically destroy location entropy characteristics, particularly the location entropy characteristics described herein. The preservation of location entropy enables classification based on location entropy patterns, which is not possible with conventional remapping methods.

The use of distance/direction vectors enable efficient remapping operations while preserving path shape characteristics. This vector-based approach is more storage-efficient and computationally efficient than storing all coordinate points, while still enabling accurate classification and preservation of privacy and location entropy.

The cluster-based, time-window-based location entropy calculation method provides location-specific entropy values that capture location patterns useful for classification. This is more effective than general entropy-based de-identification methods that do not capture location-specific patterns.

The combination of entropy-preserving remapping with divergence-based classification provides improved classification accuracy compared to systems that use absolute coordinates, because the remapping preserves the essential characteristics (entropy, path shape) needed for classification while removing unnecessary information (absolute locations).

In some embodiments, system 100 can include location profile classification system 102, mobile computing platform 104, processor 106, memory 108, location characteristic database 110, location profile classification model 112, location data clusters (derived from location data and/or virtual paths 114), a location data array (derived from location data and/or virtualized coordinates 116), and location profile classification output indicator 118. In some embodiments, location profile classification system 102 can include processor 106, memory 108 storing program code for execution by processor 106 and storing location data clusters and a location data array, location profile classification model 112, and location profile classification output indicator 118 generated by location profile classification model 112. System 100 can use location entropy values and generate location data clusters based on captured location data even where system 100 generates virtual paths 114 because generated virtual paths 114 preserve location entropy of the captured location data.

Location profile classification system 102 can include a computing device connected to a network. In some embodiments, location profile classification system 102 can include components shown in FIG. 1 implemented in a single computing device or computing system. Alternatively, location profile classification system 102 can include components shown in FIG. 1 distributed across multiple computing devices and/or computing systems.

Location profile classification system 102 can be integrated with at least one server within a server system in a computing network. For example, location profile classification system 102 can be implemented in a server of a plurality of servers on-site or in a cloud environment for classifying a location profile based on location entropy values derived from location data.

Program code (e.g., software instructions) can be read into memory 108 from another computer-readable medium or from another device via a communication interface with location profile classification system 102. When executed, program code stored in memory 108 can cause processor 106 to perform one or more processes and/or functions described herein. Embodiments described herein are not limited to any specific combination of hardware circuitry and software and can include various combinations of hardware circuitry and software.

Location profile classification system 102 can be configured for classifying a location profile (e.g., based on virtual paths and/or location entropy values derived from location data). As disclosed herein, location profile classification system 102 can include a location characteristic database, memory, and a processor coupled to the memory. The processor can be configured with program code stored in the memory that when executed can cause the processor to perform various functions. For example, location profile classification system 102 can include memory 108, location characteristic database 110, and processor 106 coupled to memory 108. Processor 106 can be configured with program code stored in memory 108.

The program code stored in memory 108, when executed by processor 106, can cause processor 106 to perform various functions disclosed herein. The program code can include program code for an application (e.g., software application, software/hardware module, and/or the like) or a service (e.g., software service, microservice, and/or the like). Software applications and/or services can include interfaces which are treated as a public application programming interface (API). The software application and/or software service can exist and may be reusable (e.g., portable to other software applications and/or systems without requiring changes to the software application) independent of other software applications and/or software services. In some embodiments, the software application and/or software service can be containerized and executed via virtual machines (e.g., containers) among distributed physical machines, such as servers, to perform functions of location profile classification system 102.

In some embodiments, the program code when executed can cause the processor to receive location data from a mobile computing platform. Location data can include location data having reduced accuracy (e.g., coarse location data). Location data can be received at a recurring time interval over a time period. For example, processor 106 can receive location data from mobile computing platform 104 of a resource (e.g., operating a vehicle). Mobile computing platform 104 can include a device carried by a user or mobile computing platform 104 can include an on-board navigation system such that mobile computing platform 104 is on-board a vehicle and traveling within the vehicle operated by a resource. Mobile computing platform 104 can include a mobile device, such as a cellular phone, a smartphone, a laptop computer, a wearable device, and/or other like devices. Mobile computing platform can also include integrated computing platforms, such as an integrated vehicle computer, an integrated aircraft computer, and/or other like systems. Mobile computing platform 104 can be connected to one or more communication networks such as a cellular network (e.g., a long-term evolution (LTE®) network, a third generation (3G) network, a fourth generation (4G) network, a fifth generation (5G) network, a code division multiple access (CDMA) network, and/or the like), a local area network (LAN), a wide area network (WAN), a metropolitan area network (MAN), a private network, an ad hoc network, an intranet, the Internet, a fiber optic-based network, a cloud computing network, and/or the like, and/or a combination of these or other types of networks.

Processor 106 can receive location data from mobile computing platform 104. The location data can include location data having reduced accuracy. The location data can be received at each recurring time window over a time period. For example, processor 106 can receive location data within each time window, at the beginning of each time window, or at the end of each time window. In some embodiments, the location data can be previously received (e.g., by processor 106, or another device) and stored in location characteristic database 110 for later use (e.g., for training a machine learning algorithm). Processor 106 can receive the location data from location characteristic database 110 individually or as a dataset. For example, processor 106 can receive a dataset of location data for training a machine learning algorithm.

Location data received by processor 106 can include location data having reduced accuracy such that the location data includes an amount of error and does not pinpoint an exact location of mobile computing platform 104. For example, location data can include coarse location data. The location data may not include exact GPS coordinates. In some embodiments, location data can include location data having reduced accuracy configured as a triangulated location based on Wi-Fi signal strength, a triangulated position from plural cell tower signals, and/or accelerometer data via an accelerometer integrated in a mobile computing platform. For example, location data can include a triangulated location based on Wi-Fi signal strength of Wi-Fi signals received by mobile computing platform 104, a triangulated position from plural cell tower signals via signal strengths of signals received by mobile computing platform 104, and/or accelerometer data via an accelerometer installed in mobile computing platform 104 (e.g., where mobile computing platform 104 is within and/or integrated in a vehicle, accelerometer data can indicate whether the vehicle is stopped, accelerating, braking, and/or turning). In other instances, sensor data captured by sensors of mobile computing platform 104 or connected to mobile computing platform 104 can be collected from mobile computing platform 104 and analyzed by processor 106 to determine whether a location and/or position of mobile computing platform 104 has changed (e.g., using a latitude and longitude coordinate). If processor 106 determines a location and/or position of mobile computing platform 104 has changed (e.g., based on sensor data from mobile computing platform 104), processor 106 can request and/or receive updated location data from mobile computing platform 104 (e.g., updated GPS coordinates, and so forth).

As used herein, location data can include coarse location data such that the location data (e.g., individual data points and/or collective data sets) can include location data having a reduced accuracy and/or a reduced precision. Coarse location data can include data associated with a location of a mobile computing platform (e.g., mobile computing platform 104) that includes coordinates (e.g., GPS coordinates, latitude/longitude coordinates) having a known reduction in accuracy and/or precision as compared to received GPS coordinates. For example, coarse location data can include location data of a mobile computing platform based on signal strengths of Wi-Fi hotspots and/or cellular base stations. Coarse location data can also include location data of a mobile computing platform based on triangulation of signal strength data of the mobile computing device received by/from Wi-Fi hotspots or cellular base stations. Coarse location data can also include GPS coordinates of a mobile computing platform having reduced precision, where values of the GPS coordinates are truncated and/or rounded. For example, received GPS coordinates can include a precision of up to four, five, or six decimal places while coarse location data can include coordinates having a precision of 3 decimal places or less. Each decimal place for GPS coordinates can correspond to about a 10× in accuracy. That is, GPS coordinates having three decimal places of precision (e.g., coarse location data) can have an accuracy of about 100 meters, while GPS coordinates having four decimal places of precision can have an accuracy of about 10 meters, five decimal places can have an accuracy of about 1 meter, and 6 decimal places can have an accuracy of about 0.1 meters. Thus, coarse location data, while including GPS coordinates having a precision of three decimal places or less, can generally include location data having an accuracy (e.g., a distance accuracy) of about 100 meters or more. Thus, as an example, coarse location data can include location data having an accuracy of 1000 meters. With a lower accuracy spreading over higher distance values, coarse location data can maintain a level of privacy for a mobile computing platform (and therefore a user of the mobile computing platform) that does not reveal an exact location of the mobile computing platform (or the user of the mobile computing platform). Coarse location data is not limited to the examples described herein, and coarse location data can include other forms of location data having reduced accuracy and/or precision, such that the coarse location data denotes locations of a mobile computing platform having less precise and/or accurate data (e.g., coordinates) than standard GPS precision and/or accuracy. Standard GPS (e.g., received GPS coordinates) precision and/or accuracy is defined as GPS coordinates having four or more decimal places of precision.

Using coarse location data (e.g., location data having an acceptable reduction in precision and/or accuracy), location profile classification system 102 can preserve a level of privacy for mobile computing platform 104 and an associated resource. For example, location profile classification system 102 can collect and use coarse location data to classify a location profile without requiring collection of additional information or more sensitive personal information. Sensitive personal information can include precise location data, such as accurate GPS coordinates of mobile computing platform 104 and an associated resource. Additionally, location profile classification system 102 can avoid potential intrusiveness into a user's privacy and/or identity by using coarse location data. Location profile classification system 102 can also use coarse location for a mobile computing platform such that coarse location does not correlate location data with an exact location of a data subject in a manner from which intimate personal inferences can be made and tied to an identity (e.g., what doctors a user visits, whether the user gambles often, etc.).

Precise location data can include accurate GPS coordinates, such as GPS coordinates received by a mobile computing platform from satellite systems under normal to ideal conditions. Normal conditions could include a mobile computing device traveling along a typical road within a vehicle, the road being near trees, buildings, and occasional traffic structures (e.g., bridges) overhead the mobile computing platform. Ideal conditions can include an open area on the surface of the earth with minimal to no obstructions with a clear viewpath to a satellite in a satellite system (e.g., low to no interference of signals, no presence of obstructions such as buildings, trees, or other obstructions, etc.). For example, precise location data can include location data collected and stored by the mobile computing platform executing location tracking applications (e.g., Google Maps, Apple Maps, Google Location Services, etc.). Precise location data can also include location data that is associated with specific locations (e.g., GPS coordinates associated with a restaurant, an office, a street address, etc.).

Other factors can affect GPS coordinate measurements, such as atmospheric conditions, satellite geometry, receiver quality, and signal interference. However, while these other factors may be considered to have less precision/accuracy in some instances, these other factors may not automatically result in less precision/accuracy for the purposes of coarse location data because such reductions in precision/accuracy may not be uniformly applied to collected location data (e.g., not all collected GPS coordinates will experience the same environmental conditions). Thus, acceptable reduced precision/accuracy for coarse location data can include a known amount of reduction in precision/accuracy that is applicable to all collected location data, such that the reduction in precision/accuracy is deemed acceptable for all collected location data from a mobile computing platform. An example of coarse location data can include location data including GPS coordinates that are truncated and/or rounded across all location data points in the location data. In some embodiments, location data can include GPS coordinates having values with less than four decimal places. Processor 106 can receive location data as GPS coordinates and processor 106 can truncate values of the GPS coordinates to generate values for coordinates with less than four decimal places as location data having reduced accuracy. For example, location data can be generated from GPS coordinates where the GPS coordinates are truncated and/or rounded to include two or three decimal places in order to reduce accuracy of the GPS coordinate.

Location data can be collected for analysis and/or training of location profile classification model 112 rather than collecting exact, precise location data, thereby maintaining privacy of mobile computing platform 104 and resources of mobile computing platform 104.

Location data can be received by processor 106 at a recurring time window (e.g., every hour) over a time period (e.g., one month). A time period refers to a first-tier time duration which processor 106 can collect and/or receive location data from mobile computing platform 104 to determine a location profile of mobile computing platform 104. For example, a time period can be 1-month, or a longer time period. A time window refers to a second-tier time duration that occurs within the time period. A time period can include a plurality of time windows forming the time period. A duration of a time window can be a time interval, where the time interval refers to an amount of time within the time window. The time interval may also refer to a time step with which location data is collected from mobile computing platform 104 over a time period, whereas a time window includes each duration between the time interval within a time period.

Table 1 shows descriptions and examples of various units of time described herein. For example, a time period can include a plurality of time windows, where each time window is defined by a time interval. As shown in Table 1, a time window can be recurring within a time period, and a time window will generally be recurring when the time window is defined by a time interval that is shorter than the time period.

TABLE 1

| Term | Description | Examples |
| --- | --- | --- |
| Time Period | An overarching time duration in which location data is collected from a mobile computing platform for generating a location data array and/or a location profile. A time period may define an amount of time over which location data for a specific mobile computing platform 104 is collected (e.g., for training a machine learning model or for classifying mobile computing platform 104). | 1 month, 3 months, 1 year |
| Time Interval | A time duration defining a length of each time window within the time period (e.g., a time step within the time period). | 6 hours, 1 hour, 30 minutes |
| Time Window | A time duration recurring within the time period based on the time interval denoting points within the time period in which location data is collected (e.g., a location data sample). In some embodiments, location data can be collected at a beginning or end of a time window, or anytime within the time window. | In a time period where the time interval is 1 hour:<br>Time Window 1 = 12AM-1AM<br>Time Window 2 = 1AM-2AM<br>Time Window 3 = 2AM-3 AM<br>. . .<br>In a time period where the time interval is 6 hours:<br>Time Window 1 = 12AM-6AM<br>Time Window 2 = 6AM-12PM<br>Time Window 3 = 12PM-6PM<br>. . . |

Collection of location data at a recurring time interval over a time period ensures an efficient and effective sampling of location data for training location profile classification model 112. In some embodiments, longer and shorter time periods can be used, but generally the recurring time interval at which location data is collected will be a subset of the overall time period for collection of location data. The recurring time interval and time period can be adjusted for model accuracy and data privacy concerns.

In some instances, processor 106 can store the location data in location characteristic database 110. Processor 106 can store the location data in location characteristic database 110 such that the location data is secure and cannot be accessed by other devices and/or networks. Processor 106 can, for example, encrypt the location data (e.g., using an FPE function and a key) to generate encrypted location data and/or perform a hash-based transform (e.g., SHA-256) on the location data to generate hashed location data. The encrypted location data and the hashed location data can be in a form of a route map (e.g., a remapped virtual path). A route map can include a start location and an end location that are connected by a route path that corresponds to the location data stored in location characteristic database 110. The start location, end location, and route path of the route map do not include references to actual locations and can include a virtual location or virtual map of a path taken by mobile computing platform 104. The start location and the end location of the route map can each correspond to a location data point in the collected location data. Processor 106 can use the encrypted data (e.g., remapped virtual paths) as shared data (e.g., non-private data) and preserve privacy of the location data stored in location characteristic database 110. Shared data can include encrypted and/or hashed location data (e.g., remapped virtualized coordinates), where the encrypted location data and/or hashed location data do not reveal any actual locations or references to actual locations. Data points of shared data can serve as data that includes locations only relative to other shared data points (e.g., virtual location data, virtualized coordinates) and does not have absolute locations, for example, within a country, state, on the surface of the earth, etc. Processor 106 can use the encrypted location data and/or hashed location data as input to train a machine learning classifier (e.g., location profile classification model 112).

Processor 106 can encrypt location data using a keyed function, such as a FPE function. Some examples of keyed processes can include an integer FPE including a salted key per step. Processor 106 can hash location data using a keyless function, such as hash-based remapping with SHA-256. Processor 106 can use a fixed string, a sector remap, and/or an offset factor with the hash function to generate hashed location data. Hashed location data can require an original trace (e.g., the original location data and/or original virtualized coordinates) in order to be reversible by processor 106 to return and/or match the hashed location data to the original location data. Thus, hashed location data can be privacy protected if the original location data is protected (e.g., as stored in location characteristic database 110 and not shared) as hashed location data may not be reversible.

In some instances, processor 106 can decrypt (e.g., unmap) the encrypted location data. For example, processor 106 can decrypt the encrypted location data when authorized by a resource of mobile computing platform 104. Processor 106 can decrypt the encrypted location data to obtain decrypted location data and processor 106 can determine whether the decrypted location matches the original location data stored in location characteristic database 110. When processor 106 used a FPE function, processor 106 should determine that the decrypted location data matches the original location data stored in location characteristic database 110. In some embodiments, processor 106 can calculate a parameter based on the location data and processor 106 can encrypt and/or decrypt the parameter.

Processor 106 can encrypt and decrypt different types of location data and/or parameters using FPE. For example, processor 106 can encrypt and decrypt a distance value corresponding to a distance of the location data (e.g., a distance of a route path in a route map from a start position to an end position). Processor 106 can encrypt and/or decrypt a direction value corresponding to a direction of travel of mobile computing platform 104 along a route path corresponding to the location data. Processor 106 can combine encrypted (e.g., remapped) and/or decrypted distance values and direction values into encrypted and/or decrypted location data that can be derived from the original location data (e.g., as virtualized coordinates). An example flow diagram of encrypting, decrypting, and/or combining distance values and direction values for encrypted and/or decrypted location data using a keyed process is shown in FIG. 11.

Figure 11:
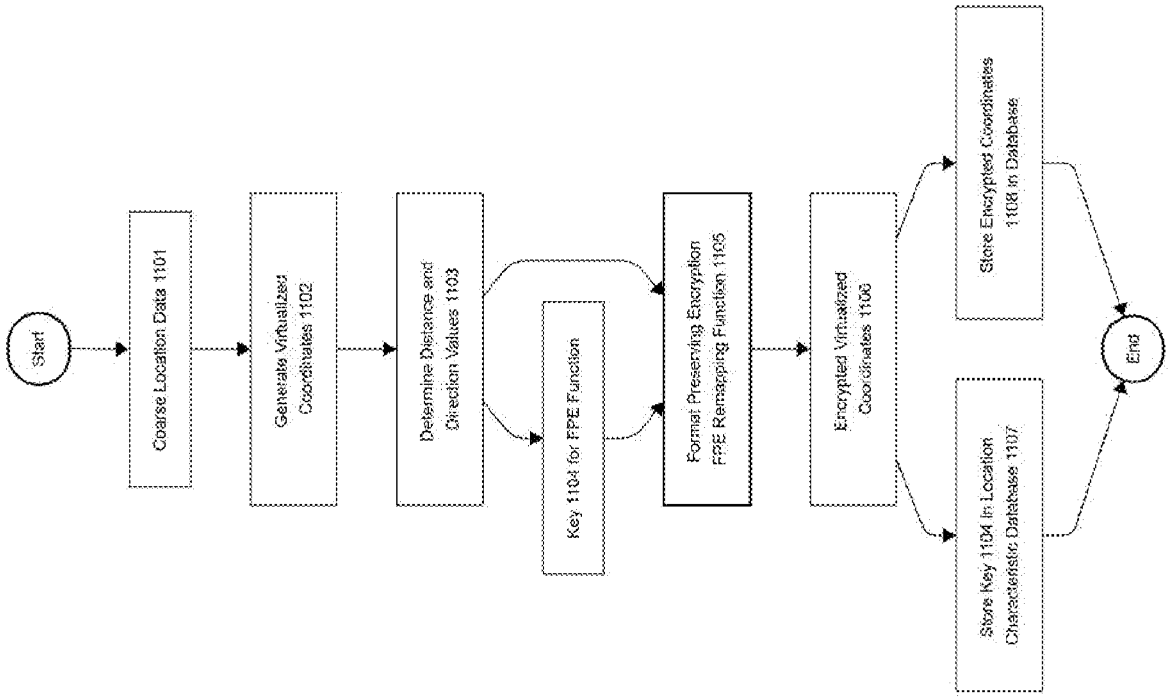
FIG. 11 is a flow diagram of an exemplary remapping function and/or process for distance values and direction values of virtualized coordinates using a keyed remapping function as disclosed herein.

As shown in FIG. 11, the keyed remapping flow includes coarse location data 1101, virtualized coordinates 1102, distance and direction values 1103, key 1104 for a FPE function, FPE remapping function 1105, encrypted virtualized coordinates 1106, store key operation 1107, and store encrypted coordinates operation 1108. For example, processor 106 can be configured to generate virtualized coordinates 1102 from coarse location data and generate distance and direction values 1103 from virtualized coordinates 1102. Processor 106 can encrypt the distance and direction values (and/or the virtualized coordinates) using FPE remapping function 1105 and generate key 1104 corresponding to the FPE function to generate encrypted virtualized coordinates. Processor 106 can, where the remapping function is FPE remapping function 1105 using key 1104, store key 1104 in location characteristic database 110 associated with the encrypted virtualized coordinates (e.g., the remapped virtualized coordinates).

Similarly to processor 106 encrypting and/or decrypting location data using a keyed process (e.g., with FPE), processor 106 can hash and/or revert to original location data via a keyless process (e.g., SHA-256 hashing function, using a fixed string or a trace of original location data) to convert to/from original location data from/to privacy protected location data (e.g., virtualized coordinates). Processor 106 can apply a remapping function including a hash-based remapping function such that the remapped virtualized coordinates are non-reversible. For example, a hash-based remapping function can be keyless such that the remapped virtualized coordinates are non-reversible and the virtualized coordinates are required to determine original distance values and original direction values.

As used herein, non-reversible can refer to remapped coordinates and/or remapped virtualized coordinates that cannot be used to obtain the original unmapped coordinates. For example, remapped virtualized coordinates are non-reversible if a system and/or user cannot obtain the original virtualized coordinates using the remapped virtualized coordinates. A system and/or operator attempting to obtain the original virtualized coordinates given only non-reversible remapped virtualized coordinates cannot obtain the original virtualized coordinates via a function, but can only obtain the original virtualized coordinates (and/or original coordinates) by having access to a database or storage location storing the original virtualized coordinates. As used herein, a hash-based remapping function is described to transform original virtualized coordinates into remapped virtualized coordinates that are non-reversible. The hash-based remapping function can include a one-way hash-based remapping function such that once original virtualized coordinates are transformed into remapped virtualized coordinates, they cannot be transformed back into the original virtualized coordinates via a reverse hash-based remapping function (e.g., hence the remapped virtualized coordinates are referred to herein as non-reversible). This is in contrast to a two-way remapping function (e.g., an FPE function) that may use some mechanism to reverse the remapping of virtualized coordinates back into original virtualized coordinates using some security-based or other mechanism, such as a key. By using a non-reversible remapping function (e.g., a one-way hash-based remapping function) the original virtualized coordinates are mapped to the remapped virtualized coordinate space and can be mapped to, for example, a fixed-size unique string (e.g., hash) that cannot be mathematically inverted (e.g., non-reversible) to recover the original virtualized coordinates. For example, it may be computationally infeasible to convert the hash output (e.g., the remapped virtualized coordinates) back to the original input (original virtualized coordinates. Examples of non-reversible functions can include SHA-256, message digest algorithms (e.g., MD5, RIPE Message Digest), and so forth.

Processor 106 can hash and revert different types of location data and/or parameters using at least SHA-256 hashing functions. For example, processor 106 can hash a distance value corresponding to a distance of the location data (e.g., a distance of a route path in a route map from a start position to an end position). Processor 106 can hash a direction value corresponding to a direction of travel of mobile computing platform 104 along a route path corresponding to the location data. Processor 106 can combine hashed distance values and hashed direction values into hashed location data that can be generated from the original location data. An example flow diagram of encrypting, decrypting, and/or combining distance values and direction values for encrypted, and/or decrypted location data using a keyless process is shown in FIG. 12.

Figure 12:
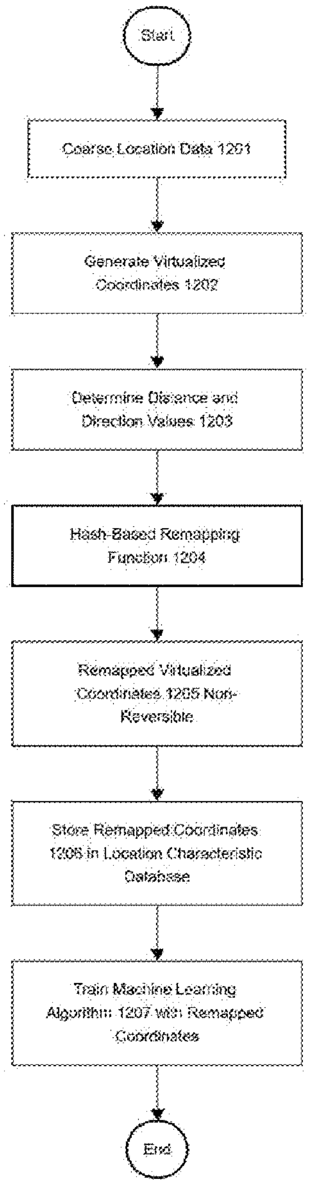
FIG. 12 is a flow diagram of an exemplary remapping function and/or process for distance values and direction values of virtualized coordinates using a keyless remapping function as disclosed herein.

As shown in FIG. 12, the keyless remapping flow can include coarse location data 1201, virtualized coordinates 1202, distance and direction values 1203, hash-based remapping function 1204, remapped virtualized coordinates 1205, store remapped coordinates operation 1206, and training a machine learning algorithm 1207. The keyless process can include hashing distance and/or direction values and returning to the original location data with a keyless process using the original distance and/or the original direction values to decrypt remapped data. In some instances, returning to the original location data may not be computationally feasible (e.g., based on the remapped location data being non-reversible, using a non-reversible function, and so forth). In this case, the only feasible way to return to the original location data is for processor 106 to access a database (e.g., location characteristic database 110) storing the original location data in its unmapped form. Only systems and/or operators (e.g., processor 106) having access to the database and the original location data can effectively "unmap" the remapped location data when the remapped location data is non-reversible. However, this is not expressly an "unmapping" process, but rather retrieval of the original location data from a (secure) database as the "unmapping."

A keyless implementation of route mapping can be reference-based. That is, decryption of encrypted location using the keyless method can use a reference lookup system. Systems and methods can use hashed mapping where encryption of the location data can create a deterministic hash-based transformation. Keyless methods can also include using an original database of location data and original route traces in order to reference the original data and decrypt the encrypted location data (e.g., remapped virtual paths). Systems and methods can verify an encrypted trace of location data corresponds to an original trace stored in the database (e.g., location characteristic database 110). In this way, systems and methods can preserve privacy of location data while still being able to determine location entropy values. Thus, location data can be used to determine a classification of a mobile computing platform without revealing private location data associated with the mobile computing platform. The encrypted location data can be shared publicly and can be used to determine location entropy values and/or location data arrays that are used as input to trained machine learning models. Only a system having access to location characteristic database 110 and thus the original location data can link an encrypted location data trace back to real locations and/or movement of a mobile computing platform. Thus, using route mapping, privacy of locations of mobile computing platforms can be ensured.

In some embodiments, the processor and system can rebuild (or reconstruct) a remapped virtual path from the stored remapped distance values and remapped direction values (e.g., virtualized coordinates), for example, when the system needs to retrieve a shape of a remapped virtual path from location characteristic database 110 and/or when the system needs to verify the path and/or verify the original location data. In some embodiments, the processor and system can rebuild a virtual path (e.g., in a first relative coordinate space) from remapped virtualized coordinates (e.g., in a second relative coordinate space) by reversing the remapping process and/or the coordinate space transformation.

As used herein, ciphering and/or remapping can refer to encrypting and/or hashing location data to transform original location data into remapped location data via one or more data transformations, such as encryption, hashing, encoding, tokenization, and so forth. As described herein, remapped location data can include location data that has been encrypted, hashed, encoded, tokenized, and/or has been transformed via another data operation (e.g., a remapping operation).

In some embodiments, processor 106 can use various keys for encryption and processor 106 can switch a key used for encryption, thus allowing different training datasets to be generated based on originally collected location data. Alternatively, processor 106 can generate non-keyed encrypted location data (e.g., without using a key) using a hash-based transform and/or hash function.

In some embodiments, the program code when executed can cause the processor to capture a time series of live coarse location data from a mobile computing platform traveling along a route. For example, processor 106 can capture a time series of live coarse location data from mobile computing platform 104 while mobile computing platform 104 is moving and/or is stationary. Processor 106 can capture the time series of live coarse location data and can store the live coarse location data in location characteristic database 110 as original location data for later reference by authorized systems.

In some embodiments, the program code when executed can cause the processor to generate virtualized coordinates for a virtual path corresponding to the live coarse location data along the route. For example, processor 106 can generate virtualized coordinates for the live coarse location data by converting coordinates of live coarse location data (e.g., latitude/longitude coordinates) from absolute coordinates to relative coordinates by transforming coordinates of the live coarse location data from an absolute coordinates system (e.g., using the absolute latitude longitude values of the location data) to a relative coordinate system. Processor 106 can be configured to generate the virtualized coordinates by converting a start point of the coarse location data to have coordinates at an origin of a relative coordinate system and determine remaining virtualized coordinates from the start point. For example, processor 106 can generate virtualized coordinates in a relative coordinate system by converting a start point of the live coarse location data (e.g., a start point of a path, a first location data point in a time series, and so forth) to have coordinate values of (0, 0) at an origin of the relative coordinates system. Then, processor 106 can determine remaining virtualized coordinates of the live coarse location data using the start point as the origin of the relative coordinate system. Such virtualization of location data can remove absolute locations of mobile computing platform 104 from the location data and provide de-identified and/or anonymized location data that preserves a shape of a path traveled by mobile computing platform 104.

In some embodiments, processor 106 generates virtualized coordinates using a specific transformation method that is uniquely suited for privacy-preserving location profile classification. As used herein, a "resolution value" refers to a parameter that determines the granularity or density of virtualized coordinates generated along a route. A higher resolution value results in a greater number of virtualized coordinates within a path, providing more detailed path representation, while a lower resolution value results in fewer virtualized coordinates within a path, providing a more generalized path representation. In some embodiments, a resolution value can be selected based on a sampling density of the original location data (e.g., one coordinate per 100 m, or configurable 1-N points per segment). In some other embodiments, a resolution value can be selected based on a shape of a virtual path (e.g., a more winding path may require a higher resolution, whereas a straighter path may not have increased benefits beyond a lower resolution). The resolution value can be defined by a user and/or an operator, or the resolution value can be determined automatically based on some criteria of the original location data, the virtualized coordinates, and/or the virtual path. The coordinate transformation method can include the following steps, as shown in FIG. 16.

Figure 16:
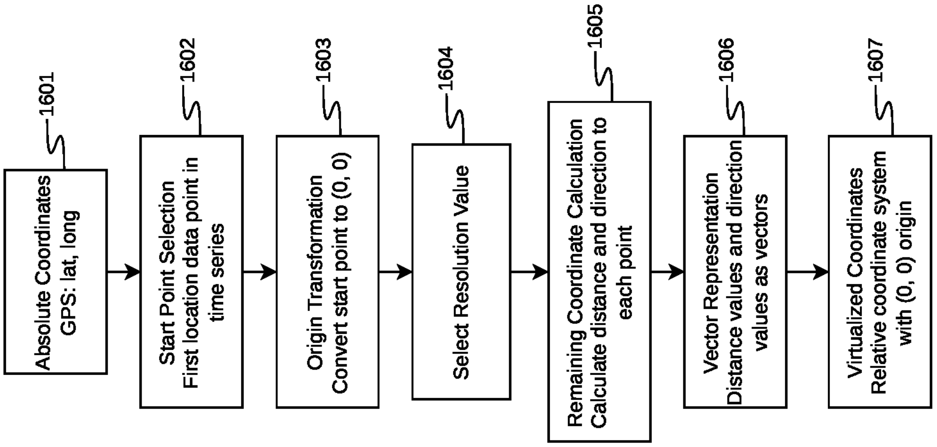
FIG. 16 is a diagram of an exemplary coordinate transformation from absolute coordinates to virtualized coordinates as disclosed herein.

As shown in FIG. 16, at step 1602, processor 106 can select a start point from the live coarse location data. The start point is typically the first location data point in the time series, but can also be selected based on other criteria (e.g., the location data point with the earliest timestamp, or a location data point at a specific time). The process begins with absolute coordinates 1601 (e.g., GPS coordinates such as latitude 38.9072° N, longitude 77.0369° W).

As shown in FIG. 16, at step 1603, processor 106 can convert the start point to have coordinate values of (0, 0) at an origin of a relative coordinate system. This transformation removes absolute location information while preserving the relative positions of all other location data points. At step 1604, processor 106 can select a resolution value for the location data points, for example, if processor 106 determines the current resolution of location data points (or the native sampling rate used when capturing the coarse location data) should be increased or decreased for defining virtualized coordinates. Where processor 106 decreases the resolution, some location data points can be removed from the location data. Where processor 106 increases the resolution, processor 106 can generate additional location data points along the path (e.g., via interpolation). Processor 106 can select a resolution value based on various factors including a shape of the route trace/path, a total length of the route trace/path, amount of computing resources available, and/or other factors described herein.

As shown in FIG. 16, at step 1605, processor 106 can determine remaining virtualized coordinates using the start point as the origin. For each subsequent location data point, processor 106 calculates virtualized coordinates by:

Calculating the distance from the start point to the location data point;

Calculating the direction (angle) from the start point to the location data point;

Converting the distance and direction to Cartesian coordinates in the relative coordinate system with the start point at (0, 0).

As shown in FIG. 16, at step 1606, processor 106 can determine distance values and direction values as vectors between each virtualized coordinate. Each vector represents the movement from one virtualized coordinate to the next, where the distance value is the magnitude of the vector and the direction value is the angle of the vector. Processor 106 can store the vectors separately defined (e.g., where each vector is defined separately and stored separately for each virtualized coordinate, for example, in a separate data entry) in the location characteristic database. This storage structure enables efficient remapping operations while maintaining the vector-based representation. Processor 106 can generate the final result including virtualized coordinates 1607 in a relative coordinate system with a (0, 0) origin.

The described coordinate transformation method provides several technical advantages. By converting absolute coordinates to relative coordinates with an arbitrary origin, the system removes all absolute location information while preserving the shape and pattern of the route. The relative coordinate system preserves the geometric patterns and spatial relationships necessary for machine learning classification. The path shape (e.g., straight lines, curves, turns) is preserved in the virtualized coordinates, enabling classification based on route patterns. The path and shape of the remapped virtual path can be rebuilt and/or reconstructed from stored virtualized coordinates. The vector-based representation enables efficient remapping operations. The remapping function can transform the vectors while preserving their relative relationships, which preserves the path shape and entropy characteristics. The vector-based representation is more storage-efficient than storing all coordinate points, as it only stores the differences (vectors) between consecutive points.

In some embodiments, the program code when executed can cause the processor to determine a distance value and a direction value between each virtualized coordinate for the virtual path. For example, processor 106 can determine distance values and direction values as vectors between each virtualized coordinate for the virtual path formed by the virtualized coordinates. Processor 106 can store each vector between each virtualized coordinate separately defined and stored in location characteristic database 110.

In some embodiments, the program code when executed can cause the processor to remap the distance values and the direction values for the virtualized coordinates with a remapping function to generate remapped distance values and remapped direction values for a remapped virtual path. For example, processor 106 can remap the distance values and the direction values (e.g., the vectors between each virtualized coordinate) using a remapping function (e.g., ciphering, encryption, hash-based, and so forth) to generate a remapped virtual path having remapped virtualized coordinates. In some embodiments, processor 106 can remap the virtualized coordinates to a new coordinate space (e.g., polar coordinates). The remapping function creates a technical transformation of coordinate data that preserves location entropy values while de-identifying absolute coordinates, enabling machine learning classification on privacy-preserved data. This technical transformation enables classification on privacy-preserved coordinate data that cannot be performed using absolute location coordinates, as conventional location-based classification systems require absolute coordinates that reveal actual geographic locations.

As used herein, a "remapping function" refers to a deterministic transformation function that maps distance values and direction values from a first coordinate space to a second coordinate space while preserving relative spatial relationships and location entropy values. A remapping function can include, but is not limited to: (1) a format preserving encryption (FPE) function that encrypts distance and direction values while maintaining their format and relative relationships; (2) a hash-based function that applies a deterministic hash transformation to distance and direction values; and (3) an encryption cipher function (e.g., FF1, FF3-1, and so forth) that encrypts distance and direction values using a cryptographic key. In some instances, an encryption cipher can be used for entropy-preserving remapping. For example, the processor can use a format-preserving cipher, a block cipher, or another encryption cipher that preserves relative distance/direction relationships within the location data points. A remapping function preserves location entropy values by maintaining the relative spatial relationships between coordinates such that the entropy characteristics of the original virtual path are preserved in the remapped virtual path.

In some embodiments, processor 106 performs remapping using a specific entropy-preserving remapping method that is uniquely suited for privacy-preserving location profile classification. The remapping method can include the following specific steps, as shown in FIG. 17.

Figure 17:
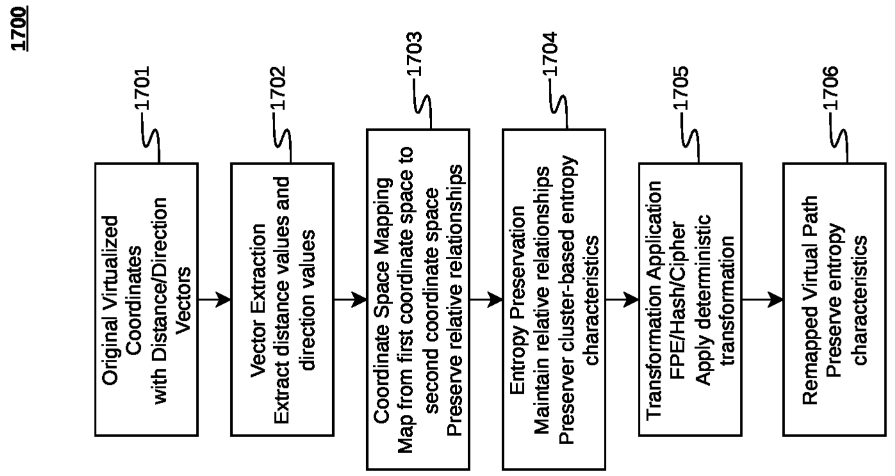
FIG. 17 is a diagram of an exemplary entropy-preserving remapping process as disclosed herein.

As shown in FIG. 17, at step 1702, processor 106 can extract distance values and direction values (e.g., as vectors) from the original virtualized coordinates 1701. Each vector represents the movement from one virtualized coordinate to the next.

As shown in FIG. 17, at step 1703, processor 106 can map the distance values and direction values from a first coordinate space (e.g., Cartesian coordinates) to a second coordinate space (e.g., polar coordinates, or another Cartesian space with a different origin). The mapping preserves the relative spatial relationships between coordinates, meaning that if two coordinates are close together in the first space, they remain close together in the second space. Processor 106 can also remap and/or rebuild remapped virtualized paths in either coordinate space given the coordinates in the new and/or previous coordinate space.

As shown in FIG. 17, at entropy preservation 1704, the remapping function preserves location entropy values by maintaining the relative spatial relationships between coordinates. Specifically, the remapping function ensures that: the relative distances between coordinates are preserved (scaled proportionally if needed); the relative directions between coordinates are preserved (rotated if needed, but maintaining relative angles); and the cluster-based entropy characteristics are preserved (coordinates that were in the same cluster remain in the same cluster after remapping).

As shown in FIG. 17, at step 1705, processor 106 applies a deterministic transformation function (FPE, hash-based, or encryption cipher) to the vectors. The transformation function maps distance values to remapped distance values; maps direction values to remapped direction values; preserves the relative relationships between vectors; and preserves the entropy characteristics of the original virtual path.

As shown in FIG. 17, at step 1706, processor 106 can generate a remapped virtual path using the remapped distance values and remapped direction values. The remapped virtual path has the same shape and entropy characteristics as the original virtual path, but with different coordinate values that do not reveal absolute locations. By generating a remapped virtual path, embodiments disclosed herein can specifically preserve location entropy values, enabling classification based on entropy patterns, unlike general encryption methods that may destroy entropy characteristics.

The remapped virtual paths can be used for machine learning classification because they preserve the geometric patterns and entropy characteristics necessary for classification. The remapping adds an additional layer of privacy protection beyond virtualization, making it even more difficult to reverse-engineer absolute locations. This remapping method solves the technical problem of enabling machine learning classification on privacy-preserved coordinate data that cannot be performed using absolute location coordinates. Conventional location-based classification systems require absolute location coordinates that reveal actual geographic locations, which compromises privacy. This remapping method enables classification without requiring absolute coordinates.

In some embodiments, the program code when executed can cause the processor to generate an output classification for the mobile computing platform using a trained classification model based on inputting a remapped virtual path to the trained classification model. For example, processor 106 can input the remapped virtual path (including remapped virtualized coordinates) to a trained machine learning model (e.g., a classifier model) to generate a classification of the remapped virtual path into a type of a location profile (defined by ground truth labels) for mobile computing platform 104. Processor 106 can generate the trained classification model based on training a machine learning algorithm using previously captured coarse location data that has been virtualized and remapped into previously captured remapped virtual paths or one or more mobile computing platforms 104.

In some embodiments, the program code when executed can cause the processor to store the output classification and the remapped virtual path associated in the location characteristic database. For example, processor 106 can store the output classification and its associated remapped virtual path in location characteristic database 110 associated with each other. Processor 106 can store the remapped virtual path in location characteristic database 110 as virtualized coordinates.

In some embodiments, the program code when executed can cause the processor to associate the remapped virtual path and the output classification with an account identifier for the mobile computing platform in the location characteristic database. For example, processor 106 can associate the remapped virtual path and its associated output classification with an account identifier for mobile computing platform 104 in location characteristic database 110 such that mobile computing platform 104 and an associated account can include information on the location profile of mobile computing platform 104. Processor 106 can update a data field associated with the account identifier in location characteristic database 110 to take action on the account corresponding to the account identifier based on the location profile classification using the remapped virtual path. Processor 106 can use remapped virtual paths to preserve location entropy of mobile computing platform 104 such that the originally captured coarse location data (e.g., a time series of location data) and/or the virtual path generated from virtualized coordinates can be used to determine location entropy values.

In some embodiments, the program code when executed can cause the processor to cluster location data for a time period to generate plural location data clusters. A location data cluster can include location data points within a radius.

For example, a location data cluster including location data points can define a collection of nearby locations within a radius. By generating a location data cluster for a collection of nearby locations within a radius, processor 106 can define a boundary around the collection of nearby locations such that the location data points can each be associated with each other via the cluster (e.g., in a database, via a cluster identifier). Processor 106 can cluster the received location data for the time period (e.g., over a month). By clustering the location data points, processor 106 can cluster location data into multiple cluster locations including location data clusters, each location data cluster including one or more location data points. A location data cluster can include location data (e.g., location data points), where each location data point of the location data cluster represents a location (e.g., a GPS coordinate, latitude/longitude) within a radius. In some embodiments, processor 106 can cluster the virtualized coordinates of a remapped path in a similar manner.

Location data clusters can define nearby locations within a radius where the location data clusters include location data points (or virtualized points of a remapped virtual path) that are all located within a certain radius (e.g., a radius encompassing GPS coordinates, latitude/longitude coordinates, or positions on a map of a region). For example, a radius line can originate at an existing location data point (e.g., at a GPS and/or latitude/longitude coordinate point) and have a length of 1 mile. In some instances, the length of a radius for clustering can be preconfigured in processor 106, where in other instances processor 106 can determine a radius for clustering as part of the cluster operation (e.g., based on an average distance of surrounding location data points, a user input, or another technique). In some instances, processor 106 can set a radius to originate at another location that does not coincide with a location data point received by processor 106. Processor 106 can determine the location data clusters using the radius, and processor 106 can generate a location data cluster of location data points that are within the radius. Processor 106 can generate location data clusters defining nearby locations within a radius in this way. Processor 106 can use the location data clusters to generate location entropy values over time for mobile computing platform 104.

Processor 106 can store location data clusters in location characteristic database 110 by storing each location data point associated with an identifier for the location data cluster. For example, processor 106 can determine that a first and second location data point are within a first radius to generate a location data cluster C1. Processor 106 can then store the first location data point and the second location data point in location characteristic database 110 with each location data point database entry including a data field including identifier C1.

In some embodiments, each location data cluster can cluster location data points defined in a coordinate space (e.g., a map) based on the location data points being within a certain radius and/or distance from each other. For example, location data clusters can be generated by processor 106 based on location data points falling within a 1-mile radius. In some instances, the radius can be referenced from a first location data point within a location data cluster. Location data clusters can be defined and stored in location characteristic database 110 by each location data point being stored as a data entry including a coarse location value, a cluster identifier value, and a distance value within a cluster radius. For example, a first data entry in location characteristic database 110 defining a first location data point in a first location data cluster can include a first coarse location value (e.g., GPS coordinates or triangulated location values) (or alternatively virtualized coordinates), a first cluster identifier value, and a distance value within the cluster radius of 0 (e.g., a distance of 0 indicating the first location data point is the reference point from which the cluster radius is measured from).

Although some embodiments described herein reference location data points, it should be understood that virtualized coordinates can be used as location data points (e.g., when generating location data clusters) rather than requiring absolute location data or the original location data.

In some embodiments, the program code when executed can cause the processor to generate a location entropy value for each time window at the recurring time interval based on a number of location data clusters where a mobile computing platform is detected and a percentage of time a mobile computing platform is detected at each location data cluster to generate a location data array associating a location entropy value with each detected location data cluster in each time window. For example, processor 106 can generate a location entropy value (e.g., a confidence factor associated with a location variance) for each time window at the recurring time interval based on a number of location data clusters where mobile computing platform 104 is detected and a percentage of time mobile computing platform 104 is detected at each location data cluster to generate a location data array associating a location entropy value with each detected location data cluster in each time window.

Processor 106 can generate location entropy values based on a number of location data clusters where mobile computing platform 104 is detected and a percentage of time mobile computing platform 104 is detected at each location data cluster. To determine the percentage of time mobile computing platform 104 is detected at each location data cluster, processor 106 can calculate a variance of the location data clusters visited by mobile computing platform 104 at each time window for the recurring time interval over the time period (e.g., at every hour for one month). For example, processor 106 can determine a variance based on the following:

$$\frac{\sum (x-\bar{x})^2}{(n-1)}$$

where $\bar{x}$ is a sample mean and n is a sample size. Processor 106 can calculate a variance for all time windows in a time period (e.g., 24 variances if the time window is one hour and the time period is one day). Processor 106 can repeat this process to calculate a variance for each time window (e.g., repeat each day for 24 variances where the time window is one hour). Processor 106 can save and/or store the variances in an array in memory 108 and/or location characteristic database 110.

Processor can generate the location entropy values based on the following:

$$H = -\sum_{i=1}^{N} p_i \log_2 p_i$$

Where H is a location entropy value, N is a total number of unique location data clusters visited, and $p_i$ is a proportion of visits to a location data cluster i, e.g., $$p_i = \frac{v_i}{V},$$

where $v_i$ is a number of visits to a location data cluster i, and V is a total number of visits across all location data clusters.

In some embodiments, processor 106 can generate location entropy values using a specific cluster-based, time-window-based calculation method that is uniquely suited for privacy-preserving location profile classification. The location entropy calculation method includes the following steps, as shown in FIG. 15.

Figure 15:
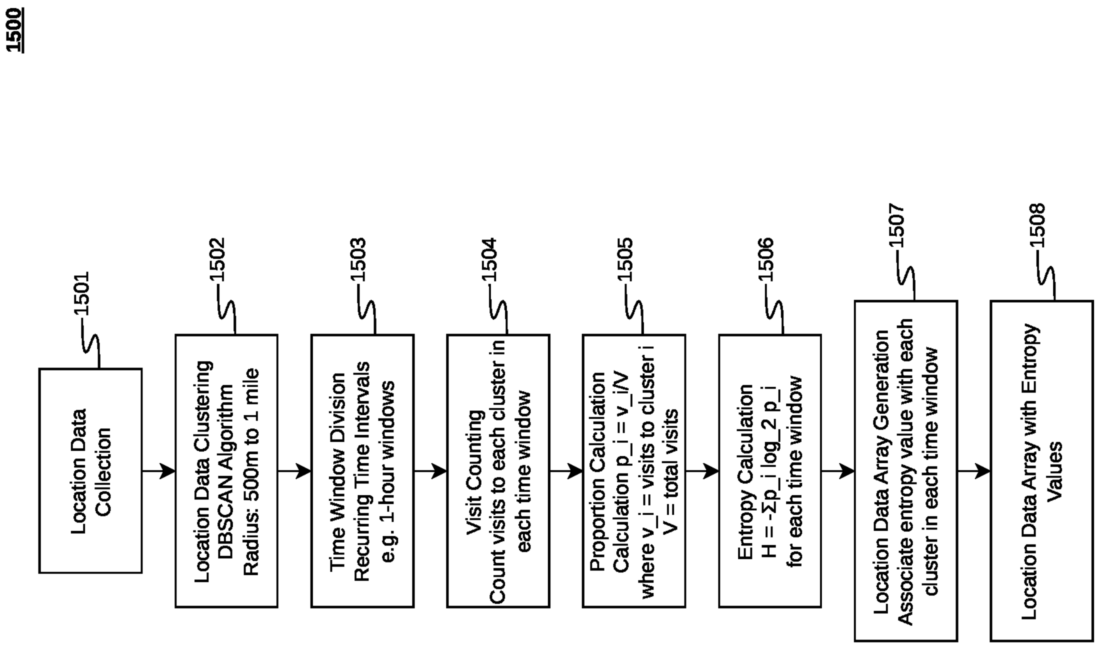
FIG. 15 is a flow diagram of an exemplary method for calculating location entropy values using cluster-based, time-window-based calculations as disclosed herein.

As shown in FIG. 15, at step 1502, processor 106 clusters location data points using a Density Based Spatial Clustering of Applications with Noise (DBSCAN) algorithm with a radius of 500 meters to 1 mile. Each location data cluster includes location data points within the radius, where the radius is measured from a reference point within the cluster. The DBSCAN algorithm is selected because it can identify clusters of arbitrary shape and handle noise in location data, which is important for accurate entropy calculation.

As shown in FIG. 15, at step 1503, processor 106 can divide a time period (e.g., 24 hours) into recurring time intervals (e.g., 1-hour time windows). Each time window represents a specific time period during which location data is collected (e.g., 12 AM-1 AM, 1 AM-2 AM, etc.). The time window division enables temporal analysis of location patterns, which is critical for distinguishing different types of location profiles (e.g., commuter profiles show different entropy patterns during morning hours vs. evening hours).

As shown in FIG. 15, at step 1504, for each time window, processor 106 can count the number of visits to each location data cluster. A visit is counted when the mobile computing platform is detected within a location data cluster during the time window. Processor 106 also can calculate the total number of visits across all location data clusters in each time window.

As shown in FIG. 15, at step 1505, processor 106 can calculate the proportion of visits to each location data cluster i as p_i=v_i/V, where v_i is the number of visits to location data cluster i, and V is the total number of visits across all location data clusters in the time window.

As shown in FIG. 15, at step 1506, processor 106 can calculate the location entropy value for each time window using the formula H=−Σp_i log_2 p_i, where the sum is taken over all location data clusters i in the time window. The base-2 logarithm is specifically used because it provides entropy values in bits, which is standard for information-theoretic entropy calculations.

As shown in FIG. 15, at step 1507, processor 106 can associate the location entropy value with each cluster in each time window to generate a location data array with entropy values. As shown in FIG. 15, the process starts with location data collection (Start 1501) and ends with the location data array with entropy values (End 1508). The entropy values can be calculated specifically for location data clusters, not general data values. This enables the entropy values to capture location-specific patterns (e.g., how often a mobile computing platform visits different locations) that are useful for classification. The entropy values are calculated for each time window, enabling temporal analysis of location patterns. This allows the system to distinguish between different types of location profiles based on when they have high or low entropy (e.g., gig workers may have high entropy at night, while commuters may have high entropy during rush hours). The use of location data clusters (rather than individual location data points) provides a balance between accuracy and privacy. The clusters provide enough information for classification while maintaining privacy by not revealing exact locations. The entropy values calculated using this method are preserved through the remapping function because the remapping function preserves relative spatial relationships, which in turn preserves the cluster-based entropy characteristics.

Processor 106 can generate a location entropy value and a percentage of time mobile computing platform 104 is detected at each location data cluster for each time window (e.g., a 1-hour time window over 24 hours). Processor 106 can associate (e.g., in location characteristic database 110) the location entropy value and the percentage of time mobile computing platform 104 is detected at each location data cluster (e.g., a variance) with the respective time window in a data entry (e.g., as part of the location data array) in location characteristic database 110. In some instances, the location data array can include a location entropy value associated with each time window in an array format. In some embodiments, the location data array can include additional fields in each data entry associated with each time window, such as the variance, or other features that can be generated by processor 106 based on the location entropy values.

Processor 106 and/or location profile classification model 112 can use the generated location entropy values instead of using location data directly (e.g., either absolute location data or relative location data). In some instances, processor 106 can delete the captured location data and location data points (and/or virtualized coordinates) once the location entropy values have been generated for mobile computing platform 104. Location entropy values can represent randomness of the captured location data for locations of mobile computing platform 104 as mobile computing platform moves about.

In some embodiments, the program code when executed can cause the processor to extract one or more features from the location data array and/or the virtual path (e.g., via the virtualized coordinates). For example, processor 106 can extract one or more features from the location data array using the location entropy values and/or time windows. The one or more features can be meaningful time-based features that can be engineered from location entropy values. The one or more features extracted from the location data array can include statistical features including a mean entropy, a median entropy, a standard deviation of entropy, a minimum entropy, a maximum entropy, a range of entropy, a $25^{th}$ percentile entropy, and/or a $75^{th}$ percentile entropy. The one or more features extracted from the location data array can include temporal features including a daytime average entropy, a nighttime average entropy, an hour of maximum entropy, an hour of minimum entropy, and/or a day/night entropy ratio. The one or more features extracted from the location data array can include behavioral features including an average variability (e.g., an average difference between a location entropy value and a lag entropy value), high entropy hours (e.g., a number of hours when location entropy values are greater than 3), and/or low entropy hours (e.g., a number of hours when location entropy values are less than 1). The one or more features extracted from the location data array can include aggregated features including location entropy values broken down by time windows (e.g., morning time windows, afternoon time windows, evening time windows, nighttime windows).

The one or more features extracted from the location data array and/or virtual path can include an average deviation from a predetermined gig profile as a reference and/or a correlation of location entropy values with a predetermined gig profile as a reference. The one or more features extracted from the location data array and/or virtual path can include derived features including skewness of entropy (e.g., suggesting driving during the day) and/or kurtosis of entropy (e.g., if the curve is flatter then there is less variation in the entropy of the driving pattern). The one or more features extracted from the location data array and/or virtual path can include frequency features including a first frequency component using Direct Cosine Transform (DCT). The one or more features extracted from the location data array and/or virtual path can include categorical features including a high entropy user/resource and/or peak hour movement. The one or more features extracted from the location data array and/or virtual path can include a proportion of entropy in daytime (e.g., a daytime entropy divided by an entire day entropy) which can describe how much of the total entropy is created by daytime entropy.

In some embodiments, processor 106 can use both location entropy values and privacy route mapping (e.g., generated virtual paths 114 and/or virtualized coordinates 116) to train location profile classification model 112 and/or to generate an output of location profile classification model 112. Alternatively, processor 106 can use either location entropy values or privacy route mapping to train location profile classification model 112 and/or to generate an output of location profile classification model 112. By using both privacy route mapping and location entropy values to train location profile classification model 112 and/or generate an output of location profile classification model 112, the accuracy of a classification output of location profile classification model 112 can be improved. Additionally, processor 106 can train a different location profile classification model 112 using each of the location entropy values and the privacy route mapping as location profiles such that processor 106 can use the different location profile classification models 112 in parallel to determine a classification output. Using multiple location profile classification models 112, processor 106 can determine a classification output based on a confidence level of each location profile classification model 112. Additionally, processor 106 can determine whether a dataset of collected location data may be better analyzed and/or classified using either a model trained using location entropy values or a model trained using privacy route mapping.

Processor 106 can extract the one or more features using the location entropy values in the location data array and/or the virtualized coordinates for the virtual path. For example, processor 106 can extract the one or more features by determining groupings and/or calculated features using location entropy values as input. Processor 106 can extract the one or more features through a process of combining location entropy values in the location data array to generate a feature as output. Thus, processor 106 can extract new input values (e.g., features) for a machine learning model using original raw input data (e.g., location entropy values).

In some instances, processor 106 can extract features from a location data array and/or virtual path by analyzing location entropy values and/or virtualized coordinates with a machine learning feature extraction technique and/or neural network model (e.g., an Autoencoder, principal component analysis (PCA), and so forth). In some other instances, processor 106 can be programmed or configured to generate features from location entropy values based on predefined formulas (e.g., an average, a mean, a time of day, and so forth). Some example features that processor 106 can extract from location entropy values include a nighttime entropy (e.g., based on processor 106 aggregating and/or averaging location entropy values associated with time windows occurring at night—e.g. 9 PM to 6 AM), a median entropy (e.g., across all time windows using all available location entropy values), an entropy skewness (e.g., skewness in a distribution of location entropy values), an evening entropy (e.g., based on processor 106 aggregating and/or averaging location entropy values associated with time windows occurring in the evening—e.g., 5 PM to 9 PM).

Figure 5:
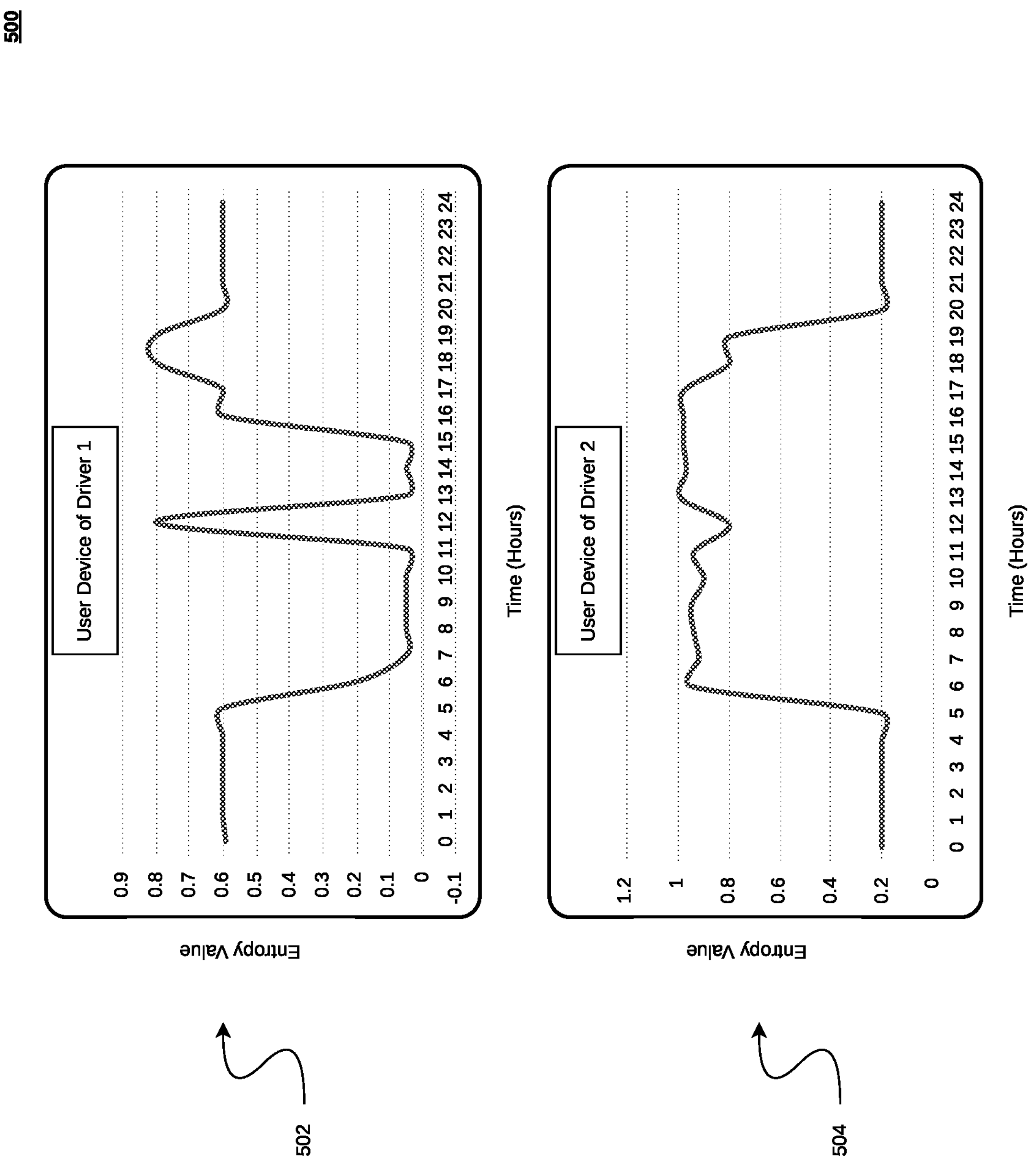
FIG. 5 is a diagram of exemplary graphs of location profiles including location entropy values over each time window within a time period of 24 hours as disclosed herein.

Processor 106 can generate a graph of location entropy values for each time window over a time period (or portion of a time period). For example, processor 106 can plot location entropy values on a y-axis relative to time windows along an x-axis to generate a visual graph that can be displayed to a display device or used as an image of a location profile for training a machine learning algorithm (e.g., using images of location profiles). Examples of graphs of location entropy values over time windows in a time period are shown in FIG. 5.

In some embodiments, processor 106 can train a machine learning algorithm using images of route shapes. Processor 106 can train the machine learning algorithm with the remapped virtualized coordinates includes training the machine learning algorithm using images of the remapped virtual paths plotted in a relative coordinate space. As used herein, "images of route shapes" refer to visual representations of virtual paths (e.g., remapped virtual paths) plotted in a relative coordinate space, where route shapes are represented as sequences of coordinate points connected by lines or curves. These images can be generated by plotting virtualized coordinates (or remapped virtualized coordinates) on x-y axes in a relative coordinate system, where the x-axis and y-axis represent spatial dimensions and the route shape is visualized as a path connecting the coordinate points. The images can be in various formats suitable for machine learning training, such as raster images (e.g., PNG, JPEG), vector images (e.g., SVG), or pixel arrays. Processor 106 can generate these images by converting virtual paths (or remapped virtual paths) into visual representations where each coordinate point is plotted at its corresponding position in the relative coordinate space, and consecutive points are connected to form the route shape. These images preserve the geometric patterns and spatial relationships of the route shapes while removing absolute location information, making them suitable for machine learning classification based on path shape patterns or other features of the images and virtual paths that can be extracted from the images.

In some embodiments, processor 106 can use autocorrelation with lag-1 for when location profile classification model 112 is determining whether to classify a resource to a specific classification based on the resource's entropy. Location profile classification model 112 can take into account any specific time plus what happened in a previous time period (e.g., 1 hour).

In some embodiments, location profile classification system 102 can use predetermined location profiles having location entropy values as reference values for features (e.g., a predetermined postman profile, a predetermined traveler profile, and so forth). Once processor 106 generates and/or extracts the one or more features, processor 106 can store the one or more features in location characteristic database 110 and/or memory 108 for training a machine learning algorithm.

In some embodiments, processor 106 can generate predetermined location profiles (also referred to as ideal location profiles or reference location profiles) for classification. As used herein, a "predetermined location profile" (or "ideal location profile") refers to a reference location profile that represents typical or characteristic (e.g., average) patterns for a specific type of location profile and is used as a comparison standard for classifying new location profiles.

Predetermined location profiles are pre-established location profiles that have been created, selected, or defined based on known characteristics of specific types of location profiles (e.g., postman profile, traveler profile, commuter profile, gig worker profile, etc.). Each predetermined location profile is associated with a ground truth label that identifies the type of location profile it represents. Predetermined location profiles can be generated from: (1) gated location data from multiple mobile computing platforms known to have the same location profile type; (2) manually created profiles based on expert knowledge of typical patterns for specific location profile types; or (3) statistically derived profiles from training data sets with known ground truth labels. Processor 106 can use predetermined location profiles as reference standards to compare against live location profiles using statistical divergence metrics (e.g., KL divergence, JS divergence) to determine which predetermined location profile a live location profile most closely matches.

In some embodiments, the program code when executed can cause the processor to train a machine learning algorithm based on the location data array, the one or more features, and a ground truth label for a location profile to generate a trained classification model. For example, processor 106 can train a machine learning algorithm based on the location data array, the one or more features, and a ground truth label for a location profile (e.g., or mobile computing platform 104) to generate location profile classification model 112.

Processor 106 can train a machine learning algorithm using the location data array and the one or more features (e.g., stored in memory 108 and/or location characteristic database 110) as training inputs to the machine learning algorithm. As part of training the machine learning algorithm, processor 106 can receive a ground truth label corresponding to the location data array of a location profile, where the ground truth label includes a classification identifier for a location profile of mobile computing platform 104 from which location data for the location data array was collected. For example, the ground truth label may include a classification identifier of "postman" for a location profile where the location data array was constructed from location data collected from mobile computing platform 104 associated with a postman (e.g., a user) while the resource operates a vehicle along a postal route during the time windows. In some embodiments, other ground truth labels can be used corresponding to other location profiles and the location data arrays collected as part of training the machine learning algorithm.

A location profile can include a collection of location data (e.g., location data) over time for a mobile computing platform. The location profile can be associated with locations of resources of the mobile computing platform, such as locations of commuters, drivers, passengers, deliveries, vehicles, and other resources and/or users carrying a mobile computing platform and/or devices or systems having an integrated mobile computing platform.

The machine learning algorithm can include an algorithm that can generate accurate classifications for time series data. For example, a machine learning algorithm such as a Random Forest, XGBoost, or support vector machine (SVM) can be used where processor 106 is able to extract meaningful time-based features from the location data array. Alternatively, a deep learning model such as a recurrent neural network (RNN), a Long Short-Term Memory (LSTM), a Gated Recurrent Unit (GRU), or a 1-dimensional convolutional neural network (1D-CNN) can be used if there is a large amount of training data already available to location profile classification system 102. However, such deep learning models may be less advantageous as they can require more computing resources and can be less interpretable. In some instances, the machine learning algorithm can include a transformer for time series data including a temporal fusion transformer (TFT) or a time series transformer. Other possible machine learning algorithms can include a hidden Markov model, a shapelet transform or a dynamic time warping (DTW) algorithm. In various embodiments described herein, the machine learning algorithm will generally include an XGBoost algorithm because of the presence of limited training data and the ability of location profile classification system 102 to extract meaningful time-based features from the location data array. However, other alternative machine learning algorithms are possible and are envisioned.

In some embodiments, processor 106 can train a machine learning algorithm with various parameters and/or characteristics to support generating a trained machine learning model. For example, processor 106 can train a machine learning algorithm to generate a trained machine learning model that offers explainability and insights into why inputs are classified as a certain output. An explainable trained model can allow adjustments to training and feature selection/generation to improve the trained machine learning model. Processor 106 can also train a machine learning algorithm to generate a trained machine learning model which allows for automatic capturing of interactions and/or relationships between multiple features of the one or more features. For example, processor 106 can train a machine learning algorithm to generate a trained machine learning model that can capture how multiple features together can impact a classification output of the trained machine learning model. Additionally, processor 106 can train a machine learning algorithm to generate a trained machine learning model that is robust to noisy and/or incomplete data and generalized for operating on unseen data as inputs, while still generating an accurate classification output.

Processor 106 can train a machine learning algorithm using large datasets and large inputs, such that the trained machine learning model can operate on real-time inputs and/or near real-time inputs (e.g., live location data) to generate real-time and/or near real-time classification outputs. Processor 106 can also train a machine learning algorithm to generate a trained machine learning model that can be robust to class imbalances in the training datasets, and processor 106 can optimize the trained machine learning model for various metrics, such as F1-score, precision, recall, and Area Under the Receiver Operating Characteristic curve (AUC-ROC), including accuracy. Processor 106 can generate the trained machine learning model to allow for threshold tuning and for balancing false positives and false negatives of the model.

Processor 106 can train a machine learning algorithm to generate a trained machine learning model such that the trained machine learning model can adapt to changing patterns in the input data and/or training datasets. For example, processor 106 can retrain and/or fine-tune the trained machine learning model as new and/or updated training data is received and/or generated.

Processor 106 can train various types of machine learning algorithms to generate a trained machine learning model (e.g., location profile classification model 112). By way of example, and not limitation, processor 106 may train an XGBoost algorithm, a Light Gradient Boosting Machine (LightGBM) algorithm, a CatBoost algorithm, a Random Forest algorithm, a Logistic Regression algorithm, a Neural Network (NN), a Support Vector Machine (SVM), and/or a TabTransformer algorithm. Each of the listed machine learning algorithms can be trained using training datasets (e.g., location profiles, location data arrays) to generate a trained machine learning model. Processor 106 may train a different algorithm based on various considerations relating to type, size, and/or structure of training datasets, availability and number of features, and so forth.

When the processor trains a machine learning algorithm based on the location data array, the one or more features, and the ground truth label for a location profile, the processor can train the machine learning algorithm (e.g., an XGBoost algorithm) to learn patterns of location data in the location data array and associate those patterns with the one or more features and the ground truth label. For example, processor 106 can train an XGBoost machine learning algorithm by generating plural decision trees including location data from the location data array. An XGBoost algorithm can be used for supervised learning (e.g., using a known ground truth label), where the processor can input training data (e.g., a location data array) with the one or more features to predict a target variable (e.g., a classification).

As an example machine learning algorithm, an XGBoost machine learning algorithm can build and use decision trees. A decision tree can represent an initial binary classification (e.g., a decision) of an input based on a simple evaluation. For example, a simple decision tree can include an initial binary classification of whether a person (e.g., represented by input data) owns a vehicle. The input data can include data fields relating to a person, such as age, gender, home state, etc. An evaluation for the decision tree can include evaluating the age data field to determine whether the age data values is less than 20. The input data (e.g., for a specific person) can then be classified by evaluating the age data field with the decision tree, and the input data can be classified into a binary category, e.g., as either “yes” or “no.” The machine learning algorithm can also assign a weight value to this classification based on analyzing and/or evaluating further sets of input data. A weight value can be assigned to the “age” data field depending on how the machine learning algorithm evaluates age data fields of other input data sets and how much effect the age data field has on this particular decision tree. In this example and over the course of training the machine learning algorithm with many input data sets, the model can assign different weight to each data field or each feature when the model determines a quantifiable measure of how much each data field or features affects the overall classification when comparing the classification to the ground truth label.

An XGBoost machine learning algorithm can build and use decision trees sequentially, where each decision tree in sequence within the algorithm can be used to correct errors made by previous decision trees in the sequence. For example, processor 106 can train a machine learning algorithm (e.g., an XGBoost machine learning algorithm) and can evaluate a feature value for each decision tree. The processor (e.g., via executing the machine learning algorithm) can then select the features and thresholds that result in the most accurate classifications (e.g., matching the ground truth label). As an example, location profile classification system 102 and location profile classification model 112 can include a first feature labeled as nighttime entropy, where processor 106 calculates a nighttime entropy value by aggregating each location entropy value in a location data array being associated with a time window at night (e.g., time windows beginning at 6 PM and ending at 6 AM for a time period) The processor can train the machine learning algorithm by inputting the nighttime entropy value into the machine learning algorithm, and the machine learning algorithm can evaluate the nighttime entropy value against a decision tree, including the following binary evaluation: if the nighttime entropy value is greater than 0.8, classify the first feature as a gig driver; if the nighttime entropy value is less than or equal to 0.8, classify the first feature as a non-gig driver. The threshold of 0.8 (or for other decisions trees) can be modified and/or adjusted during training. As shown from this example, a single decision tree does not create a complicated evaluation. However, as the amount of data increases and the number of features used increases, the number of decision trees used in a machine learning algorithm also greatly increases, increasing the complexity of location profile classification model 112. Thus, the use of a machine learning algorithm to generate location profile classification model 112 and classify location profiles cannot be easily performed without a large amount of input data samples and computing resources (e.g., processing power and memory) for executing location profile classification model 112.

The processor can use the machine learning algorithm to evaluate each of the one or more features to determine whether each of the one or more features can be used to weight the location data array and/or location data into at least one classification. For example, the machine learning algorithm (e.g., via execution by the processor) can evaluate a first feature of the one or more features to determine whether the first feature should be weighted to classify a location data array in a first classification (e.g., a gig driver), or whether the first feature should be weighted to classify a location data array in a second classification (e.g., not a gig driver). The processor can use the machine learning algorithm to provide a different weight value to each feature of the one or more features to generate a trained machine learning model such that each feature can have a different effect on the classification within the trained machine learning model. Thus, a trained machine learning model can evaluate features input to the trained machine learning model and the trained machine learning model can reference the different weight values associated with each of the one or more features to determine a classification of the location profile, where each of the one or more features may have a different weight (and therefore a different contribution) to the classification of the location profile. The trained machine learning model can store a weight for each of the one or more features, where the trained classification model can be represented as a file including the weights, a data structure including the weights stored in a database, or another collection of data stored in a storage medium and/or device (e.g., cloud storage).

In a trained classification model, a weight associated with each of the one or more features can include a value and/or a multiplier applied to a feature. The processor (e.g., via execution of the machine learning algorithm during training) can assign a weight to a higher value (e.g., 0.5-1.0) for a feature where the feature consistently is related to a first type of classification label during training. Alternatively, the processor (e.g., via execution of the machine learning algorithm during training) can assign a weight to a lower value (e.g., 0.1-0.49) for a feature where the feature consistently is related to a second type of classification label during training. The processor (e.g., via execution of the machine learning algorithm during training) can assign the weight based on a feature's effect and/or importance in reducing classification error during training. For example, the processor can reference a first feature during training of the machine learning algorithm where the first feature results in a classification that matches the ground truth label, and the processor may assign a higher weight value to the first feature, indicating a greater effect on a correct classification and a reduction in model error. The processor can also reference a second feature during training of the machine learning algorithm where the second feature results in a classification that does not match the ground truth label, and the processor may assign a lower weight value to the second feature, indicating a lesser effect on a correct classification (and a greater effect on an incorrect classification) and an increase in model error.

Generally, the more features that are used to train a machine learning algorithm, the more accurate the trained machine learning model can be. However, this is not always the case. Sometimes, adding additional features to train a machine learning algorithm can result in overfitting of a model, noise within a model that can disrupt learning of patterns, and a needless increase in model complexity and training time. As disclosed herein, location profile classification system 102 can select and use a number of features relating to location profiles for training a machine learning algorithm such that location profile classification system 102 can generate an accurate location profile classification model 112 for classifying location profiles and/or location data arrays.

Figure 10:
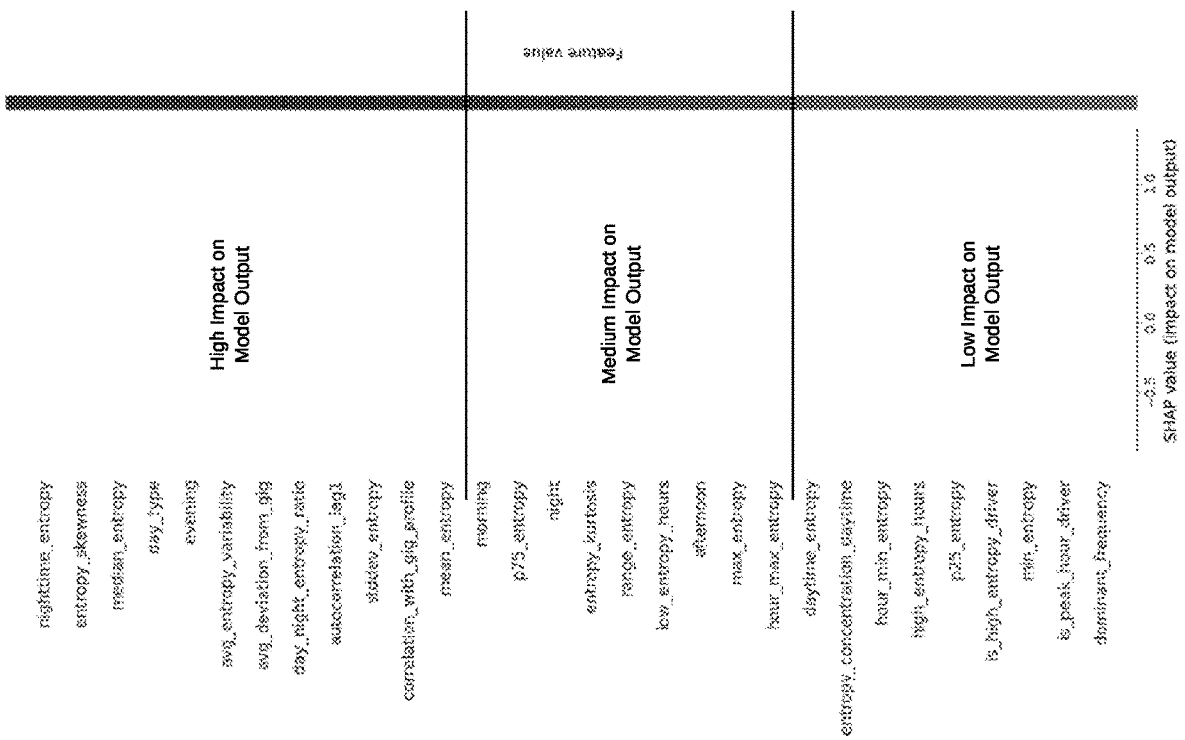
FIG. 10 is an exemplary classification of features classified into high impact, medium impact, and low impact on model output showing exemplary features that may be generated as disclosed herein.

In some embodiments, the processor (e.g., via execution of a machine learning algorithm) can capture interactions between and/or combinations of features. For example, processor 106 (e.g., via execution of location profile classification model 112) can determine that a grouping of the one or more features is more predictive and has a greater weight value than a single feature alone. As an example, a first feature of nighttime entropy and a second feature of entropy skewness can be more predictive of a classification than either feature alone. This could be due to one or more features being related based on the location entropy values and/or another property of the grouped features (e.g., location entropy values for daytime hours, location entropy values related to averages, and so forth). In some embodiments, where location profile classification model 112 is generated from an XGBoost machine learning algorithm, location profile classification model 112 can manage interactions of the one or more features automatically by generating deeper, layered decision trees that can account for multiple features of the one or more features at each layer of a layered decision tree. FIG. 10 shows a classification diagram 1000 showing exemplary features. Classification diagram 1000 shows exemplary features (e.g., of the one or more features described herein) and classification diagram 1000 shows how higher weighted features can have greater or lesser impact on an output generated by location profile classification model 112.

FIG. 10 shows an exemplary classification diagram 1000 of features classified into high impact, medium impact, and low impact on model output showing exemplary features that may be generated by processor 106 using received and/or captured location data as disclosed herein. For the exemplary classification diagram 1000 and the exemplary features, some features are shown in a high impact class, some features are shown in a medium impact class, and some features are shown in a low impact class. Features within the high impact class can be more likely to have a greater impact on the classification output of location profile classification model 112. Features shown in the high impact class (e.g., median entropy) can have a higher impact on location profile classification model 112 and how location profile classification model 112 classifies the location profile. For example, a feature in the high impact class may include a greater weight value in location profile classification model 112 than features in the medium impact class or low impact class. The feature in the high impact class can have greater influence on location profile classification model 112 such that location profile classification model 112 will classify a location profile into one classification output rather than another classification output. A possible classification in this instance could involve mobile computing platforms which more frequently travel and/or move around at nighttime and are frequently stationary during the day. As an example, the feature of nighttime_entropy can be classified in the high impact class because whether or not mobile computing platform 104 has higher location entropy at night can be a determining factor as to whether mobile computing platform is classified as a gig driver (e.g., higher nighttime entropy) or a non-gig driver (e.g., lower nighttime entropy). Thus, a feature such as nighttime_entropy can be a determinative feature for how location profile classification model 112 determines a classification output for a location profile. Similarly, daytime_entropy is shown in the low impact class. This suggests that daytime_entropy has little effect on the classification of a model in either direction. This may mean that each of the classification categories can exhibit similar daytime_entropy features, suggesting that this feature does not differentiate the categories of classifications as much or at all when compared to nighttime_entropy. Features in the high impact class can be influential in determining how a location profile is classified, and location profile classification system 102 can provide explainability for location profile classification model 112 by indicating which features from the location data array and/or the virtual path have more or less influence on the classification by location profile classification model 112. For example, the one or more features that are extracted from the location data array and/or virtual path and that are input to location profile classification model 112 for classification can be associated with a level of influence (e.g., low/medium/high, as shown in FIG. 10) each feature has on location profile classification output indicator 118 such that location profile classification model 112 can exhibit some level of explainability. The explainability of location profile classification model 112 can be exhibited based on analyzing and determining which of the one or more features had more influence on the output and how those features relate to the overall original location data and the final classification output (e.g., nighttime_entropy vs. daytime_entropy, sharp direction changes noted in the virtual path vs. no direction changes in the virtual path, and so forth). It should be understood that the features shown in FIG. 10 are exemplary and that more features, less features, additional features, or different features are envisioned.

In some instances, when processor 106 trains the machine learning algorithm, processor 106 can adjust performance of the trained machine learning model by tuning one or more hyperparameters of the machine learning algorithm. For example, where the machine learning algorithm trained is an XGBoost algorithm, processor 106 can adjust one or more hyperparameters of the algorithm, including but not limited to a maximum depth parameter of a decision tree to control and/or adjust model complexity, a minimum child weight parameter to prevent overfitting, a gamma parameter to set a minimum loss reduction to adjust decision making of the model, sizes and/or uses of subsamples of training data to prevent overfitting and promote generalization of the model, a feature parameter to set a number of features of the one or more features that are used for each decision tree, a learning rate parameter to adjust a step size of the model, a boosting parameter to adjust a number of boosting rounds of the model to adjust model performance while impacting training time, weight regularization parameters to penalize or promote different weights, an evaluation metric, and a rounds parameter to set a number of rounds to stop training if an evaluation metric does not improve for the set number of rounds.

Processor 106 can tune a machine learning algorithm and/or a trained machine learning model using cross-validation to evaluate the trained machine learning model using different combinations of hyperparameters and/or different values for different hyperparameters. For example, processor 106 can tune a machine learning algorithm using different combination of hyperparameters and processor 106 can train each model with training data. Processor 106 can select a best model out of the set of trained machine learning models generated through cross-validation. Then, processor 106 can test the trained machine learning using test data to evaluate the model before using the trained machine learning model to generate a classification output using live location data as input (e.g., a live location profile).

In some embodiments, processor 106 can tune and/or adjust hyperparameters to improve the trained machine learning model. For example, processor 106 can set an initial set of hyperparameters as follows: max_depth parameter=6, learning_rate parameter=0.1, subsample parameter=1.0, feature parameter=1.0, boosting parameter=100, where the initial set of hyperparameters can generate an AUC of 0.85 for an input test dataset. Processor 106 can then adjust the hyperparameters to an improved set of hyperparameters for better results with the trained machine learning model. For example, processor 106 can set a tuned set of hyperparameters as follows: max_depth parameter=8, learning rate parameter=0.05, subsample parameter=0.8, feature parameter=0.8, boosting parameter=200, where the tuned set of hyperparameters can generate an AUC of 0.91 for an input test dataset.

Processor 106 can tune hyperparameters like a max_depth parameter, a learning_rate parameter, a subsample parameter, and a feature parameter to improve the performance of the trained machine learning model. For example, by using cross-validation, processor 106 can ensure that the trained machine learning model can generalize to unseen data. Thus, processor 106 (and location profile classification model 112) can capture more complex patterns in location profiles (e.g., by using deeper decision trees) that are input to the machine learning algorithm, while maintaining improved generalization of the model (e.g., by adjusting the learning rate parameter while increasing the number of decision trees in the model) to balance performance with training time.

In some embodiments, the program code when executed can cause the processor to capture a time series of live location data of a live location profile for a mobile computing platform. For example, processor 106 can capture a time series of live (e.g., real-time) location data for mobile computing platform 104 (e.g., of a resource). Processor 106 can capture the time series of live location data in the same way or similar to how the location data is received from mobile computing platform 104 if the location data is received by processor 106 in real time. However, in some instances, processor 106 can receive the original location data from pre-captured and stored location data (e.g., data that was captured previously and stored in a database before being received by processor 106). Processor 106 can capture the live location data in real time where mobile computing platform 104 is associated with a resource (e.g. carried by a user, integrated in a vehicle of a resource, and so forth). Processor 106 can capture a live location data point at each time window (e.g., every hour) while mobile computing platform 104 is in motion or while mobile computing platform 104 is stationary. Processor 106 can capture successive time series of live location (e.g., a first time series of live location data, a second series of live location data, and so forth) from a single mobile computing platform 104 or multiple mobile computing platforms 104. The time series of live location data can represent a live location profile for mobile computing platform 104.

In some embodiments, the program code when executed can cause the processor to generate a new feature based on a time series of live location data for a live location profile. For example, processor 106 can generate a new feature for the one or more features based on the live location data. An example of a new feature that processor 106 can generate can include a feature describing an amount of time mobile computing platform 104 remains at a location in between a change of locations. For example, processor 106 can generate the new feature to describe location data indicating that mobile computing platform 104 is carried by and/or is traveling with a resource that is delivering packages to various locations, as the location data can indicate that mobile computing platform 104 remains at various locations having addresses for a short amount of time (e.g., around 5 or more minutes) indicating package drop-off and/or pick-up. Alternatively, processor 106 can generate the new feature to describe location data indicating that mobile computing platform 104 is carried by and/or is traveling with a resource that is picking up and/or dropping off passengers, as the location data can indicate the mobile computing platform remains at various locations along streets or roads (e.g., with or without distinct addresses) for a short amount of time (e.g., around 1-2 minutes) indicating passenger drop-off or pick-up.

Location profile classification system 102 can include a number of predetermined features of the one or more features that processor 106 can extract and/or generate from a location data array. In some instances, location profile classification system 102 can store, in location characteristic database 110, up to 30 formulas and/or definitions for extracting features from the location data array. Some possible example features are disclosed herein:

Mean Entropy: An average of location entropy values in a location data array across 24 hours of a day (e.g., out of 24 location entropy values in 24 time windows, each time window being 1 hour).

Median Entropy: A median of location entropy values in a location data array across 24 hours of a day.

StdDev Entropy: A standard deviation of location entropy values in a location data array.

Minimum Entropy: A minimum of location entropy values in a location data array across 24 hours of a day.

Maximum Entropy: A maximum of location entropy values across 24 hours of a day.

Range Entropy: Maximum Entropy−Minimum Entropy.

P25 Entropy: 25th percentile of location entropy values in a location data array.

P75 Entropy: 75th percentile of location entropy values in a location data array.

Daytime Entropy: An average of location entropy values between hour 8 and hour 20 in a location data array.

Nighttime Entropy: An average of location entropy values between hour 21 and hour 7 in a location data array.

Hour Maximum Entropy: An hour and/or a time window when a maximum location entropy value is observed in a location data array.

Hour Minimum Entropy: An hour and/or a time window when a minimum location entropy value is observed in a location data array.

Day-Night Entropy Ratio: Daytime Entropy/Nighttime Entropy.

Avg Entropy Variability: An average of (location entropy value−lag(previous location entropy value)), where lag(previous location entropy value) is a location entropy value of a previous hour and/or a previous time window in a location data array.

High Entropy Hours: A number of hours and/or time windows where a location entropy value is greater than 3 in a location data array.

Low Entropy Hours: A number of hours and/or time windows where a location entropy value is less than 1 in a location data array.

Morning Entropy: An average location entropy value between 6 am to 11 am in a location data array.

Afternoon Entropy: An average location entropy value between 12 pm to 5 pm in a location data array.

Evening Entropy: An average location entropy value between 6 pm to 11 pm in a location data array.

Night Entropy: An average location entropy value between 12 am to 5 am in a location data array.

Entropy Skewness: A skewness of location entropy values in a location data array.

Entropy Kurtosis: A kurtosis of location entropy values in a location data array.

Avg Deviation From Gig: An average of (location entropy value−average location entropy value of a mobile computing platform associated with a gig driver) in a location data array.

Correlation With Gig Location Profile: A correlation of location entropy values in a location data array with average location entropy values for a mobile computing platform associated with a gig driver.

High Entropy: An average location entropy that indicates whether average location entropy values for a location data array are greater than 3 or not.

Peak Hour Entropy: A location entropy value for a location data array that indicates a mobile computing platform traveling between 9 am and 6 pm.

Autocorrelation Lag 1: A correlation between a location entropy value in a location data array and a location entropy value of a previous hour and/or time window in the location data array.

Entropy Concentration Daytime: A total of location entropy values for all 24 hours and/or time windows within a day for a location data array (e.g., a total location entropy from 8 am to 8 am).

In some embodiments, the program code when executed can cause the processor to compute a Kullback-Leibler (KL) divergence model for at least two categories of a classification for the trained classification model. The KL divergence model can represent a distribution spanning values from 0 to 1. Processor 106 can determine a KL divergence metric for a location profile, and the KL divergence metric for the location profile can further inform a classification output of location profile classification model 112. For example, a KL divergence metric for a location profile closer to a value of 0 can indicate that characteristics of the location profile (e.g., characteristics based on the location entropy values, similar to the one or more features) can be classified into a first category of classification (e.g., a mobile computing platform that is associated with a resource that is a gig driver). Alternatively, a KL divergence metric for a location profile closer to a value of 1 can indicate that characteristics of the location profile can be classified into a second category of classification (e.g., a mobile computing platform that is associated with a resource that is a non-gig driver). Processor 106 can compute the KL divergence model based on training of the machine learning and/or past classification outputs generated by location profile classification model 112. The KL divergence model can include an estimate of a threshold KL divergence metric where the first category of classification meets the second category of classification (e.g., a cross-over threshold). For example, the KL divergence model could indicate that a KL divergence metric of 0.47 is a threshold for the first category of classification into the second category of classification. In this instance, a location profile having a KL divergence metric of 0.3 would be classified into the first category of classification, while a location profile having a KL divergence metric of 0.7 would be classified into the second category of classification. The KL divergence model is used to classify live location profiles derived from privacy-preserved remapped virtual paths without requiring absolute location coordinates. The KL and JS divergence calculations solve the technical problem of comparing location profiles derived from privacy-preserved coordinate data (remapped virtual paths) against reference profiles, where conventional distance metrics cannot be applied because absolute coordinates are not available.

The use of KL/JS divergence with location entropy values enables classification without absolute coordinates, which is not possible with conventional distance metrics. This provides a mathematically sound basis for classification while maintaining privacy of collected location data.

In some embodiments, the program code when executed can cause the processor to determine a first predetermined location profile of the first category of classification and a second predetermined location profile of the second category of classification. For example, processor 106 can determine a first and/or a second predetermined location profile for a classification based on a predetermined location profile and a ground truth label. Processor 106 can generate a predetermined location profile corresponding to the first category of classification and label the location profile as belonging to the first category of classification. Processor 106 can also do this for the second category of classification. Processor 106 can generate predetermined location profiles for the categories of classification in various other ways, such as comparing various data distributions of location profiles to classification outputs of location profile classification model 112. In some embodiments, processor 106 can generate the predetermined location profiles of the categories of classification based on mean location entropy values for location profiles classified into each category. The predetermined location profiles for the categories of classification can act as a benchmark for comparing classification outputs of location profile classification model 112 and location profile data distributions, such that processor 106 can improve location profile classification model 112 by minimizing a difference between a data distribution of input location profiles and corresponding classification outputs versus the predetermined location profiles of the categories of classification.

Processor 106 can use the KL divergence model and a Jensen-Shannon (JS) divergence with the ideal models for the categories of classification to minimize a difference between the KL divergence models and the ideal models.

Thus, processor 106 can improve location profile classification model 112 by using the ideal models for the classification categories as a goal and/or a benchmark for model performance and classification.

In some embodiments, the program code when executed can cause the processor to determine a KL divergence metric for the live location profile and compare the KL divergence metric to the first ideal model and the second ideal model using the KL divergence model. Processor 106 can use the KL divergence metric to improve classification performance of location profile classification model 112 by determining KL divergence metrics for unsupervised location profiles, and label the unsupervised location profiles for further training of location profile classification model 112. For example, processor 106 can determine a KL divergence metric for the live location profile based on the following:

$D\_KL(P\|Q)=\Sigma_i\ P(i)*\log(P(i)/Q(i))$, where D_KL is the KL divergence metric, P is a live location profile or a location profile based on location entropy values derived from location data received at processor 106 (e.g., training data), Q is an ideal model of at least one of the categories of classification, and i is an element of the location data array including location entropy values.

In some embodiments, processor 106 can use KL divergence and JS divergence for classification in a specific way that is uniquely suited for privacy-preserving location profile classification. The divergence-based classification method includes the following specific steps, as shown in FIG. 18.

Figure 18:
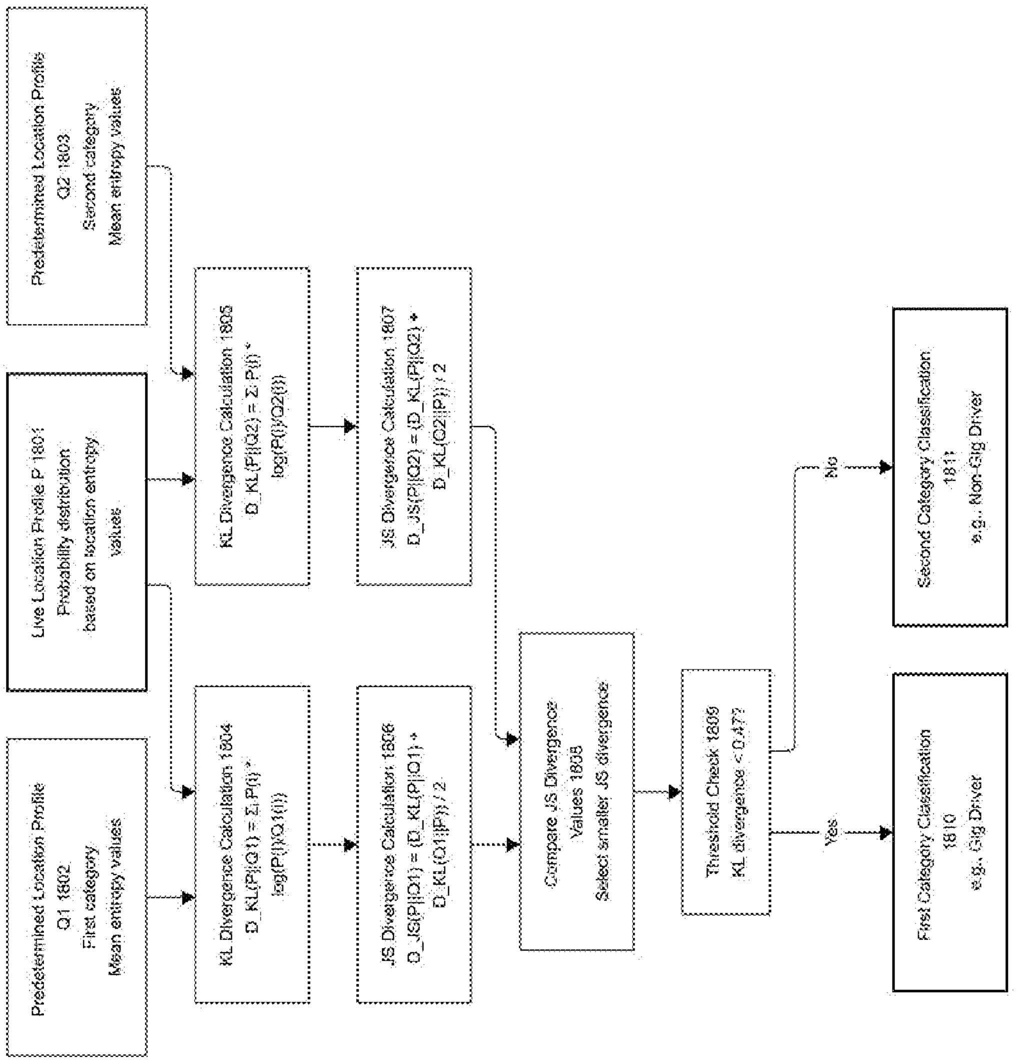
FIG. 18 is a diagram of an exemplary KL/JS divergence-based classification method as disclosed herein.

As shown in FIG. 18, processor 106 can represent location profiles as probability distributions over location data clusters. Each location profile (live or predetermined) is represented as a probability distribution P={p_1, p_2, . . . , p_N}, where p_i is the probability (proportion) of visits to location data cluster i, and N is the total number of location data clusters. As shown in FIG. 18, the live location profile P 1801 is compared against predetermined location profiles Q1 1802 (first category) and Q2 1803 (second category).

As shown in FIG. 18, at steps 1804 and 1805, processor 106 can calculate KL divergence between a live location profile P and predetermined location profiles Q1 and Q2 using the formula: $D\_KL(P\|Q)=\Sigma_i\ P(i)*\log(P(i)/Q(i))$, where P is a live location profile 1801 based on location entropy values derived from location data, Q is a predetermined location profile (Q1 1802 or Q2 1803, e.g., mean location entropy values for a category), i is an element of a location data array including location entropy values. The sum is taken over all location data clusters i. As shown in FIG. 18, processor 106 can use KL divergence calculation 1804 to compute D_KL(P||Q1) and KL divergence calculation 1805 computes D_KL(P||Q2).

As shown in FIG. 18, at steps 1806 and 1807, processor 106 can calculate JS divergence between a live location profile P and predetermined location profiles Q1 and Q2 using the formula: D_JS(P||Q)=(D_KL(P||Q)+D_KL(Q||P))/2, where D(P||Q) is the KL divergence between P and Q, and D(Q||P) is the reverse KL divergence. As shown in FIG. 18, processor 106 can use JS divergence calculation 1806 to compute D_JS(P||Q1) and JS divergence calculation 1807 computes D_JS(P||Q2).

As shown in FIG. 18, at step 1808, processor 106 can compare JS divergence values 1808 and classify the live location profile as matching whichever predetermined location profile has the smaller JS divergence with the live location profile. This provides an objective, mathematical basis for classification.

As shown in FIG. 18, at step 1809, processor 106 can use a threshold check 1809 with a threshold KL divergence metric (e.g., 0.47) to determine classification categories. A location profile with KL divergence metric less than the threshold is classified into the first category classification 1810 (e.g., gig driver), while a location profile with KL divergence metric greater than or equal to the threshold is classified into the second category classification 1811 (e.g., non-gig driver). A measure of KL divergence can measure how one probability distribution diverges from a reference distribution. For example, KL divergence can provide a scalar metric representing how atypical behavior and/or movement of a mobile computing platform is compared to a known distribution (e.g., a gig-driver population/profile). KL divergence can serve as a similarity metric. A threshold KL divergence metric can be equal to a value between 0.0 and 1.0 (e.g., inclusive) based on ideal profiles of the various classifications.

Unlike conventional distance metrics (e.g., Euclidean distance, Mahalanobis distance) that require absolute coordinates, KL/JS divergence works with probability distributions derived from location entropy values, enabling classification without absolute coordinates. KL/JS divergence are well-established statistical tools for comparing probability distributions, providing a mathematically sound basis for classification. The divergence metrics work naturally with location entropy values, which are themselves probability-based measures, creating a coherent statistical framework for classification. This divergence-based classification method solves the technical problem of comparing location profiles derived from privacy-preserved coordinate data (remapped virtual paths) against reference profiles, where conventional distance metrics cannot be applied because absolute coordinates are not available. For example, CN112861176A describes divergence metrics (Hellinger divergence) for location privacy evaluation. However, the Hellinger divergence, not KL/JS divergence, focuses on evaluating privacy protection algorithms, not classifying location profiles.

In some embodiments, the program code when executed can cause the processor to calculate a JS divergence for the live location profile to determine whether the live location profile more closely matches the first ideal model or the second ideal model. For example, processor 106 can calculate a JS divergence for the live location profile to determine whether the live location profile more closely matches the first ideal model or the second ideal model. Processor 106 can use the JS divergence calculation as a loss function to improve classification performance of location profile classification model 112. The KL divergence and JS divergence calculations are integrated into a practical application of privacy-preserving location profile classification. The KL/JS divergence are used to compare live location profiles (derived from privacy-preserved remapped virtual paths) against predetermined location profiles, enabling automated classification without requiring absolute location coordinates. This integration solves the technical problem of classifying location profiles while preserving privacy, which cannot be achieved using conventional location-based classification systems that require absolute coordinates. For example, processor 106 can determine the JS divergence for the live location profile based on the following:

(D(P||1Q)+D(Q||P))/2, where D(P||Q) is a divergence between the live location profile and an ideal profile and D(Q||P) is a reverse divergence between the live location profile and an ideal profile. The IS divergence can be calculated for Q as an ideal profile where Q is either the first ideal model (for a first classification category) or the second ideal model (for a second classification category).

In some embodiments, processor 106 can calculate a JS divergence for the live location profile to classify the live location profile as matching whichever of the predetermined location profiles has a smaller JS divergence with the live location profile. As used herein, "more closely matching" refers to a classification determination based on comparing JS divergence values between the live location profile and each predetermined location profile. A live location profile is classified as "more closely matching" the predetermined location profile that has the smaller JS divergence value with the live location profile. That is, if the JS divergence between the live location profile and the first predetermined location profile is less than the JS divergence between the live location profile and the second predetermined location profile, then the live location profile is classified as matching the first predetermined location profile. Conversely, if the JS divergence between the live location profile and the second predetermined location profile is less than or equal to the JS divergence between the live location profile and the first predetermined location profile, then the live location profile is classified as matching the second predetermined location profile. This provides an objective, mathematical basis for determining which predetermined location profile a live location profile most closely matches.

In some embodiments, the program code when executed can cause the processor to generate an output of the trained classification model based on a time series of live location data input to the trained classification model. The output can include an indicator stored in at least one of the memory and/or the location characteristic database indicating a classification of a location profile. For example, processor 106 (e.g., via location profile classification model 112) can generate an output of location profile classification model 112 based on a time series of live location data input to location profile classification model 112. The output can include an indicator stored in at least one of memory 108 and/or location characteristic database 110. The output indicator can include a data object indicating a classification of a location profile (e.g., the location profile of mobile computing platform 104 carried by a user or within a vehicle associated with a resource).

Processor 106 and/or location profile classification model 112 can generate an output of the trained classification model based on analyzing the location entropy values of the mobile computing platform without using the location data points. The location data captured for mobile computing device 104 is not required for location profile classification model 112 to generate an output for classifying the location profile.

The processor can capture the live location data and generate one or more features from the live location data for inputting to a trained machine learning model for classification. For example, processor 106 can capture live location data from mobile computing platform 104 to generate one or more features and a location data array from the live location data. Processor 106 can then input the one or more features and the location data array into location profile classification model 112 for classifying a location profile associated with the live location data. Location profile classification model 112 (e.g., via execution by processor 106 as a model based on an XGBoost algorithm) can pass each feature value of the one or more features through sequential decision trees in the model. Each of the sequential decision trees can contribute a value to a final classification. For example, location profile classification model 112 can sum each value from each of the sequential decision trees to generate a result value. Location profile classification system 102 can then generate a probability value (e.g., representing a probability of the classification) using a sigmoid function on the result value. Location profile classification system 102 can determine whether the probability value exceeds a classification threshold (e.g., 0.5) to determine whether to classify the location profile as a first classification category or a second classification category (e.g., the probability value is equal to or less than the threshold).

In some instances, when processor 106 determines a KL divergence metric of a location profile during classification with location profile classification model 112, processor 106 can convert the KL divergence metric to a likelihood of the location profile being classified into a classification category. For example, processor 106 can determine the likelihood based on the following: L=exp(−KL), where L is a measure of likelihood and KL is the KL divergence metric for the location profile. Processor 106 can also calculate a probability that the location profile is correctly classified into either the first category of classification or the second category of classification. For example, processor 106 can calculate the probability based on the following: P(first category)=L_first_category/(L_first_category+L_second_category), where L is a likelihood of the location profile being classified into a classification category (e.g., either the first or second classification category). A relationship for the probability of the location profile being in the second category of classification would be similar, using the likelihood of the location profiling belonging to the second category of classification. Then location profile classification model 112 (e.g., via execution by processor 106) can classify the location profile based on a probability threshold (e.g., 0.5) where location profile classification model 112 can classify the location profile in the first category of classification if the calculated probability is greater than the probability threshold and location profile classification model 112 can classify the location profile in the second category of classification if the calculated probability is less than the probability threshold.

In some embodiments, the program code when executed can cause the processor to associate a location profile with an account identifier in the location characteristic database based on a classification of a location profile indicated by an output of the trained classification model. For example, processor 106 can associate a location profile with an account identifier in location characteristic database 110 based on location profile classification output indicator 118. For example, an account identifier can be previously associated with mobile computing platform 104 in location characteristic database 110. Processor 106 can store a location profile and/or location profile classification output indicator 118 in a new data field in location characteristic database 110 to add location profile classification output indicator 118 to the account data.

In some embodiments, processor 106 can detect that the classification of the location profile mismatches with at least one data field associated with an account stored in the location characteristic database corresponding to the account identifier. For example, processor 106 can detect that the classification of the location profile match or does not match a data field associated with an account stored in location characteristic database 110, where the data field identifies a type of account, a type of resource, a type of mobile computing device, and/or the like. The data field can identify at least one property of an account, such as a use of a mobile computing device associated with the account. In some embodiments, the data field can include a property of an account associated with an insurance policy, where the data field describes a resource's use of a vehicle. For example, processor 106 can use the classification output to detect that the classification of the location profile is inconsistent with the data field and/or a use of a mobile computing device and/or a vehicle. Processor 106 can determine at least one characteristic of the location profile that was classified and compare the characteristic with a data field associated with the resource account in location characteristic database 110 to determine whether the characteristic of the location profile matches the value of the data field. If processor 106 determines that the data field does not match the determined characteristic of the location profile within a threshold and/or level of similarity, processor 106 can flag the account for further review and/or action by indicating a flag in the account data object stored in location characteristic database 110.

Processor 106 can store the output including an indicator in at least one of memory and/or a location characteristic database indicating a classification of a location profile. Processor 106 can also access the location characteristic database to determine a number of location profile that are classified in the same classification as the location profile indicated by the output of the trained classification model. For example, processor 106 can store multiple classification outputs in location characteristic database 110 as location profile classification model 112 generates classification outputs based on live location profiles and/or previously captured location profiles.

In some embodiments, processor 106 can generate a new account having a new account type associated with the location profile in the location characteristic database. For example, processor 106 can generate a new account having an account identifier and processor 106 can store the new account and the account identifier in location characteristic database 110 to be associated with a resource and/or mobile computing device 104. Processor 106 can generate the new account and new account type based on classifying plural location profiles such that processor 106 determines a majority of the plural location profiles do not match existing account types, and thus a new account type should be generated. The new account type can be associated with at least one characteristic of the classification of the location profile. For example, a characteristic of the classification of the location profile could include increased travel during night hours. Based on this characteristic, processor 106 could generate a new account having a new account type relating to nighttime delivery, an insurance account for a mobile computing platform associated with a gig driver that drives at night, or another type of account storing data for mobile computing device 104 and an associated resource (e.g., a user) that frequently travels at night.

In some embodiments, the program code when executed can cause the processor to update or recommend an update to a data field associated with an account identifier in the location characteristic database to take action on an account (effect an account action) corresponding to the account identifier. The processor 106 can update or recommend an update for an existing data field associated with the account identifier in location characteristic database 110. Such a field could include an account access permission, an account payment value, and/or the like. Processor 106 can take action on the account by locking or unlocking the account or by changing a data field to cause the account to behave differently for a resource.

In some embodiments, the program code when executed can cause the processor to produce an insurance related product associated with an account of a resource based on a classification of a location profile indicated by an output of the trained classification model. For example, processor 106 can produce an insurance related product (e.g., a calculated insurance premium, a claim approval/denial) associated with an online account of a resource based on a classification of a location profile indicated by an output of location profile classification model 112. An insurance related product can include an indicator and/or a signal output of processor 106 based on processor 106 calculating an insurance premium for a resource account of a driver based on the driver's information, the driver's vehicle information, and the output indicating a classification of the location profile associated with the driver. Processor 106 can update a data field in location characteristic database 110 by storing the indicator and/or signal output in a data field associated with an account identifier corresponding to an account of a resource.

In some embodiments, processor 106 can adjust or recommend an adjustment (potentially in real time) an insurance premium associated with an account of a resource depending on a live classification of a location profile or an average of a classification of the location profile over time. For example, a location profile can be classified by location profile classification model 112 as a profile of a gig driver for 8-months out of a year and as a profile of a home-office employee for the other 4-months of the year. In this instance, processor 106 can adjust or recommend an adjustment to an insurance premium associated with an account of a resource of mobile computing platform 104 (e.g. on a monthly basis) depending on the classification determined by location profile classification model 112 using location data obtained from mobile computing platform 104 of a resource over the year. Such an automated determination of a classification for a location profile can result in improved real-time classification without requiring unnecessary collection of sensitive data.

The number and arrangement of systems, hardware, and/or components shown in FIG. 1 is provided as an example. There can be additional systems, hardware, and/or components, fewer systems, hardware, and/or components, different systems, hardware, and/or components, or differently arranged systems, hardware, and/or components than those shown in FIG. 1. Furthermore, two or more systems, hardware, and/or components shown in FIG. 1 can be implemented within a single system, hardware, and/or component. A single system, hardware, and/or component shown in FIG. 1 can be implemented as multiple, distributed systems, hardware, and/or components. Additionally, or alternatively, a set of systems, a set of hardware, and/or a set of components (e.g., one or more systems, one or more hardware devices, one or more components) of FIG. 1 can perform one or more functions described as being performed by another set of systems, another set of hardware, or another set of components of FIG. 1.

Figure 2:
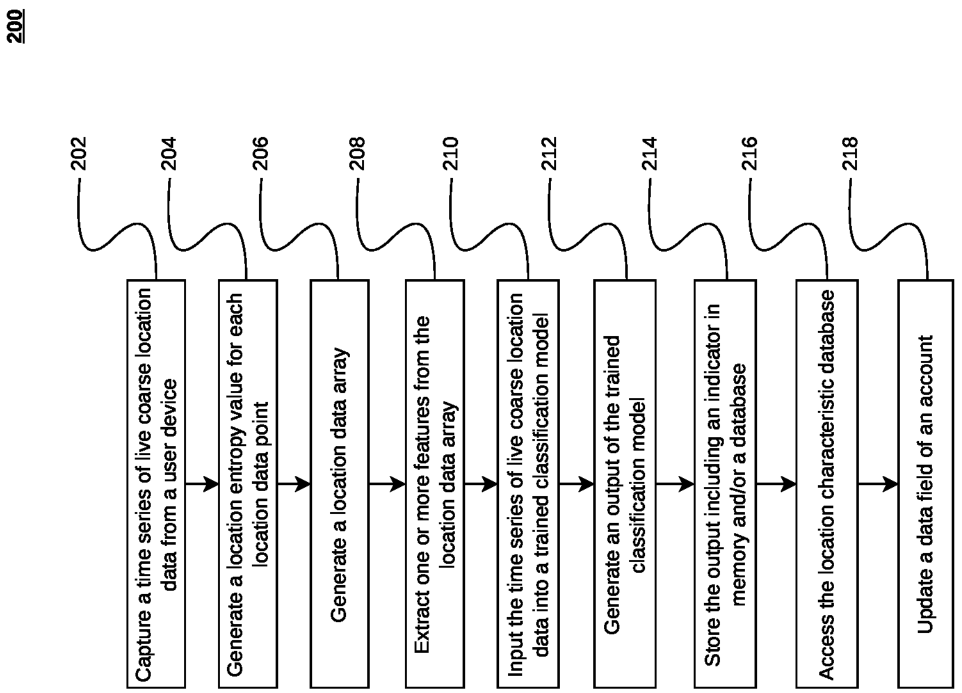
FIG. 2 is a flow diagram of an exemplary method for classifying a location profile based on location entropy values derived from location data as disclosed herein.

FIG. 2 shows a flow diagram of an exemplary method 200 for classifying a location profile based on location entropy values derived from location data as disclosed herein. In some embodiments, one or more of the functions described with respect to method 200 can be performed (e.g., completely, partially, etc.) by location profile classification system 102 (e.g., via processor 106). In some embodiments, one or more of the steps of method 200 can be performed (e.g., completely, partially, etc.) by another system, hardware, or component or a group of systems, hardware, or components separate from or including location profile classification system 102, such as a client device, a server, and/or a separate computing device.

As shown in FIG. 2, at step 202, method 200 can include capturing a time series of live location data from a mobile computing platform. For example, location profile classification system 102 (e.g., via processor 106) can capture a time series of live location data from mobile computing platform 104 (e.g., associated with a resource, of a user, integrated within a vehicle, and so forth). The time series of live location data can include a series of location data points over time. Each location data point can include location data having reduced accuracy. The time series of live location data can be captured by location profile classification system 102 in real time as mobile computing platform 104 moves about (e.g., with a user, with a resource, within a vehicle, etc.). At each time window (e.g., every hour), location profile classification system 102 can capture a location data point corresponding to that time window. Live location data can be captured to reduce a total amount of data collected and used for training a machine learning algorithm, thereby reducing the need for collection of sensitive data.

Live location data refers to location data that location profile classification system 102 (e.g., processor 106 thereof) collects and/or receives in real time with respect to a location of a mobile computing platform. For example, live location data includes location data that processor 106 collects from mobile computing platform 104 simultaneously (or near simultaneously, within no more than a few seconds) with respect to when the location data is generated and/or processed for mobile computing platform 104. Generally, live location data refers to location data that processor 106 collects in real time from mobile computing platform 104 and does not include location data that has been previously stored (e.g., in location characteristic database 110, or another storage device) before being received by processor 106. In other configurations, location data can refer to training data collected and/or used to train a machine learning algorithm, where live location data refers to location data collected and/or used as input to a trained machine learning model for generating an output (e.g., an inference, a classification, and so forth).

As shown in FIG. 2, at step 204, method 200 can include generating a location entropy value for each location data point. For example, processor 106 can generate a location entropy value for each time window at a recurring time interval based on a number of location data clusters where a mobile computing platform is detected and a percentage of time a mobile computing platform is detected at each location data cluster to generate the location data array. The location data array can associate a location entropy value with each detected location data cluster in each time window. Processor 106 can generate a location entropy value (e.g., a confidence factor associated with a location variance) for each time window at the recurring time interval based on a number of location data clusters where a mobile computing platform is detected and a percentage of time a mobile computing platform is detected at each location data cluster to generate the location data array associating a location entropy value with each detected location data cluster in each time window. Processor 106 can determine the location entropy values using the methods described herein, such as by route mapping.

As shown in FIG. 2, at step 206, method 200 can include generating a location data array. For example, processor 106 can generate a location data array associating each location entropy value with a detected location data cluster in each time window. Processor 106 can associate the location entropy value with a time corresponding to a time window (e.g., each hour) and a detected location data cluster. The detected location data cluster can include a cluster of location data points where a mobile computing platform was detected and had a location data point collected therefrom. Each time the mobile computing platform is detected within the cluster of location data points (e.g., within a radius), location profile classification system 102 can store a count of the location data cluster and whichever location data cluster has the greatest count within the time window is the location data cluster that is associated with the location entropy value. Location profile classification system 102 can use the location data clusters to further reduce accuracy of the location data, only requiring and using a general cluster radius area in the location data array with the location entropy values rather than the location data points themselves.

As shown in FIG. 2, at step 208, method 200 can include extracting one or more features from the location data array. For example, processor 106 can extract one or more features from the location data array using the location entropy values and/or the time windows for the location entropy values. The one or more features can be meaningful time-based features that can be engineered and/or determined from location entropy values and the time windows (e.g., from the location data array). The one or more features extracted from the location data array can include statistical features, temporal features, or other groupings of location entropy values, including examples described herein.

As shown in FIG. 2, at step 210, method 200 can include inputting the time series of live location data into a trained classification model. For example, location profile classification system 102 (e.g., via processor 106) can input the time series of live location data into location profile classification model 112. The time series of live location data can be input to location profile classification model 112 immediately after the time series is captured (e.g., at the end of a time period) to classify the location profile associated with mobile computing platform 104.

As shown in FIG. 2, at step 212, method 200 can include generating an output of the trained classification model. For example, location profile classification system 102 can generate location profile classification output indicator 118 as an output of location profile classification model 112 based on the time series of live location data being provided as input. Location profile classification output indicator 118 can include a data object indicating a classification of the location profile associated with mobile computing platform 104. Location profile classification output indicator 118 can be stored in memory 108 and/or location characteristic database 110 associated with mobile computing platform 104 for later reference.

As shown in FIG. 2, at step 214, method 200 can include storing the output including an indicator in memory and/or a database. For example, location profile classification system 102 can store location profile classification output indicator 118 in at least one of memory 108 and/or location characteristic database 110 (e.g., via an integer, enumeration, or string data type). Location profile classification output indicator 118 can indicate a classification of the location profile as associated with mobile computing platform 104 and/or a resource associated with mobile computing platform 104.

As shown in FIG. 2, at step 216, method 200 can include accessing the location characteristic database. For example, processor 106 can access location characteristic database 110 to associate the location profile with an account identifier based on the classification of the location profile indicated by location profile classification output indicator 118. Processor 106 can access location characteristic database 110 to store the location profile in a data structure and/or data field associated with an account identifier stored in location characteristic database 110 to associate the location profile with an account of a resource (e.g., a user of mobile computing platform 104 from which location data for the location profile was collected). This allows processor 106 to associate the location profile with a corresponding account of a resource such that location profile classification system 102 can know which account to use for effecting an account action based on the account identifier and/or the location profile. In addition, processor 106 can store location profile classification output indicator in location characteristic database 110 to associate a classification label of the location profile with an account of a resource. By associating the classification label (e.g., location profile classification output indicator 118) with an account of a resource, processor 106 can determine what location profile classification model 112 classified a location profile as and thus label the account (and thus a resource of mobile computing platform 104) with that same classification.

In some embodiments, method 200 can include producing an insurance related product. For example, location profile classification system 102 can produce an insurance related product (e.g., insurance premium, claim approval/denial) via an indicator and/or a signal output from processor 106 for mobile computing platform 104 associated with and/or carried by the driver of the vehicle based on location profile classification output indicator 118 of the driver. The classification of the location profile can be indicated by location profile classification output indicator 118 in that location profile classification output indicator 118 can include a value (e.g., an integer, enumeration, or string data type) corresponding to a classification type and/or a characteristic of the location profile. For example, location profile classification output indicator 118 can indicate a value of 2 where 2 corresponds to a postman classification in the program code executed by processor 106. The location profile can be associated with a driver of a vehicle and associated with an account for the driver.

In some embodiments, a single classification can include one or more characteristics such that location profile classification output indicator 118 can include a data structure indicating an integer value and a Boolean value. For example, location profile classification output indicator 118 can include a data structure including a first data field indicating a value of 2 where 2 corresponds to a postman classification for a location profile in the program code executed by processor 106 and location profile classification output indicator 118 can include a second data field indicating a value of "False" or "0" where "False" corresponds to a classification of a location profile that does not correspond to a postman. Location profile classification output indicator 118 can classify mobile computing platforms 104 as a classification type and also a Boolean value of whether or not mobile computing platform 104 of the location profile meets that classification. In some embodiments, the Boolean indicator could include another type of indicator, such as a second integer data field or an enumeration data field, to provide a classification type with multiple characteristic types (e.g., classification type: a location profile for a person with children; characteristics types: no children, 1 child, 2 children, etc.).

As shown in FIG. 2, at step 218, method 200 can include updating a data field of an account. For example, location profile classification system 102 can update a data field associated with an account identifier in location characteristic database 110 to take action on an account corresponding to the account identifier. Location profile classification system can perform an account action directly by updating a data field of an account within location characteristic database 110 without action and/or intervention from an operator. In some instances, location profile classification system 102 can take an account action by providing a suggestion to an operator (e.g., an operator of location profile classification system 102, location characteristic database 110, or the account) such that the operator can effect an account action on the account (e.g., updating a data field in the account) based on the suggestion. Additionally, location profile classification system 102 can take an account action by providing identification information to an operator. For example, location profile classification system 102 can cause a display device to display an account update identifier for an account where an operator is interacting with the display device. Location profile classification system 102 can generate and render a computer-generated reasoning included in an account update identifier (e.g., displayed in a text format on the display device) indicating to the operator an option to change a pricing field in the account associated with the resource (e.g., with some recommendations as to new pricing). Location profile classification system 102 can also issue a flag identifier via a display device to the operator to flag a resource's account to be considered for a change and/or update. Alternatively, location profile classification system 102 can transmit a message to an operator. For example, location profile classification system 102 can transmit a message (e.g., a direct message or group message transmitted via a separate messaging service or a messaging service within the same platform) to an operator to allow the operator to update an account associated with a resource. Other examples of location profile classification system 102 transmitting messages can include transmitting a text message to an operator to review a recommended update to a data field (e.g., for pricing) for an account associated with a resource, or providing a visual indication in a software interface displayed on a display device for the operator to consider updating another data field of a resource's account for a proposed reason.

Steps of method 200 can be performed in various orders and sequences and are not necessarily limited to being performed in the order shown in FIG. 2. Accordingly, steps of method 200 are not limited to any particular order and can be performed by various components, whether location profile classification system 102 is implemented on a single computing device or multiple, distributed computing devices. Steps of method 200 can also be performed by a single component of location profile classification system 102 or by multiple components of location profile classification system 102.

Figure 3:
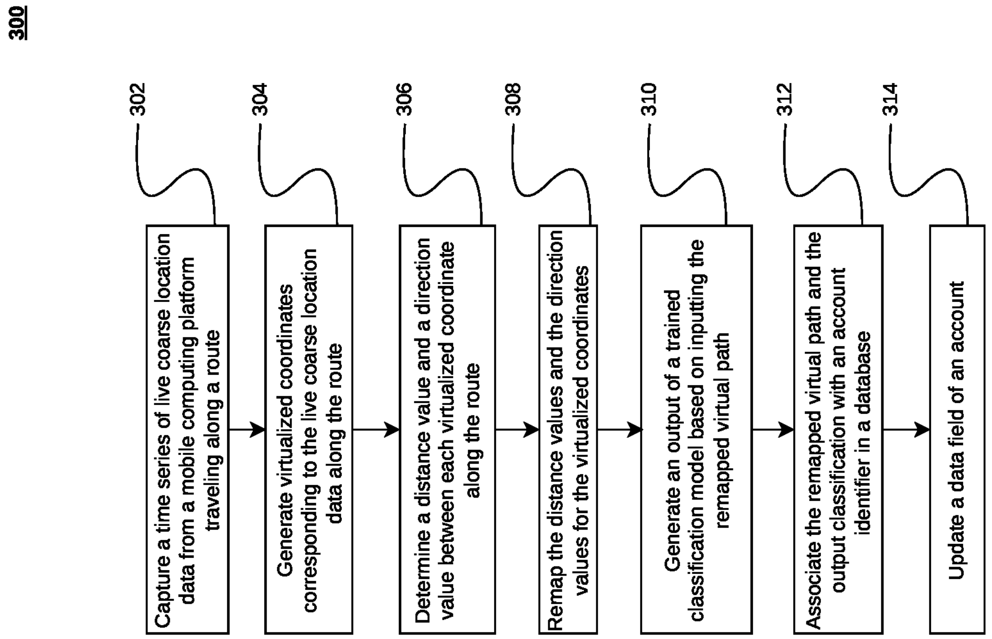
FIG. 3 is a flow diagram of an exemplary method for classifying a location profile based on remapped virtual paths as disclosed herein.

FIG. 3 shows a flow diagram of an exemplary method 300 for classifying a location profile based on remapped virtual paths as disclosed herein. In some embodiments, one or more of the functions described with respect to method 300 can be performed (e.g., completely, partially, etc.) by location profile classification system 102 (e.g., via processor 106). In some embodiments, one or more of the steps of method 300 can be performed (e.g., completely, partially, etc.) by another system, hardware, or component or a group of systems, hardware, or components separate from or including location profile classification system 102, such as a client device, a server, and/or a separate computing device.

As shown in FIG. 3, at step 302, method 300 can include capturing a time series of live coarse location data from a mobile computing platform traveling along a route. For example, processor 106 can capture a time series of live coarse location data from mobile computing platform 104 traveling along a route. Processor 106 can immediately use the live coarse location data for mobile computing platform 104 and/or processor 106 can store the live coarse location data for mobile computing platform 104 in location characteristic database 110 for later use and/or training of machine learning algorithms.

At step 304, method 300 can include generating virtualized coordinates corresponding to the live coarse location data along the route. For example, processor 106 can generate virtualized coordinates corresponding to the live coarse location data along the route. Virtualized coordinates can include location coordinates that are mapped relative to each other in a different coordinate reference frame that removes absolute locations from the original location data. For example, processor 106 can map virtualized coordinates from absolute latitude/longitude values to virtualized coordinates that set a start point of a path or an end point of a path on an origin (e.g., 0, 0) of a relative coordinate reference frame. Processor 106 can use other methods for mapping original coordinates of location data to virtualized coordinates.

At step 306, method 300 can include determining a distance value and a direction value between each virtualized coordinate along the route. For example, processor 106 can determine a distance value and a direction value for a vector between each virtualized coordinate along the route in the relative coordinate system.

At step 308, method 300 can include remapping the distance values and the direction values for the virtualized coordinates. For example, processor 106 can remap the distance values and the direction values for the virtualized coordinates using a remapping function (e.g., a hash-based function, an encryption function, and so forth). In some embodiments, processor 106 can use a remapping function to change a shape of a virtual path (e.g., into a remapped virtual path) while simultaneously preserving privacy and location entropy values of the original location data.

At step 310, method 300 can include generating an output of a trained classification model based on inputting the remapped virtual path. For example, processor 106 can generate an output classification for the mobile computing platform using a trained classification model based on inputting a remapped virtual path to the trained classification model. Processor 106 can train machine learning algorithms to generate the trained classification model using previously captured location data and virtual paths and/or remapped virtual paths.

In some embodiments, the virtual paths correspond to plural routes of one or more mobile computing platforms, and wherein the classification model is configured to classify a type or characteristic of a location profile based on the remapped virtual paths. For example, the virtual paths can be generated based on coarse location data for original routes for a mobile computing platform. Processor 106 can use the trained classification model and the remapped virtual path as input to the trained classification model to classify a type or characteristic of a location profile based on the remapped virtual path.

At step 312, method 300 can include associating the remapped virtual path and the output classification with an account identifier in a database. For example, processor 106 can associate the remapped virtual path and the output classification with an account identifier for mobile computing platform 104 in the location characteristic database such that processor 106 can access and/or effect changes to the account for mobile computing platform 104 based on the remapped virtual path and corresponding classification output indicator 118.

At step 314, method 300 can include updating a data field of an account. For example, processor 106 can update a data field associated with an account identifier in the location characteristic database to take action on an account corresponding to the account identifier as disclosed herein.

Steps of method 300 can be performed in various orders and sequences and are not necessarily limited to being performed in the order shown in FIG. 3. Accordingly, steps of method 300 are not limited to any particular order and can be performed by various components, whether location profile classification system 102 is implemented on a single computing device or multiple, distributed computing devices. Steps of method 300 can also be performed by a single component of location profile classification system 102 or by multiple components of location profile classification system 102.

Figure 4A:
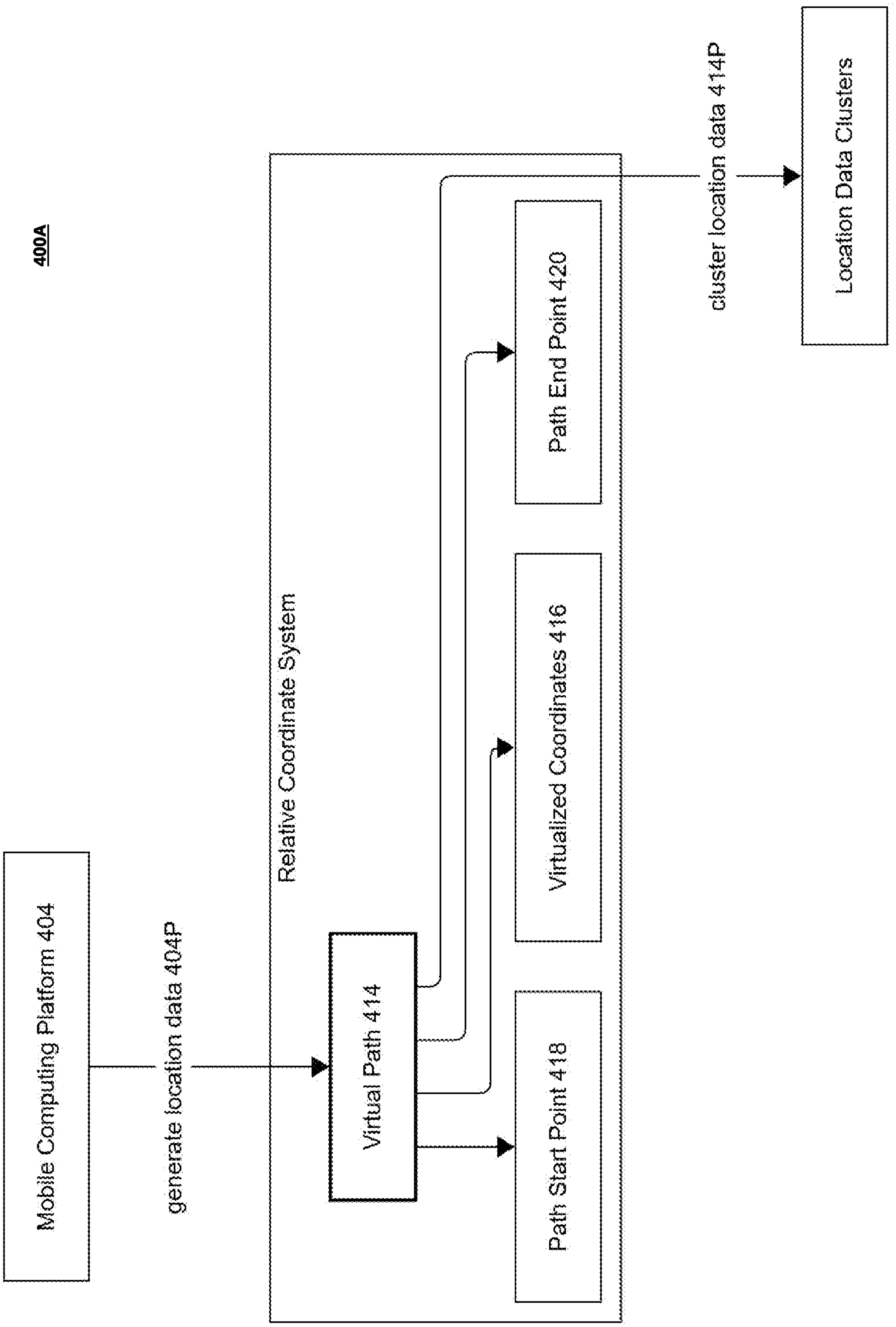
FIG. 4A is a diagram of an exemplary configuration of a virtual path and component functions based on collected coarse location data of a mobile computing platform as disclosed herein.
Figure 4B:
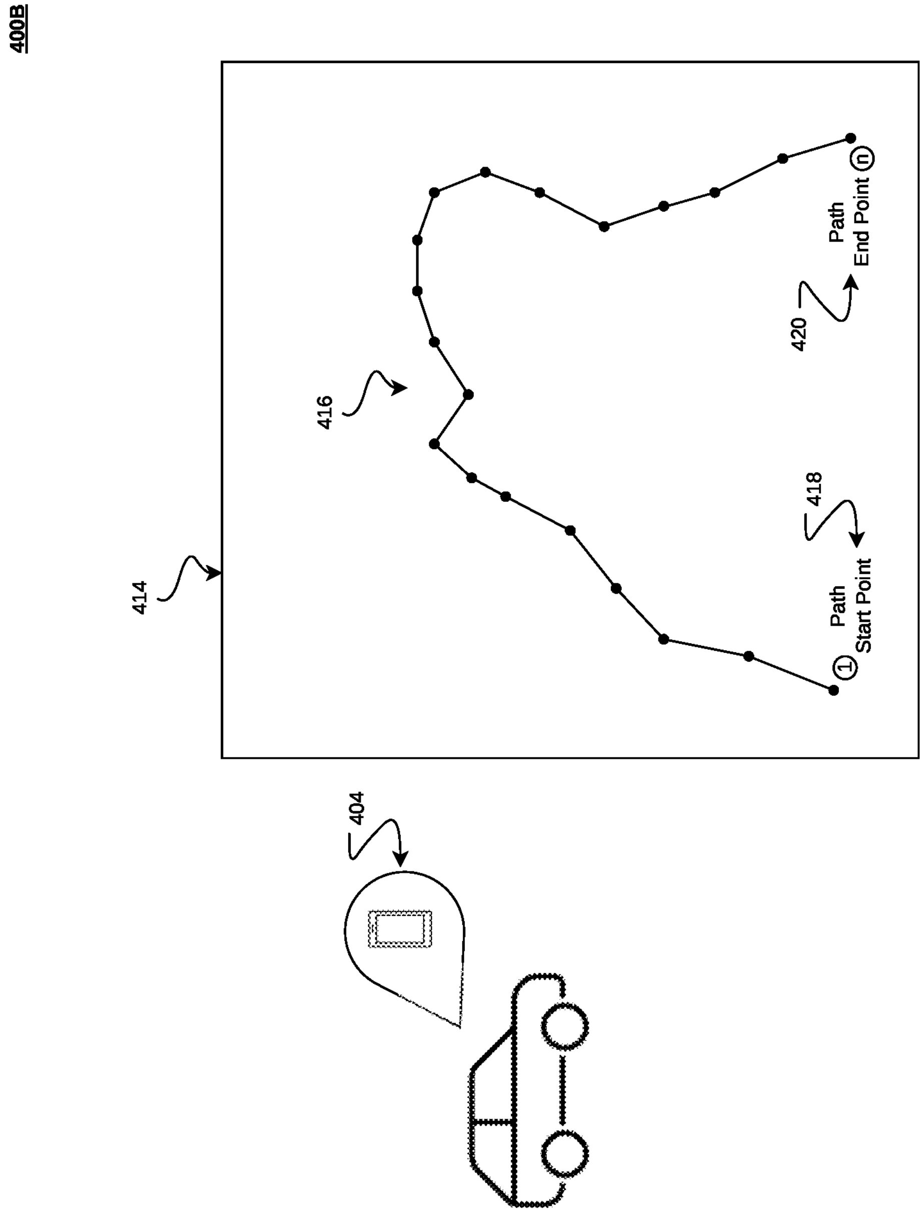
FIG. 4B is a diagram of an exemplary configuration of a virtual path based on collected coarse location data of a mobile computing platform as disclosed herein.

FIGS. 4A and 4B are diagrams of exemplary configurations 400A and 400B of a virtual path based on collected coarse location data of a mobile computing platform as disclosed herein. As shown in FIGS. 4A and 4B, exemplary system configurations 400A and/or 400B can include components such as mobile computing platform 404 and virtual path 414. In some embodiments, processor 106 can store virtual path 414 and associated virtualized coordinates 416 in memory 108 and can be accessed by processor 106 of location profile classification system 102 for processing and training of location profile classification model 112. Each of the components shown in FIG. 1 can be used in conjunction with the components shown in FIG. 4. Some components are not shown in FIGS. 4A and/or 4B for simplicity. FIG. 4B shows a display view of virtual path 414 superimposed on a coordinate system (e.g., a map) including location data points as virtualized coordinates 416 corresponding to various locations of mobile computing platform 404 where location profile classification system 102 received location data relative to other location data points. Virtual path 414 does not contain or divulge any absolute position and/or location of mobile computing platform 404. In some embodiments, location data can be received by location profile classification system 102 while mobile computing platform 404 is located at locations along or near roads. Alternatively, location profile classification system 102 can receive location data where mobile computing platform 404 is located away from a road (such as a main roadway), at another location (e.g., a home, a school, and so forth). Virtual path 414 can include virtualized coordinates 416 including a path start point 418 and a path end point 420.

In some embodiments, location profile classification system 102 can cluster received location data. For clustering the location data received from mobile computing platform 404, location profile classification system 102 can use a Density Based Spatial Clustering of Applications with Noise (DB Scan) clustering algorithm to cluster all nearby location data points within a radius (e.g., a 500 meter or 1 mile radius) based on where mobile computing platform 404 (e.g., or a resource of mobile computing device 404) visited to generate a unique location data cluster. Processor 106 can generate location data clusters for all location data points or for a subset of location data points that are received and stored by location profile classification system 102.

Location profile classification system 102 can determine a number of location data clusters (M) that mobile computing platform 404 visited over the course of the time period.

In some instances, the number of location data clusters (M) visited by mobile computing platform 404 can be all location data clusters. For example, as shown in FIG. 4, location profile classification system 102 can determine the number of location data clusters (M) as multiple location data clusters.

Location profile classification system 102 can determine how long (e.g., a time duration) mobile computing platform 404 remains at (within) each location data cluster within a time window (e.g. within a 1-hour time window, between 1 PM-2 PM) over the time period. For example, location profile classification system 102 can determine that mobile computing platform 404 remained at a first location data cluster for 15 minutes within a 1-hour time window. Location profile classification system 102 can use these time durations of mobile computing platform 404 being located at specific location data clusters to determine the percentage of time a mobile computing platform is detected at each location data cluster.

FIG. 5 shows a diagram of exemplary graphs 500 of location profiles including location entropy values over each time window within a time period of 24 hours as disclosed herein. As shown in FIG. 5, location entropy values for mobile computing platform 104 can be plotted for each time window to obtain a location profile over a time period (e.g., shown as a 24-hour period in FIG. 5) for mobile computing platform 104. FIG. 5 shows two different graphs that may be generated by location profile classification system 102. Graph 502 shows a first location profile including location entropy values plotted for each time window over a 24-hour period for a first mobile computing platform and graph 504 shows a second location profile including location entropy values plotted for each time window over a 24-hour period for a second mobile computing platform. As seen from graph 502 and graph 504, two different location profiles can have varying location entropy values determined by location profile classification system 102 such that each location profile is unique based on the location data collected from each respective mobile computing platform.

As noted from FIG. 5, graphs of location entropy values over time do not provide any insight into information about an identity of a resource or otherwise exact location data for a mobile computing platform and/or a resource thereof. Graphs 502 and 504 merely provide location profiles for how a mobile computing platform travels throughout a time period (e.g., associated with a resource, integrated within a vehicle, and so forth). For example, with graph 502, a high entropy value is shown early in the time period while during working hours (e.g., 9 AM-5 PM) there is a low location entropy value shown with a spike in the location entropy values around midday (e.g., lunch hour). This suggests that the first mobile computing platform is located at different locations in the morning/night hours while the first mobile computing platform may travel and visit multiple different locations during the lunch hour. In graph 504, the second mobile computing platform is shown with a low location entropy value during the morning and evening hours and a higher location entropy value during the day. This suggests that the second mobile computing platform travels to many different locations during the day for work. As shown in FIG. 5, location entropy values can be helpful for developing location profiles for mobile computing platforms where location frequency and travel attributes can be determined without having exact location data of the mobile computing platform. Such location profiles as shown in graphs 502 and 504 can be used to train a machine learning algorithm so other live and/or real-time location profiles can be recognized and classified by location profile classification model 112.

Figure 6A:
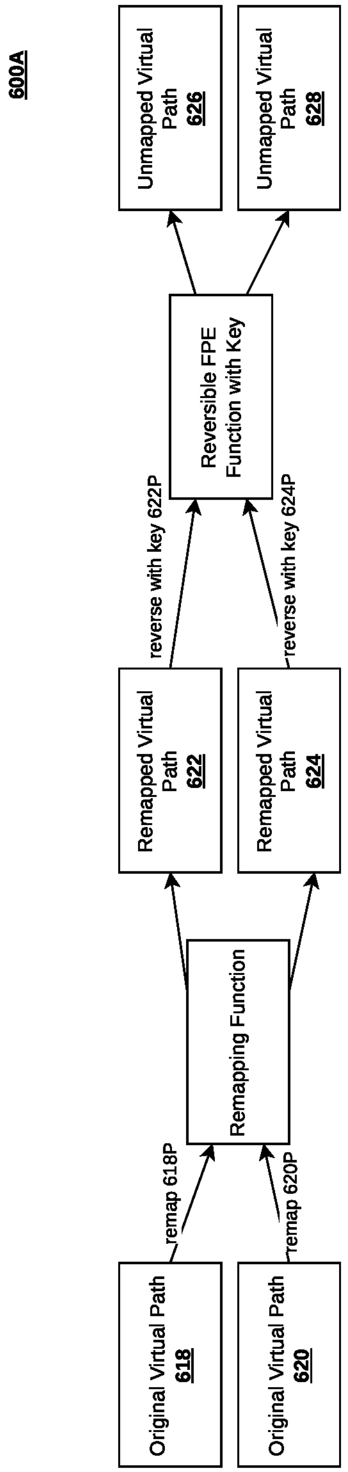
FIG. 6A is a flow diagram of steps for remapping and unmapping exemplary plots of virtual paths for location profiles as disclosed herein.
Figure 6B:
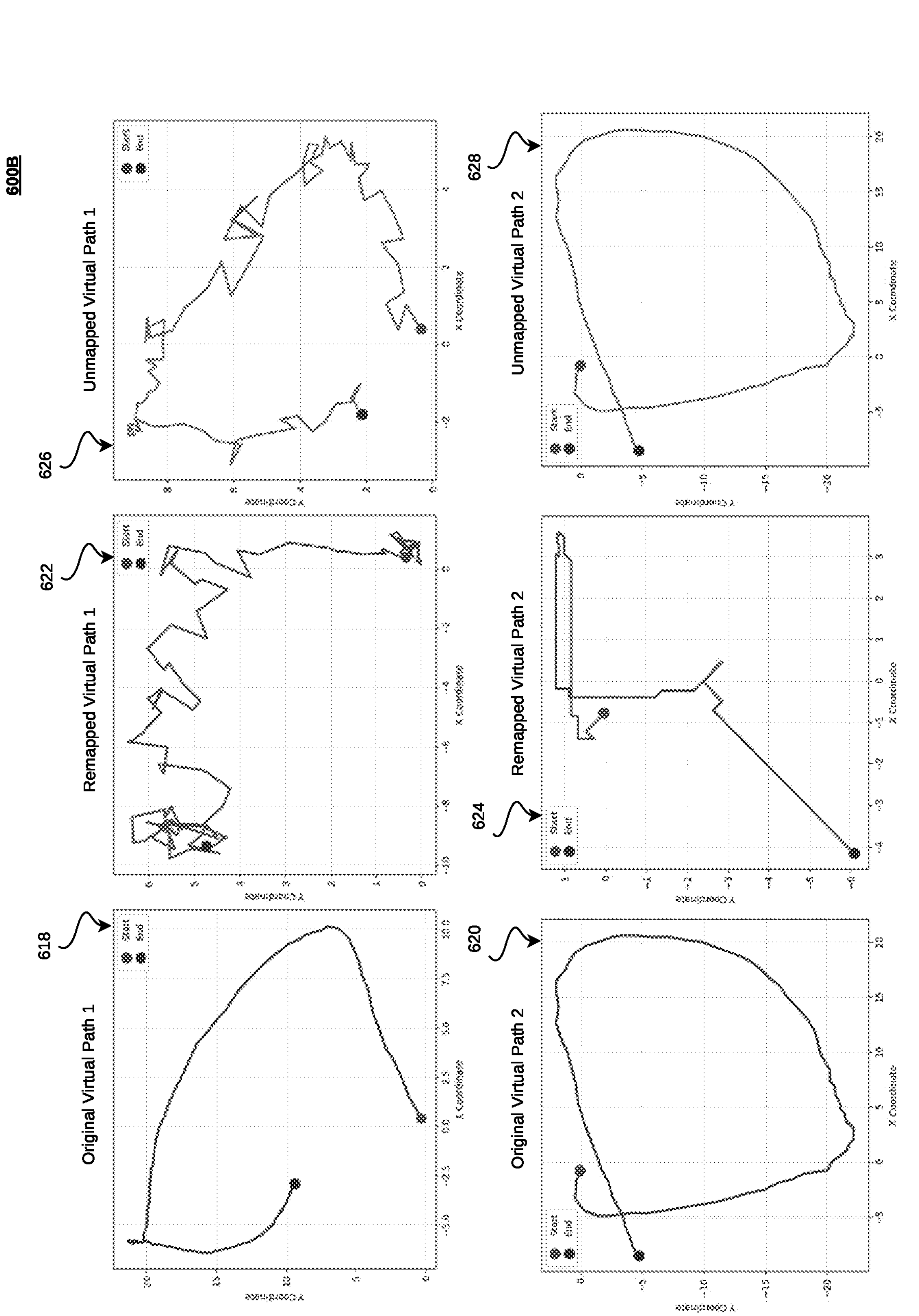
FIG. 6B is a diagram of exemplary plots of virtual paths for location profiles as disclosed herein.

FIG. 6A shows a flow diagram of steps for remapping and unmapping exemplary plots of virtual paths for location profiles as disclosed herein and FIG. 6B shows a diagram of exemplary plots of virtual paths for location profiles as disclosed herein. FIGS. 6A and 6B show how location data can be converted to virtualized coordinates and plotted in a relative coordinate system, remapped to a remapped virtual path, and then reversed back to the original virtual path (e.g., using a reversible FPE function with a key, or by accessing the original data in a database). As shown in FIGS. 6A and 6B, plots for virtual paths based on captured location data can include original virtual paths 618 and 620. Processor 106 can remap virtual paths 618 and 620 using a remapping function to generate remapped virtual paths 622 and 624. Where the remapping function is a reversible FPE function, processor 106 can use a key to obtain unmapped virtual paths 626 and 628. For example, processor 106 can be configured to unmap the encrypted virtualized coordinates to obtain the coarse location data by reversing the FPE function using the key. Processor 106 can unmap and reverse encryption of the virtualized coordinates to obtain the virtualized coordinates using the key for the FPE function and subsequently return to the coarse location data when virtualized parameters are stored in location characteristic database 110. In some embodiments, where the remapping function includes a FPE function that uses a key, processor 106 can be configured to store the key in location characteristic database 110 associated with the remapped virtualized coordinates. Alternatively, were the remapping function is not reversible, processor 106 may obtain unmapped virtual paths 626 and 628 by being authorized to access location characteristic database 110 to obtain the original location data and or the original virtual paths for mobile computing platforms.

Figure 7A:
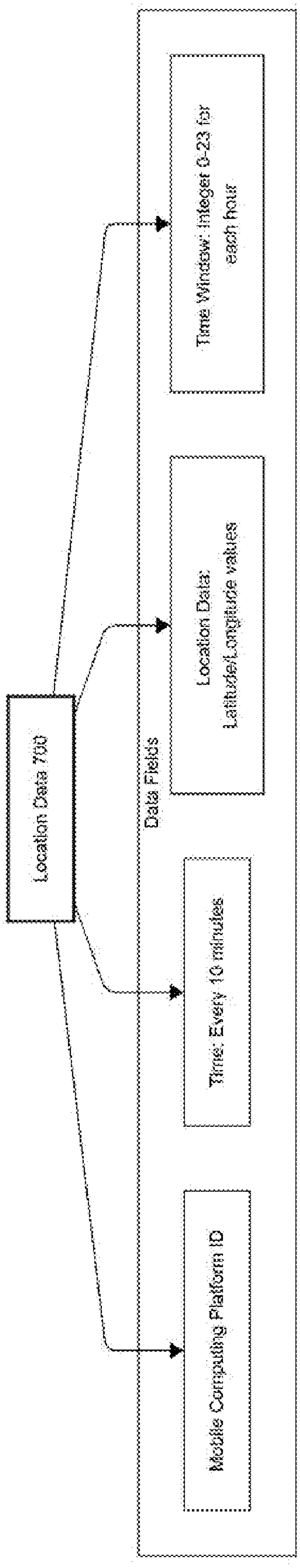

FIGS. 7A and 7B show diagrams of exemplary location data (e.g., a location dataset) 700A and 700B as disclosed herein. Location data 700A and/or 700B can be stored in memory 108 and/or location characteristic database 110 such that processor 106 can access location data 700. As shown in FIGS. 7A and 7B, exemplary location data 700 can include at least a data field for a mobile computing platform identifier (ID) to identify mobile computing platform 104. Exemplary location data 700A and/or 700B can also include a data field for a time (e.g., shown as every ten minutes in location data 700A and/or 700B), at least a data field for location data (e.g., shown in FIGS. 7A and 7B as latitude/longitude values), and at least a data field for a time window, shown as an integer assigned to each hour within a day (e.g., from 0 to 23). In some embodiments, processor 106 can store additional data fields in location data 700A and/or 700B that can be captured from mobile computing platform 104 when receiving and/or capturing location data. Additional data field can be included in location data 700A and/or 700B, such as a day type (to differentiate between weekdays and weekends), or other suitable data fields.

Figure 8A:
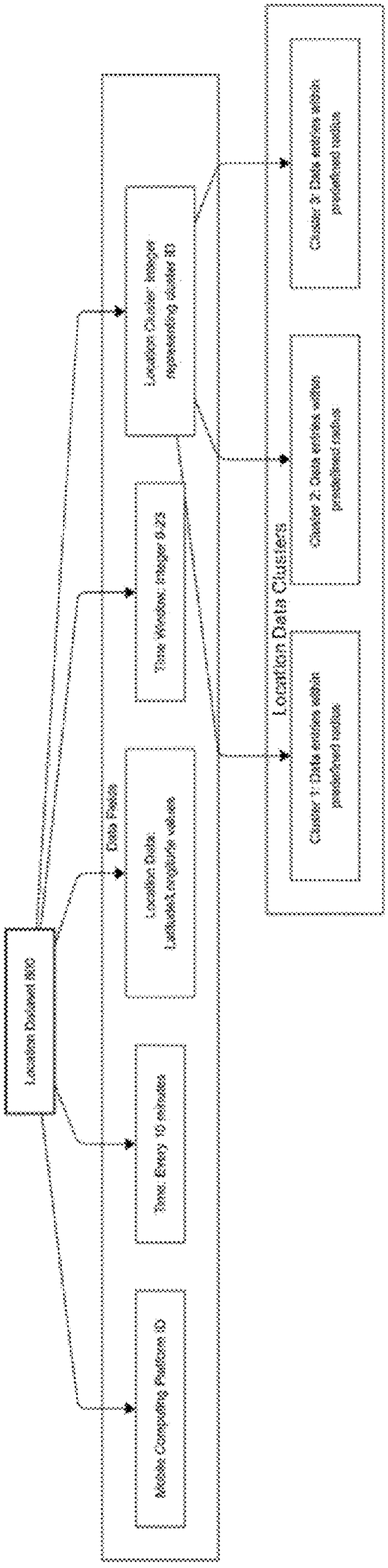

FIGS. 8A and 8B show diagrams of an exemplary location datasets 800A and 800B including location data clusters as disclosed herein. Location datasets 800A and/or 800B can be stored in memory 108 and/or location characteristic database 110 such that processor 106 can access location datasets 800A and/or 800B. As shown in FIGS. 8A and 8B, exemplary location datasets 800A and/or 800B can include at least a data field for a mobile computing platform ID to identify mobile computing platform 104 and received location data associated with mobile computing platform 104. Exemplary location datasets 800A and/or 800B can also include a data field for a time (e.g., shown as every ten minutes in location datasets 800A and 800B), at least a data field for location data (e.g., shown in FIGS. 8A and 8B as latitude/longitude values), and at least a data field for a time window, shown as an integer assigned to each hour within a day (e.g., from 0 to 23). In some embodiments, exemplary location datasets 800A and 800B can include each of the data fields included in the received and/or captured location data. In addition, once processor 106 clusters the location data for a period of time into plural location data clusters, processor 106 can append a new data field to the location data to include a location cluster field. The location cluster data field is shown in FIGS. 8A and 8B storing integers representing a cluster in which the associated data entry is clustered into based on positions of location data. For example, three data entries shown in FIG. 8B that are associated with location cluster 1 are considered to be close to one another in location (e.g., within a predefined radius). By adding a field for location clusters to cluster location data into location data clusters, processor 106 can group the location data into data points that are related (e.g., within a predefined radius) such that relationships between location data entries can be analyzed by location profile classification model 112. These data relationships (e.g., location data clusters) can improve how processor 106 trains a machine learning algorithm to generate a trained machine learning model for classification of location profiles. In some embodiments, processor 106 can store additional data fields in location dataset 800 that can be captured from mobile computing platform 104 when receiving and/or capturing location data. Additional data fields can be included in location datasets 800A and/or 800B, such as a day type (to differentiate between weekdays and weekends), or other suitable data fields.

Figure 9A:
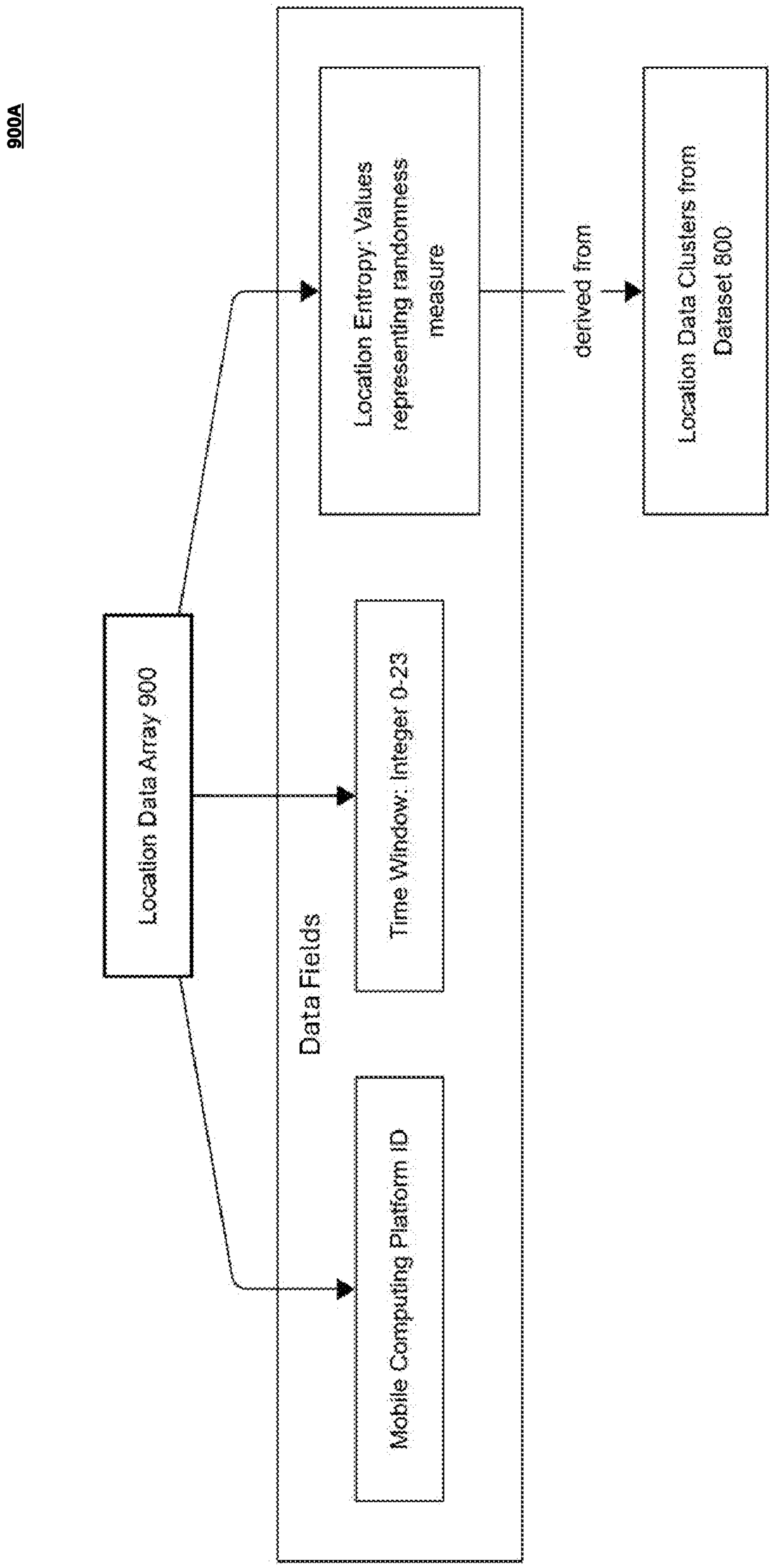

FIGS. 9A and 9B show diagrams of exemplary location data arrays 900A and 900B including location entropy values as disclosed herein. Location data arrays 900A and/or 900B can be stored in memory 108 and/or location characteristic database 110 such that processor 106 can access location data arrays 900A and/or 900B. As shown in FIGS. 9A and 9B, exemplary location data arrays 900A and/or 900B can include at least a data field for a mobile computing platform ID to identify mobile computing platform 104. Exemplary location data arrays 900A and/or 900B can also include at least a data field for a time window, shown as an integer. The integers for the time windows can be assigned to each hour within a day (e.g., from 0 to 23) as shown in exemplary location data 700A and/or 700B in FIGS. 7A and 7B. Processor 106 can determine a location entropy value for each time window, wherein the location entropy value can be determined from location data clusters, such as those shown in location datasets 800A and/or 800B in FIGS. 8A and/or 8B. Processor 106 can append a new data field and/or generate a new data structure as a location data array (e.g., location data arrays 900A and/or 900B) to include a location entropy field storing location entropy values. The location entropy field is shown in FIGS. 9A and/or 9B storing values corresponding to location entropy for a location profile, where a location entropy value can represent a measure of randomness of location data of from mobile computing platform 104. Thus, processor 106 and location profile classification model 112 can generate a classification using location profiles and location entropy values rather than relying on absolute positions (e.g., GPS coordinates) of mobile computing platform 104. Since processor 106 and location profile classification model 112 do not require an absolute position of mobile computing platform 104 to be captured and/or used directly for training a machine learning model and/or for generating a classification with location profile classification model 112, mobile computing platform 104 can be afforded a higher degree of privacy than if location profile classification model 112 required absolute locations of mobile computing platform 104. In some embodiments, location data arrays 900A and/or 900B can include additional data fields such as data fields to store variance values, location data, features extracted by processor 106 from location entropy values, and so forth. Location data arrays 900A and/or 900B can also be expanded to include additional data fields for more mobile computing platforms and additional data fields for additional time windows extending over larger time periods.

Figure 13A:
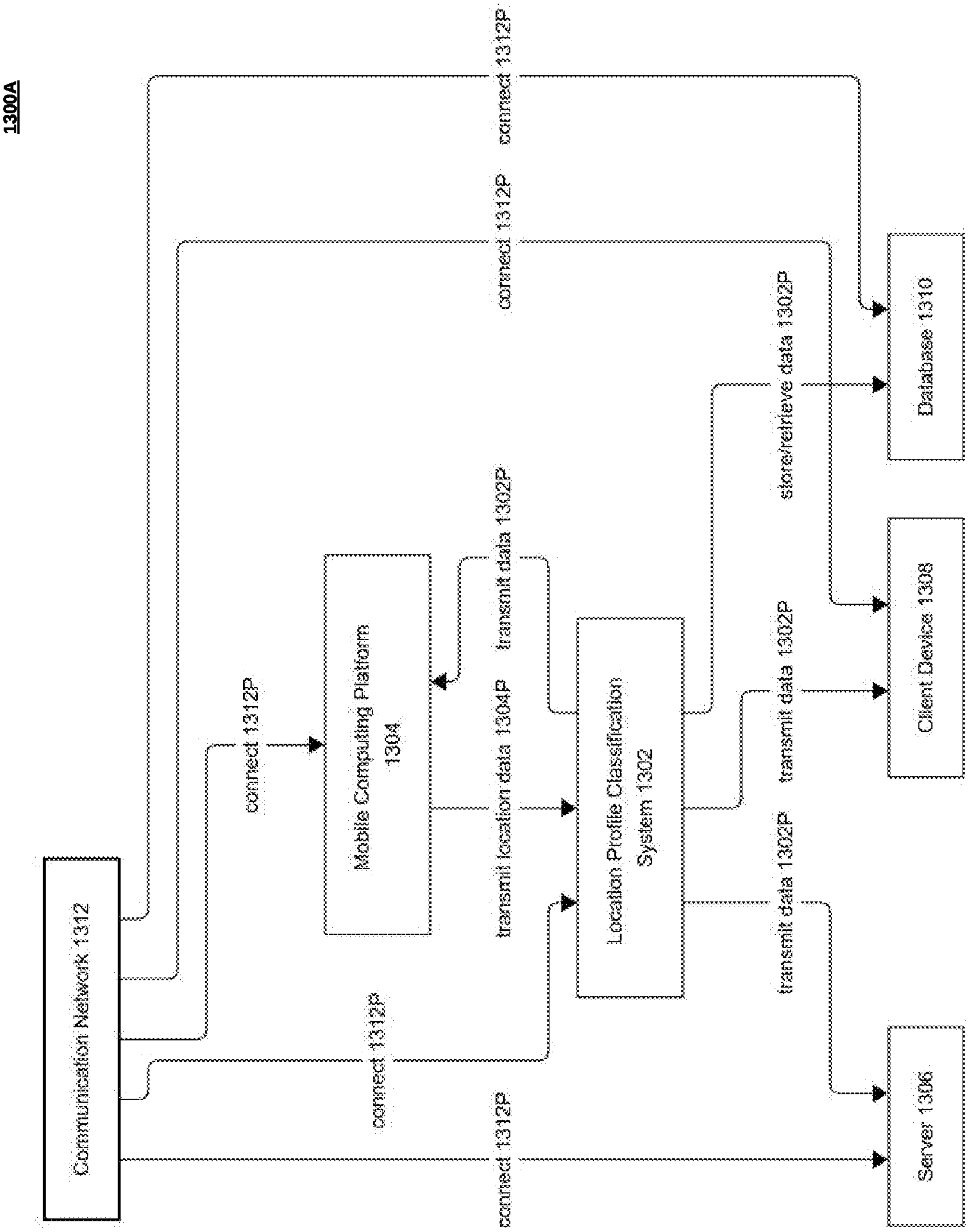
FIG. 13A is a diagram of exemplary communication paths in which systems and/or components, described herein, can be implemented for classifying a location profile based on remapped virtual paths as disclosed herein.
Figure 13B:
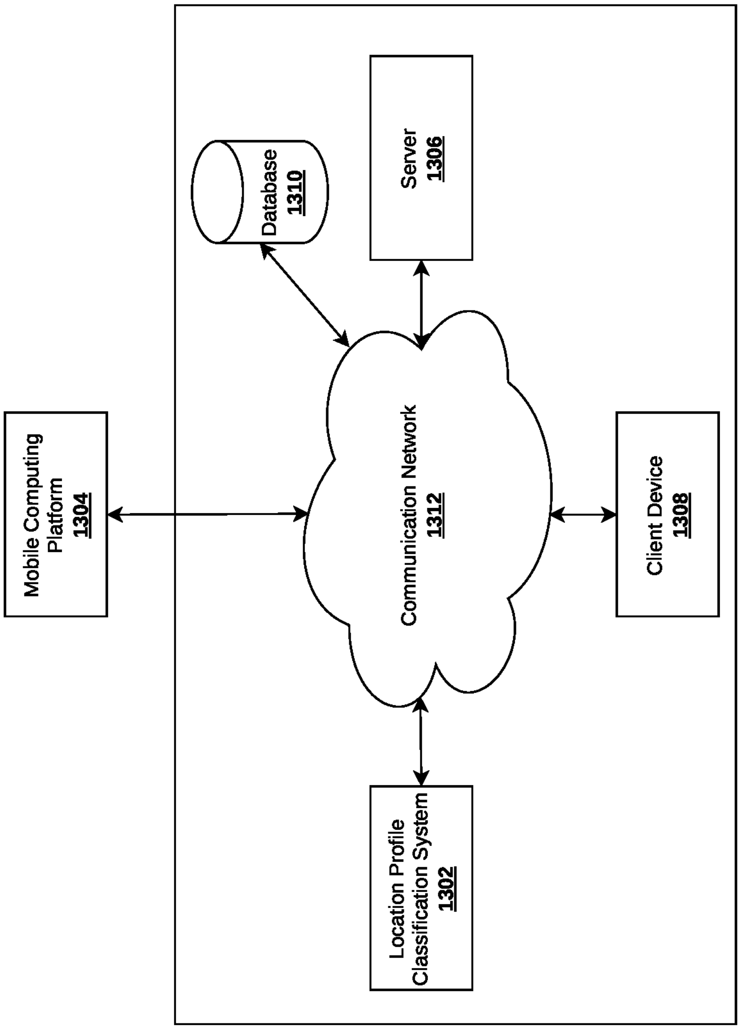
FIG. 13B is a diagram of an exemplary environment in which systems, methods, and/or computer program products, described herein, can be implemented for classifying a location profile based on remapped virtual paths as disclosed herein.

FIG. 13A shows a diagram of exemplary communication paths 1300A in which systems and/or components, described herein, can be implemented for classifying a location profile based on remapped virtual paths as disclosed herein. FIG. 13B shows a diagram of an exemplary environment 1300B in which systems, methods, and/or computer program products, described herein, can be implemented for classifying a location profile based on location entropy values derived from location data. As shown in FIGS. 13A and 13B, communication paths 1300A and environment 1300B can include location profile classification system 1302, mobile computing platform 1304, server 1306, client device 1308, database 1310, and communication network 1312. In some embodiments, each of mobile computing platform 1304, server 1306, client device 1308, database 1310, and/or communication network 1312 can be implemented by (e.g., part of) location profile classification system 1302. Alternatively, one or more components of environment 1300 can integrate location profile classification system 1302 into the one or more components. For example, location profile classification system 1302 can be implemented in one or more servers 1306 and/or databases 1310 as part of environment 1300. In some embodiments, at least one of mobile computing platform 1304, server 1306, client device 1308, database 1310, and/or communication network 1312 can be implemented by (e.g., part of) another system, another device, another group of systems, or another group of devices, separate from or including location profile classification system 1302.

Location profile classification system 1302 can include one or more devices capable of receiving information from and/or transmitting information to mobile computing platform 1304, server 1306, client device 1308, and/or database 1310 via communication network 1312. For example, location profile classification system 1302 can include a computing device, such as a server, a group of servers (e.g., encryption servers and/or decryption servers), and/or other like devices. Location profile classification system 1302 can be integrated with a server as described herein, such that a server (e.g., with a system of servers) implements one or more components of location profile classification system 1302. Location profile classification system 1302 can be in communication with a data storage device (e.g., database, memory, and so forth), which can be local or remote to location profile classification system 1302. Location profile classification system 1302 can be configured to receive information from, store information in, transmit information to, or search and access information stored in the data storage device. Location profile classification system 1302 can be the same as or similar to location profile classification system 102 as disclosed herein. Mobile computing platform 1304 can be the same as or similar to mobile computing platform 104 and/or mobile computing platform 304 as disclosed herein.

Mobile computing platform 1304 can include one or more devices capable of receiving information from and/or transmitting information to location profile classification system 1302, server 1306, client device 1308, and/or database 1310 via communication network 1312. For example, mobile computing platform 1304 can include a computing device, such as a mobile device, a smartphone, a laptop computer, a wireless device within (e.g., integrated in) a vehicle, and/or other like devices. Mobile computing platform 1304 can be configured to transmit data (e.g., location data, live location data) to location profile classification system 1302 for training a machine learning algorithm or for inputting to a trained machine learning model. Mobile computing platform 1304 can be configured to transmit data and/or wireless signals to location profile classification system 1302 or other devices within communication paths 1300A and/or environment 1300B.

Server 1306 can include one or more computing devices that can be operated by or facilitate communication and processing for multiple parties (e.g., clients, client devices, resources, user devices, and so forth) in communications path 1300A and/or environment 1300B. In some embodiments, server 1306 can facilitate communication over one or more public or private network environments. Server 1306 can include multiple servers 1306 for facilitating communication and/or performing one or more functions described herein. Server 1306 can be integrated with location profile classification system 1302 such that server 1306 includes components of location profile classification system 1302. In some embodiments, portions of memory described herein (e.g., memory 108) can be implemented in multiple servers 1306 and distributed across multiple servers 1306.

Client device 1308 can include one or more devices capable of receiving information from and/or transmitting information to location profile classification system 1302, mobile computing platform 1304, server 1306, and/or database 1310 via communication network 1312. Additionally or alternatively, one or more client devices 1308 can include a device capable of receiving information from and/or transmitting information to other client devices 1308 via communication network 1312, another network (e.g., an ad hoc network, a local network, a private network, a virtual private network, and/or the like), and/or any other suitable communication technique. For example, client device 1308 can include another user and/or resource device and/or the like.

Database 1310 can include RAM, read only memory (ROM), and/or another type of dynamic or static storage device (e.g., flash memory, magnetic memory, optical memory, etc.) that stores information for use by location profile classification system 1302. For example, database 1310 can store location data or other data used by location profile classification system 1302, computing device 1304, server 1306, and/or client device 1308. Database 1310 can include a non-transitory computer readable medium that can store information, data models, trained machine learning models, software, and/or program code related to the operation and use of location profile classification system 1302. For example, database 1310 can include a hard disk (e.g., a magnetic disk, an optical disk, a magneto-optic disk, a solid-state disk, etc.) and/or another type of computer-readable medium.

Database 1310 can include a computing device (e.g., a database device) configured to communicate with location profile classification system 1302 via a bus in communication paths 1300A and/or environment 1300B. For example, database 1310 can include a server, a group of servers, and/or other like devices. In some embodiments, database 1310 can be associated with one or more computing devices providing interfaces such that a resource and/or a computing device executing a software application can interact with database 1310 via the one or more computing devices. Database 1310 can be in communication with location profile classification system 1302 such that database 1310 is separate from location profile classification system 1302. Alternatively, database 1310 can be part of (e.g., a component of) location profile classification system 1302.

Database 1310 can include a device capable of storing data (e.g., a data storage device). Database 1310 can include file system storage, cloud storage, in-memory storage, and/or the like. Database 1310 can include non-volatile storage (e.g., flash memory, magnetic media), volatile storage (e.g., random access memory (RAM)), or both non-volatile and volatile storage. In some embodiments, database 1310 can be hosted (e.g., stored and permitted to be accessed by other computing devices via a network environment) on a computing device separate from location profile classification system 1302.

Communication network 1312 can include one or more wired and/or wireless networks. For example, communication network 1312 can include a cellular network (e.g., a LTE® network, a 3G network, a 4G network, a 5G network, a CDMA network, and/or the like), a public land mobile network (PLMN), a LAN, a WAN, a MAN, a telephone network (e.g., the public switched telephone network (PSTN)), a vehicle to vehicle (V2V) network, a private network (e.g., a private network associated with location profile classification system 1302), an ad hoc network, an intranet, the Internet, a fiber optic-based network, a cloud computing network, and/or the like, and/or a combination of these or other types of networks.

The number and arrangement of systems, devices, and/or networks shown in FIGS. 13A and 13B are provided as an example. There may be additional systems, devices, and/or networks; fewer systems, devices, and/or networks; different systems, devices, and/or networks; and/or differently arranged systems, devices, and/or networks than those shown in FIGS. 13A and 13B. Furthermore, two or more systems or devices shown in FIGS. 13A and 13B can be implemented within a single system or device, or a single system or device shown in FIGS. 13A and 13B can be implemented as multiple, distributed systems or devices. Additionally or alternatively, a set of systems (e.g., one or more systems) or a set of devices (e.g., one or more devices) of communication paths 1300A and environment 1300B can perform one or more functions described as being performed by another set of systems or another set of devices of communication paths 1300A and environment 1300B.

Figure 14:
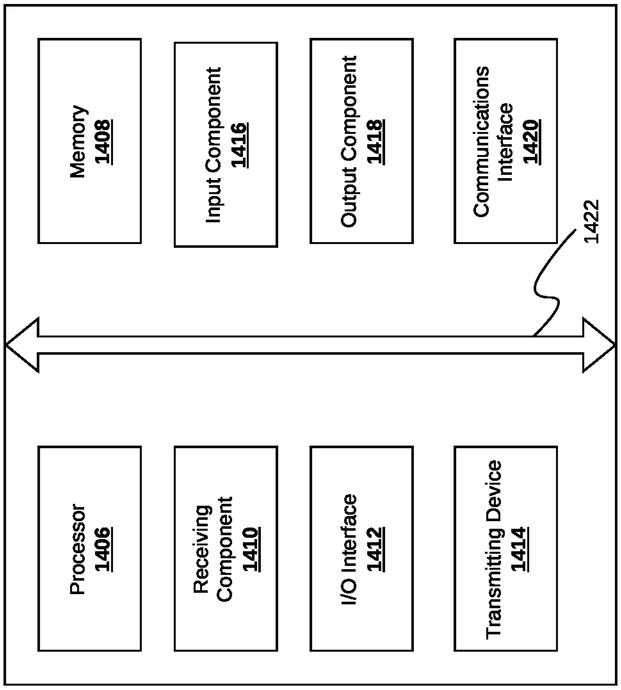
FIG. 14 is a schematic diagram of example components of one or more systems, components, and/or devices of FIGS. 1, 5, and 8 as disclosed herein.

FIG. 14 shows a diagram of example components of a computing device or system 1400 as disclosed herein. Computing device 1400 (and/or at least one component of computing device 1400) can correspond to at least one of location profile classification system 102 and/or 1302, and/or components shown in FIGS. 1, 4, and/or 13. In some embodiments, such systems or devices in various figures described herein can include at least one computing device 1400 and/or at least one component of computing device 1400. The number and arrangement of components shown in FIG. 14 are provided as an example. In some embodiments, computing device 1400 can include additional components, fewer components, different components, or differently arranged components than those shown in FIG. 14. Additionally, or alternatively, a set of components (e.g., one or more components) of computing device 1400 can perform one or more functions described as being performed by another set of components of computing device 1400.

Computing system or device 1400 can include processor 1406, memory 1408, receiving component 1410, input/output (I/O) interface 1412, transmitting device 1414, input component 1416, output component 1418, communications interface 1420, and communication infrastructure 1422. Memory 1408 can be the same as or similar to memory 108 as disclosed herein. Processor 1406 can be the same as or similar to processor 106 as disclosed herein.

Processor 1406 can be configured for executing the program code stored in memory 1408. Processor 1406 can be a special purpose or a general purpose computing device encoded with program code or software for performing the exemplary functions and/or features disclosed herein. According to exemplary embodiments of the present disclosure, processor 1406 can include a CPU. The CPU can be connected to the communications infrastructure including a bus, message queue, or network, multi-core message-passing scheme, for communicating with other components of computing system 1400, such as memory 1408, input component 1416, communications interface 1420, and I/O interface 1412. The CPU can include one or more processors such as a microprocessor, microcomputer, programmable logic unit or any other suitable hardware computing devices as desired.

Memory 1408 can be configured for storing program code. Memory 1408 can include one or more memory devices such as volatile or non-volatile memory. For example, the volatile memory can include RAM or cache memory. According to exemplary embodiments, the non-volatile memory can include one or more resident hardware components such as a hard disk drive and a removable storage drive (e.g., a floppy disk drive, a magnetic tape drive, an optical disk drive, a flash memory, or any other suitable device). The non-volatile memory can include an external memory device connected to communicate with the system 1400 via a mobile communication network. According to an exemplary embodiment, an external memory device can be used in place of any resident memory devices. Data stored in system 1400 can be stored on any type of suitable computer readable media, such as optical storage (e.g., a compact disc, digital versatile disc, Blu-ray disc, etc.) or magnetic tape storage (e.g., a hard disk drive). The stored data can include network traffic data, log data, streaming events, and/or CDRs generated and/or accessed by processor 1406, and software or program code used by processor 1406 for performing the tasks associated with the exemplary embodiments described herein. The data can be configured in any type of suitable database configuration, such as a relational database, a structured query language (SQL) database, a distributed database, an object database, etc. Suitable configurations and storage types will be apparent to persons having skill in the relevant art.

Receiving component 1410 can be a combination of hardware and software components configured to receive data samples from the mobile network or database. According to exemplary embodiments, receiving component 1410 can include a hardware component such as an antenna, a network interface (e.g., an Ethernet card), a communications port, a Personal Computer Memory Card International Association (PCMCIA) slot and card, 5G New Radio (NR) interface, or any other component or device suitable for use on a mobile communication network or Radio Access Network as desired. Receiving component 1410 can be an input device for receiving signals and/or data samples formatted according to 3GPP protocols and/or standards. Receiving component 1410 can be connected to other devices via a wired or wireless network or via a wired or wireless direct link or peer-to-peer connection without an intermediate device or access point. The hardware and software components of receiving component 1410 can be configured to receive the data from the mobile network according to one or more communication protocols and data formats. For example, receiving component 1410 can be configured to communicate over a network, which can include a LAN, a WAN, a wireless network (e.g., Wi-Fi), a mobile communication network, a satellite network, the Internet, fiber optic cable, coaxial cable, infrared, radio frequency (RF), another suitable communication medium as desired, or any combination thereof. During a receive operation, receiving component 1410 can be configured to identify parts of the received data via a header and parse the data signal and/or data packet into small frames (e.g., bytes, words) or segments for further processing at processor 1406.

I/O interface 1412 can be configured to receive the signal from processor 1406 and generate an output suitable for a peripheral device via a direct wired or wireless link. I/O interface 1412 can include a combination of hardware and software for example, a processor, circuit card, or any other suitable hardware device encoded with program code, software, and/or firmware for communicating with a peripheral device such as a display device, printer, audio output device, or other suitable electronic device or output type as desired.

Transmitting device 1414 can be configured to receive data from processor 1406 and assemble the data into a data signal and/or data packets according to the specified communication protocol and data format of a peripheral device or remote device to which the data is to be sent. Transmitting device 1414 can include any one or more of hardware and software components for generating and communicating the data signal over communications infrastructure 1422 and/or via a direct wired or wireless link to a peripheral or remote device. Transmitting device 1414 can be configured to transmit information according to one or more communication protocols and data formats as discussed in connection with receiving component 1410.

Input component 1416 can include a component that permits computing device 1400 to receive information, such as via user and/or resource input (e.g., a touch screen display, a keyboard, a keypad, a mouse, a button, a switch, a microphone, etc.). Additionally, or alternatively, input component 1416 can include a sensor for sensing information (e.g., a global positioning system (GPS) component, an accelerometer, a gyroscope, an actuator, etc.).

Output component 1418 can include a component that provides output information from computing device 1400 (e.g., a display, a speaker, one or more light-emitting diodes (LEDs), etc.). Communication interface 1420 can include a transceiver-like component (e.g., a transceiver, a receiver, a transmitter, a separate receiver and transmitter pair, etc.) that enables computing device 1400 to communicate with other devices, such as via a wired connection, a wireless connection, or a combination of wired and wireless connections. Communication interface 1420 can permit computing device 1400 to receive information from another device and/or provide information to another device. For example, communication interface 1420 can include an Ethernet interface, an optical interface, a coaxial interface, an infrared interface, a RF interface, a universal serial bus (USB) interface, a Wi-Fi® interface, a cellular network interface, and/or the like.

According to exemplary embodiments described herein, memory 1408 and processor 1406 can store and/or execute computer program code for performing the specialized functions described herein. It should be understood that the program code can be stored on a non-transitory computer usable medium, such as memory devices for the system 1400 (e.g., computing device), which can be memory semiconductors (e.g., DRAMs, etc.) or other tangible non-transitory means for providing software to system 1400. The computer programs (e.g., computer control logic) or software can be stored in memory devices (e.g., device memory 1408) resident on/in system 1400. The computer programs can also be received from external storage devices and/or network storage locations via a communications interface. Such computer programs, when executed, can enable system 1400 to implement the present methods and exemplary embodiments discussed herein. Accordingly, such computer programs can represent controllers of system 1400. Where the present disclosure is implemented using software, the software can be stored in a computer program product or non-transitory computer readable medium and loaded into system 1400 using any one or combination of a removable storage drive, an interface for internal or external communication, and a hard disk drive, where applicable.

In the context of exemplary embodiments of the present disclosure, a processor can include one or more modules or engines configured to perform the functions of the exemplary embodiments described herein. Each of the modules or engines can be implemented using hardware and, in some instances, can also utilize software, such as corresponding to program code and/or programs stored in memory. In such instances, program code can be interpreted or compiled by the respective processors (e.g., by a compiling module or engine) prior to execution. For example, the program code can be source code written in a programming language that is translated into a lower level language, such as assembly language or machine code, for execution by the one or more processors and/or any additional hardware components. The process of compiling can include the use of lexical analysis, preprocessing, parsing, semantic analysis, syntax-directed translation, code generation, code optimization, and any other techniques that can be suitable for translation of program code into a lower level language suitable for controlling system 1400 to perform the functions disclosed herein. It will be apparent to persons having skill in the relevant art that such processes result in system 1400 being a specially configured computing device uniquely programmed to perform the functions of the exemplary embodiments described herein.

Any of the processors disclosed herein can include any integrated circuit or other electronic device (or collection of devices) capable of performing an operation on at least one instruction, which can include a Reduced Instruction Set Core (RISC) processor, a CISC microprocessor, a Microcontroller Unit (MCU), a CISC-based CPU, a DSP, a GPU, a Field Programmable Gate Array (FPGA), etc. The hardware of such devices can be integrated onto a single substrate (e.g., silicon "die"), or distributed among two or more substrates. Various functional aspects of the processor can be implemented solely as software or firmware associated with the processor.

The processor can include one or more processing or operating modules. A processing or operating module can be a software or firmware operating module configured to implement any of the functions disclosed herein. The processing or operating module can be embodied as software and stored in memory; the memory being operatively associated with the processor. A processing module can be embodied as a web application, a desktop application, a console application, etc.

The processor can include or be associated with a computer or machine readable medium. The computer or machine readable medium can include memory. Any of the memory discussed herein can be computer readable memory configured to store data. The memory can include a volatile or non-volatile, transitory or non-transitory memory, and be embodied as an in-memory, an active memory, a cloud memory, etc. Examples of memory can include flash memory, RAM, ROM, Programmable Read only Memory (PROM), Erasable Programmable Read only Memory (EPROM), Electronically Erasable Programmable Read only Memory (EEPROM), FLASH-EPROM, Compact Disc (CD)-ROM, Digital Optical Disc DVD), optical storage, optical medium, a carrier wave, magnetic cassettes, magnetic tape, magnetic disk storage or other magnetic storage devices, or any other medium which can be used to store the desired information and which can accessed by the processor.

The memory can be a non-transitory computer-readable medium. The term "computer-readable medium" (or "machine-readable medium") as used herein is an extensible term that refers to any medium or any memory, that participates in providing instructions to the processor for execution, or any mechanism for storing or transmitting information in a form readable by a machine (e.g., a computer). Such a medium can store computer-executable instructions to be executed by a processing element and/or control logic, and data which is manipulated by a processing element and/or control logic, and can take many forms, including but not limited to, non-volatile medium, volatile medium, transmission media, etc. The computer or machine readable medium can be configured to store one or more instructions thereon. The instructions can be in the form of algorithms, program logic, etc. that cause the processor to execute any of the functions disclosed herein.

Embodiments of the memory can include a processor module and other circuitry to allow for the transfer of data to and from the memory, which can include to and from other components of a communication system. This transfer can be via hardwire or wireless transmission. The communication system can include transceivers, which can be used in combination with switches, receivers, transmitters, routers, gateways, wave-guides, etc. to facilitate communications via a communication approach or protocol for controlled and coordinated signal transmission and processing to any other component or combination of components of the communication system. The transmission can be via a communication link. The communication link can be electronic-based, optical-based, opto-electronic-based, quantum-based, etc. Communications can be via Bluetooth, near field communications, cellular communications, telemetry communications, Internet communications, etc.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can also be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc. Transmission of data and signals can be via transmission media. Transmission media can include coaxial cables, copper wire, fiber optics, etc. Transmission media can also take the form of acoustic or light waves, such as those generated during radio-wave and infrared data communications, or other form of propagated signals (e.g., carrier waves, digital signals, etc.).

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a processor to implement the methods as discussed herein. Accordingly, such computer programs can represent controllers of the computing device.

Technical Advantages

Disclosed embodiments provide several technical advantages over existing systems and methods. By converting absolute coordinates for location data (e.g., coarse location data) of a mobile computing platform to relative coordinates with an arbitrary origin for the location data, embodiments remove potentially sensitive absolute location information from the location data while preserving the shape and pattern of the route represented by the collected location data and traveled by the mobile computing platform. Embodiments can use disclosed remapping functions to remap absolute coordinates to relative coordinates and/or remap relative coordinates to a new coordinate space.

The relative coordinate system and virtual path preserve the geometric patterns and spatial relationships necessary for machine learning classification using the virtual paths for the location data. The path shape (e.g., straight lines, curves, turns) is preserved in the virtualized coordinates, enabling classification based on route patterns (e.g., using images/shapes of route patterns). The path information can still be preserved and captured to determine location entropy values of a mobile computing platform traveling along the virtual path and the path information (e.g., location entropy values) can be used for classification of the location profile of the mobile computing platform to determine a classification based on the shape of the path and overall movement of the mobile computing platform. Embodiments can thus ignore (and privacy-protect) absolute locations and preserve privacy and identity of actual locations visited. Embodiments use the remapping function to produce a representation of the coarse location data (e.g., either live or preexisting/prestored) that preserves information (e.g., location entropy) used for classification of the location profile for the mobile computing platform.

The path direction and shape of the virtual path (or remapped virtual path) can be rebuilt and/or reconstructed from stored virtualized coordinates, along with use of the virtualized coordinates themselves for classification of the shape of the path (e.g., as an image). The vector-based representation (e.g., using distance values and direction values) enables efficient remapping operations to different coordinate systems, further increasing privacy of the location data while preserving overall information of the location data (e.g., location entropy) for use in classification. This also allows sharing of location data between systems for training and/or classification using different machine learning models without compromising privacy (e.g., via exposing absolute location data to other, potentially non-secure, systems) for a mobile computing platform. The remapping function can transform the vectors to alternate coordinate systems while preserving their relative relationships for classification, which ultimately preserves the path shape and location entropy characteristics of the location data while hiding and/or securing absolute locations. Thus, embodiments provide improvements to machine learning and/or other classification techniques that rely on location data by protecting privacy of location data while expanding machine learning use cases for location data and improving accuracy of classification.

The vector-based representation of location data is more storage-efficient than storing all coordinate points of location data, as the vector-based representation can be stored as differences (vectors) between consecutive points, capturing the relative relationships of the location data rather than absolute locations themselves. The use of distance/direction vectors enables efficient remapping operations while preserving path shape characteristics and relative location information. This vector-based approach is more storage-efficient and computationally efficient than storing all coordinate points, and enables accurate classification and preservation of privacy and location entropy. Embodiments can determine a distance value and a direction value between virtualized coordinates for a virtual path. The distance values and the direction values can be determined and/or stored as vectors between each virtualized coordinate. The vectors can be stored separately defined in the location characteristic database. This allows for the virtual path to be stored efficiently in the location characteristic database as vectors that can be individually retrieved and/or remapped such that portions of a virtual path can be remapped and/or used for classification, further increasing privacy.

The location characteristic database can also store the remapped distance values and remapped direction values in a similar manner associated with the output classification, providing efficient retrieval of vector information for further classification while maintaining privacy of the original location information in the location characteristic database.

Embodiments offer further improvements to machine learning methods in location profile classification (e.g., using location entropy) by reducing storage requirements of remapped location data while also providing a cybersecurity component of protected privacy for the location data that is captured and used for classification.

Embodiments remap distance values and direction values of virtualized coordinates using a remapping function that maps the distance values and direction values from a first coordinate space to a second coordinate space to preserve relative spatial relationships of the original location data and to preserve the path shape characteristics of the original location data. The remapping function is also advantageous in that it preserves the location entropy values of the original location data such that remapped distance values and remapped direction values are in a representation that preserves privacy and is suitable for classification with a machine learning model. The remapped location data hides properties of the absolute location data and preserves privacy of a mobile computing platform. The remapped location data can preserve such information including relative location data and location entropy without revealing absolute location data or risking the absolute location data being discovered. This is enabled by the remapping function and the use of various techniques, such as FPE, hashing, and so forth, which cannot be readily reversed (e.g., without the original location data or a key) to obtain the absolute location information unless the system already possesses the absolute location information (e.g., as a key).

The remapping function generates remapped location data that can be shared and ingested by a machine learning algorithm for training while hiding absolute location data and preserving privacy of an associated mobile computing platform. Embodiments can remap the distance values and the direction values for virtualized coordinates with the remapping function to map the distance values and direction values from a first coordinate space to a second coordinate space while preserving the relative spatial relationships and the path shape characteristics of original location data and preserving the location entropy values of the original location data. The remapping function generates remapped distance values and remapped direction values for a remapped virtual path and the remapping function preserves the location entropy values of the original location data and the original virtual path in the remapped virtual path such that the remapped location data is suitable for classification.

Thus, the remapping function serves to generate a representation of location information (i.e., as remapped location information) that hides absolute location information while preserving other embedded information (e.g., location entropy, relative locations, etc.) of the location data that can be used for classification by a trained machine learning model to gain insights into a mobile computing platform. Embodiments can be applied to use location data for training and/or inference with machine learning models, sharing location data amongst computing devices and/or systems without concern for compromising privacy, and using location entropy for classification without concern for affecting the accuracy of the location entropy information. Embodiments offer many other technical advantages disclosed herein and/or that are apparent to those skilled in the art upon understanding the disclosed embodiments.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A system for classifying a location profile, the system comprising:

a location characteristic database;

memory; and a processor coupled to the memory, wherein the processor, memory, and location characteristic database are configured to perform privacy-preserving location profile classification on remapped virtual paths, wherein the processor is configured with program code stored in the memory that when executed will cause the processor to:

capture a time series of live coarse location data from a mobile computing platform traveling along a route;

generate a location entropy value for each time window at a recurring time interval based on a number of location data clusters where the mobile computing platform is detected and a percentage of time the mobile computing platform is detected at each location data cluster;

generate a location data array associating a location entropy value with each detected location data cluster in each time window, wherein the location data array includes location entropy values derived from the location data clusters;

generate virtualized coordinates for a virtual path corresponding to the live coarse location data along the route by converting a start point of the live coarse location data to have coordinates at an origin of a relative coordinate system and determining remaining virtualized coordinates from the start point, wherein the virtual path maintains relative spatial relationships and path shape characteristics of the live coarse location data while de-identifying absolute location information;

determine a distance value and a direction value between each virtualized coordinate for the virtual path, wherein the distance values and the direction values are determined as vectors between each virtualized coordinate, and wherein the vectors are stored separately defined in the location characteristic database;

remap the distance values and the direction values for the virtualized coordinates with a remapping function that maps the distance values and direction values from a first coordinate space to a second coordinate space while preserving relative spatial relationships and path shape characteristics of the live coarse location data and preserving the location entropy values of the live coarse location data, wherein the remapping function generates remapped distance values and remapped direction values for a remapped virtual path, wherein the remapping function preserves the location entropy values of the live coarse location data and the virtual path in the remapped virtual path that is suitable for classification;

generate an output classification for the mobile computing platform using a trained classification model based on inputting a remapped virtual path to the trained classification model, wherein the trained classification model generates output classifications for mobile computing platforms based on inputting remapped virtual paths;

store the output classification and the remapped virtual path associated in the location characteristic database;

associate the remapped virtual path and the output classification with an account identifier for the mobile computing platform in the location characteristic database; and update a data field associated with an account identifier in the location characteristic database to take action on an account corresponding to the account identifier.

2. The system of claim 1, wherein the remapping function is a deterministic transformation function including any one of a format preserving encryption (FPE) function, a hash-based function, and an encryption cipher function.

3. The system of claim 1, wherein when the program code generates the virtualized coordinates the program code when executed will cause the processor to select a resolution value to generate a number of virtualized coordinates corresponding to the live coarse location data along the route.

4. The system of claim 1, wherein the trained classification model is trained using remapped virtual paths, wherein training data includes images of route shapes plotted in a relative coordinate space generated by plotting the remapped virtual path on x-y axes in a relative coordinate system.

5. The system of claim 1, wherein the trained classification model is trained using remapped virtual paths, wherein training data includes remapped coordinates including remapped distance values and remapped direction values.

6. The system of claim 1, wherein the remapping function includes a keyless hash function such that the remapped distance values and the remapped direction values are non-reversible and the virtualized coordinates are used to determine original distance values and the original direction values.

7. The system of claim 2, wherein the deterministic transformation function includes a keyed cipher such that the remapped distance values and the remapped direction values are encrypted and require a key to decrypt the remapped distance values and the remapped direction values.

8. The system of claim 1, wherein the program code causes the processor to rebuild a remapped virtual path using the remapped distance values and the remapped direction values for the virtualized coordinates.

9. The system of claim 2, wherein the deterministic transformation function includes a format preserving encryption (FPE) function, wherein the program code stored in the memory when executed will cause the processor to:

retrieve a key for the FPE function stored in the location characteristic database associated with the remapped virtual path;

unmap the remapped virtual path to obtain the coarse location data by reversing the FPE function using the key.

10. A system for classifying a location profile, the system comprising:

a location characteristic database;

memory; and a processor coupled to the memory, wherein the processor is configured with program code stored in the memory that when executed will cause the processor to:

capture live coarse location data from a mobile computing platform traveling along a route;

generate a location entropy value for each time window at a recurring time interval based on a number of location data clusters where the mobile computing platform is detected and a percentage of time the mobile computing platform is detected at each location data cluster;

generate a location data array associating a location entropy value with each detected location data cluster in each time window, wherein the location data array includes location entropy values derived from the location data clusters;

generate virtualized coordinates for a virtual path corresponding to the live coarse location data along a route including a distance value and a direction value between each virtualized coordinate for the virtual path, wherein the distance values and direction values are determined as vectors between each virtualized coordinate;

remap the distance values and the direction values for the virtualized coordinates with a remapping function that preserves location entropy values of the virtual path while de-identifying absolute location coordinates, wherein the remapping function is a deterministic transformation function selected from the group consisting of: a format preserving encryption (FPE) function, a hash-based function, and an encryption cipher function, to generate remapped distance values and remapped direction values for a remapped virtual path;

generate a live location profile including an output classification for the mobile computing platform using a trained classification model based on inputting a remapped virtual path to the trained classification model;

generate predetermined location profiles for classification, each predetermined location profile being associated with a ground truth label, wherein the predetermined location profiles are generated from mean location entropy values for location profiles classified into each category, and wherein each predetermined location profile represents characteristic patterns for a specific type of location profile and is used as a comparison standard for classifying new location profiles;

compute a Kullback-Leibler (KL) divergence model for at least two predetermined location profiles, wherein the KL divergence model is used to classify live location profiles derived from privacy-preserved remapped virtual paths, wherein the KL divergence metric is calculated using the formula D_KL(P||Q) $=\Sigma_i$ P(i)*log(P(i)/Q(i)), where P is a live location profile based on location entropy values derived from location data, Q is a predetermined location profile, and i is an element of a location data array including location entropy values, wherein the KL divergence model spans values from 0 and 1, wherein a KL divergence metric for a location profile less than the KL divergence model indicates that characteristics of a location profile are classified into a first category of classification associated with a first ground truth label, wherein a KL divergence metric for a location profile greater than the KL divergence model indicates that the characteristics of a location profile are classified into a second category of classification associated with a second ground truth label;

determine a KL divergence metric for the live location profile and compare the KL divergence metric to a first predetermined location profile and a second predetermined location profile;

calculate a Jensen-Shannon (JS) divergence for the live location profile to classify the live location profile as matching whichever of the first predetermined location profile or the second predetermined location profile has a smaller JS divergence with the live location profile, wherein the JS divergence is calculated using the formula (D(P||Q)+D(Q||P))/2, where D(P||Q) is a KL divergence between the live location profile and a predetermined location profile, and D(Q||P) is a reverse KL divergence between the live location profile and the predetermined location profile, wherein the JS divergence calculation enables automated privacy-preserving location profile classification;

store the live location profile, the JS divergence, and the remapped virtual path associated in the location characteristic database;

associate the live location profile with an account identifier for the mobile computing platform in the location characteristic database; and update a data field associated with an account identifier in the location characteristic database to take action on an account corresponding to the account identifier.

11. The system of claim 10, wherein when the program code generates the virtualized coordinates the program code when executed will cause the processor to select a resolution value to generate a number of virtualized coordinates corresponding to the live coarse location data along the route.

12. The system of claim 10, wherein the trained classification model is trained based on the virtualized coordinates for plural routes corresponding to plural sets of coarse location data.

13. The system of claim 10, wherein the trained classification model is trained based on images of plural route shapes corresponding to plural sets of coarse location data.

14. The system of claim 10, wherein the remapping function includes a keyless hash function such that the remapped distance values and the remapped direction values are non-reversible and the virtualized coordinates are used to determine original distance values and the original direction values.

15. The system of claim 10, wherein the remapping function includes a keyed cipher such that the remapped distance values and the remapped direction values are encrypted and require a key to decrypt the remapped distance values and the remapped direction values.

16. The system of claim 10, wherein the program code causes the processor to rebuild a remapped virtual path using the remapped distance values and the remapped direction values for the virtualized coordinates.

17. The system of claim 10, wherein the remapping function includes a format preserving encryption (FPE) function, wherein the program code stored in the memory when executed will cause the processor to:

retrieve a key for the FPE function stored in the location characteristic database associated with the remapped virtual path; and unmap the remapped virtual path to obtain the coarse location data by reversing the FPE function using the key.

18. The system of claim 10, wherein the predetermined location profiles are generated from aggregated location data from multiple mobile computing platforms known to have the same location profile type, and wherein the predetermined location profiles include at least one of: a postman profile, a traveler profile, a commuter profile, or a gig worker profile.

19. A method for classifying a location profile, the method comprising:

capturing a time series of live coarse location data from a mobile computing platform traveling along a route;

generating virtualized coordinates for a virtual path corresponding to the live coarse location data along the route;

determining a distance value and a direction value between each virtualized coordinate for the virtual path;

remapping the distance values and the direction values for the virtualized coordinates with a remapping function to generate remapped distance values and remapped direction values for a remapped virtual path;

generating an output classification for the mobile computing platform using a trained classification model based on inputting a remapped virtual path to the trained classification model;

associating the remapped virtual path and the output classification with an account identifier for the mobile computing platform in a location characteristic database; and updating a data field associated with an account identifier in the location characteristic database to take action on an account corresponding to the account identifier.

20. The method of claim 19, wherein the remapping function is a deterministic transformation function including any one of a format preserving encryption (FPE) function, a hash-based function, and an encryption cipher function.

* * * * *